(12) United States Patent
Olsson

(10) Patent No.: US 12,510,376 B2
(45) Date of Patent: Dec. 30, 2025

(54) SYSTEMS, APPARATUS, AND METHODS FOR DOCUMENTING UTILITY POTHOLES AND ASSOCIATED UTILITY LINES

(71) Applicant: SeeScan, Inc., San Diego, CA (US)

(72) Inventor: Mark S. Olsson, La Jolla, CA (US)

(73) Assignee: SeeScan, Inc., San Diego, CA (US)

( * ) Notice: Subject to any disclaimer, the term of this patent is extended or adjusted under 35 U.S.C. 154(b) by 105 days.

(21) Appl. No.: 18/544,042

(22) Filed: Dec. 18, 2023

(65) Prior Publication Data
US 2024/0210208 A1 Jun. 27, 2024

Related U.S. Application Data

(60) Provisional application No. 63/435,148, filed on Dec. 23, 2022.

(51) Int. Cl.
*G01C 3/02* (2006.01)
*G01C 21/00* (2006.01)

(52) U.S. Cl.
CPC ........... *G01C 21/3848* (2020.08); *G01C 3/02* (2013.01)

(58) Field of Classification Search
CPC ....... G01C 21/3848; G01C 3/02; G01S 17/86; G01S 17/89; G01V 3/081; G06N 3/08
See application file for complete search history.

(56) References Cited

U.S. PATENT DOCUMENTS

| 9,784,837 | B1 | 10/2017 | Olsson et al. | |
|---|---|---|---|---|
| 11,709,870 | B2* | 7/2023 | Worster | G06F 17/18 |
| | | | | 701/532 |
| 2004/0210370 | A1* | 10/2004 | Gudat | E02F 3/435 |
| | | | | 701/50 |
| 2009/0102946 | A1 | 4/2009 | Tischer | |
| 2019/0026886 | A1 | 1/2019 | Ferguson et al. | |
| 2019/0243020 | A1 | 8/2019 | Olsson et al. | |
| 2022/0012270 | A1* | 1/2022 | Worster | G06F 16/29 |
| 2023/0003889 | A1* | 1/2023 | DeWeert | G06T 17/05 |
| 2023/0221137 | A1* | 7/2023 | Malka | G06V 20/182 |
| | | | | 701/448 |

OTHER PUBLICATIONS

International Searching Authority, "Written Opinion of the International Searching Authority" for PCT Patent Application No. PCT/US2023/084638, May 14, 2024, European Patent Office, Rijswijk.

* cited by examiner

*Primary Examiner* — Tyler J Lee
(74) *Attorney, Agent, or Firm* — Steven C. Tietsworth, Esq.; Michael J. Pennington, Esq.

(57) ABSTRACT

Apparatus, systems, and methods for mapping utility lines in utility potholing operations are disclosed. Pothole mapping apparatuses, systems, and methods may be employed in utility locator devices and utility locating systems to map potholed utility lines. Data generated via pothole mapping may be used to calibrate utility depth measurements in utility locator devices and systems. Further, information revealed about utility lines during potholing procedures may be used to train neural networks and utilize artificial intelligence in generating predictions regarding the positions and characteristics of utility lines.

31 Claims, 24 Drawing Sheets

First Tilt Angle 300

Second Tilt Angle 310

Third Tilt Angle 320

SYSTEMS, APPARATUS, AND METHODS FOR DOCUMENTING UTILITY POTHOLES AND ASSOCIATED UTILITY LINES

CROSS-REFERENCE TO RELATED APPLICATIONS

This application claims priority under 35 U.S.C. § 119(e) to U.S. Provisional Patent Application Ser. No. 63/435,148, entitled SYSTEMS, APPARATUS, AND METHODS FOR DOCUMENTING UTILITY POTHOLES AND ASSOCIATED UTILITY LINES, filed Dec. 23, 2022, the content of which is incorporated by reference herein in its entirety for all purposes.

FIELD

This disclosure relates generally to systems, apparatuses, and methods for mapping utility potholes and associated utility lines. More specifically, but not exclusively, this disclosure relates to systems, apparatuses, and methods employing utility locator devices for mapping utility potholes and associated utility lines.

BACKGROUND

Incidents resulting in damage to buried utility lines during excavation or other construction projects are frequently known to have catastrophic and costly consequences such as damage to the surrounding buildings and infrastructure as well as injuries and even death to workers or others in the proximity of the incident. It is therefore imperative to the wellbeing of humans, nearby buildings, and infrastructure to determine the presence or absence of utility lines in the ground prior to beginning excavation or other construction projects. There are various technologies known in the art that attempt to avoid the horrific consequences associated with accidentally damaging buried utility lines.

For instance, utility potholing, also referred to as simply potholing, is frequently employed to safely bore a hole in the ground for the purpose of probing for one or more utility lines that would otherwise be buried beneath the ground surface. Such potholing devices and systems often utilize pressurized water or air in combination with a vacuum to uncover utility lines with a significantly reduced risk of damage to the buried utility lines and thereby avoiding potential damage to infrastructure, buildings, and risk to human safety. Where potholing operations and systems are becoming increasingly common to check worksites for the presence of utility lines, known system and devices either fail completely or otherwise fail to optimally utilize the points of ground truth regarding the exposed utility lines resulting in wasted opportunities. Further, potholing techniques may generally only be useful in probing the ground and thus are used in uncovering small areas containing buried utility lines.

Utility locator devices are another technology used to locate buried utilities and hopefully avoid potential damage caused by striking a utility line during excavation. Such utility locator devices, also referred to as utility locators or simply locators, may include one or more antennas and associate receiver circuitry to sense magnetic signals in an attempt to determine if and where utility lines may be present below the ground surface. Such utility locator devices and related systems may be advantageous in efficiently scanning and, in some cases, mapping for the presence or absence of utility lines over greater distances with relative certainty, however, such devices and systems lack ground truth certainty provided by potholing. Likewise, utility locator devices are reliant on the conductivity of the utility line to emit signals in locating and may fail to locate PVC sprinkler lines, ABS drain lines, or other nonconductive utility lines. In some utility locating systems, tracer wire or marker devices that use RFID to emit a signal that may be associated with nonconductive utility lines allowing such utility lines to be located by a utility locator device. Unfortunately, not all nonconductive utility lines may include tracer wire or have one or more associated marker devices thus there is a lack of certainty in the absence or presence of such nonconductive utility lines when using utility locator devices.

Accordingly, there is a need in the art to address the above-described as well as other problems related to utility locating and potholing operations and systems.

SUMMARY

This disclosure relates generally to systems, apparatuses, and methods for mapping utility potholes and associated utility lines. More specifically, but not exclusively, this disclosure relates to systems, apparatuses, and methods employing utility locator devices for mapping utility potholes and associated utility lines.

In one aspect, the present disclosure relates to a potholing mapping apparatus. The pothole mapping apparatus may include a positioning element to determine position data describing the geolocation in the world frame of the pothole mapping apparatus at the ground surface about a pothole, an orientation element to determine orientation data describing the direction, tilt, and pose of the pothole mapping apparatus in three dimensions that correlates with the position data, and a distance measuring element to determine distance data describing the distance between the pothole mapping apparatus and one or more utility lines in a pothole correlating with the position data and orientation data. An imaging element may be included in the pothole mapping apparatus to generate images of the one or more utility lines in the pothole and surrounding area correlated with position data, orientation data, and distance data. The pothole mapping apparatus may include a processing element having one or more processors to carry out methods associated with documenting mapped position and depths of potholed utility lines. A memory element may be included having one or more non-transitory memories to store instructions relating to methods associated with documenting mapped position and depths of the potholed utility lines and the resulting mapped utility line positions and depths. The potholing mapping apparatus may further include a housing element to encase electronics and other components associated with the pothole mapping apparatus and a power element for portioning of electrical power to the various powered elements therein.

In another aspect, the present disclosure relates to a utility locator device including a pothole mapping apparatus. The utility locator device including a pothole mapping apparatus may include a locator subsystem including one or more antennas and associated receiver circuitry to receive magnetic signals emitted by one or more utility lines. The utility locator device including a pothole mapping apparatus may further include a pothole mapping apparatus having a positioning element to determine position data describing the geolocation in the world frame of the pothole mapping apparatus at the ground surface about a pothole, an orientation element to determine orientation data describing the direction, tilt, and pose of the pothole mapping apparatus in three dimensions that correlates with the position data, and a distance measuring element to determine distance data describing the distance between the pothole mapping apparatus and one or more utility lines in a pothole correlating with the position data and orientation data. An imaging element may be included in the utility locator device including a pothole mapping apparatus to generate images of the one or more utility lines in the pothole and surrounding area correlated with position data, orientation data, and distance data. The utility locator device including a pothole mapping apparatus may include a processing element having one or more processors to carry out methods associated with documenting mapped position and depths of potholed utility line(s) and determining, via magnetic signals, the positions and orientation of the same utility line(s). A memory element may further be included having one or more non-transitory memories to store instructions relating to methods associated with documenting mapped position and depths of potholed utility line(s) and the resulting mapped utility line position(s) and depth(s). The utility locator device including a pothole mapping apparatus may further include a housing element to encase electronics and other components associated with the utility locator device including a pothole mapping apparatus and a power element for portioning of electrical power to the various powered elements. Further, the utility locator device including a pothole mapping apparatus may include a communication element to communicate data relating to the geolocation and depth of the potholed utility line(s) with one or more databases, systems, and devices for utility line mapping.

In another aspect, the present disclosure relates to a utility locating and pothole mapping system. The utility locating and pothole mapping system may include one or more utility locator devices having one or more antennas and associated receiver circuitry to receive magnetic signals to determine and map utility lines in the world frame and one or more pothole mapping apparatuses to determine the geolocation of potholed utility lines in the world frame and depth of the utility line or lines relative to the ground surface. The utility locating and pothole mapping system further having a database element communicatively coupled with the utility locator device and pothole mapping apparatus in incorporating mapped utility line geolocations and potholed utility line geolocations and depths.

In another aspect, the present disclosure relates to a pothole mapping method for mapping potholes and one or more associated utility lines. The pothole mapping method may include determining, via a pothole mapping apparatus, position data describing the geolocation position of the pothole mapping apparatus in the world frame at the ground surface about a pothole. The pothole mapping method may further include determining, via a pothole mapping apparatus, orientation data of the pothole mapping apparatus in three dimensions correlating with position data. For instance, such orientation data may describe the tilt, pose, direction, or other orientation information of the pothole mapping apparatus in the world frame. The pothole mapping method may further include determining, via a pothole mapping apparatus, distance data describing the distance between the pothole mapping apparatus and one or more utility lines in a pothole correlating with the position data of the pothole mapping apparatus in the world frame. The pothole mapping method may further include determining, via a processing element, pothole mapping data describing the position of the utility line(s) in the pothole and the orientation of the utility line(s) describing the direction, tilt, and pose of the utility line(s). The pothole mapping method may further include storing, in a memory element having one or more non-transitory memories, mapped potholes and associated utility line position(s) and orientation(s).

In another aspect, the present disclosure relates to a utility line depth verification method. The utility line depth verification method may include determining, via a pothole mapping apparatus, orientation data of the pothole mapping apparatus in three dimensions correlating with position data and determining, via a pothole mapping apparatus, distance data describing the distance between the pothole mapping apparatus at the ground surface and one or more utility lines in a pothole correlating with the position data and orientation data. The depth of the one or more utility lines exposed in the pothole may be calculated via a processing element having one or more processors. The utility line depth verification method may further include receiving, via a locator subsystem, magnetic signals from the utility line(s) and receiving, via a locator subsystem, magnetic signals from the same utility line(s). The depth of the same utility line(s) via the magnetic signals is determined via a processing element having one or more processors. Depth measurements and calculated differences in depth measurements may be stored in a memory element having one or more non-transitory memories.

In another aspect, the present disclosure relates to a method of providing Training Data that includes Locating Data and Potholing Data to a Neural Network to use Deep Learning/artificial intelligence to recognize patterns and make predictions related to underground utilities. The method includes collecting Locating Data describing the positions and depths of utility lines in the ground from electromagnetic signals via a utility locator device and collecting Potholing Data from identifiable characteristics revealed when a utility line is exposed in a pothole via a potholing mapping apparatus of the present invention. In a further step, the method includes assembling a Training Database that includes Locating Data and Potholing Data. Further still, the method includes steps using deep learning to train a Neural Network (Artificial Intelligence/AI) via the Training Database Data and then using AI to generate predictions regarding the positions of utility lines and utility line characteristics. The method further includes outputting predictions regarding the positions of utility lines and utility line characteristics.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying Drawings, wherein.

DETAILED DESCRIPTION OF EMBODIMENTS

Overview

Figure 1:
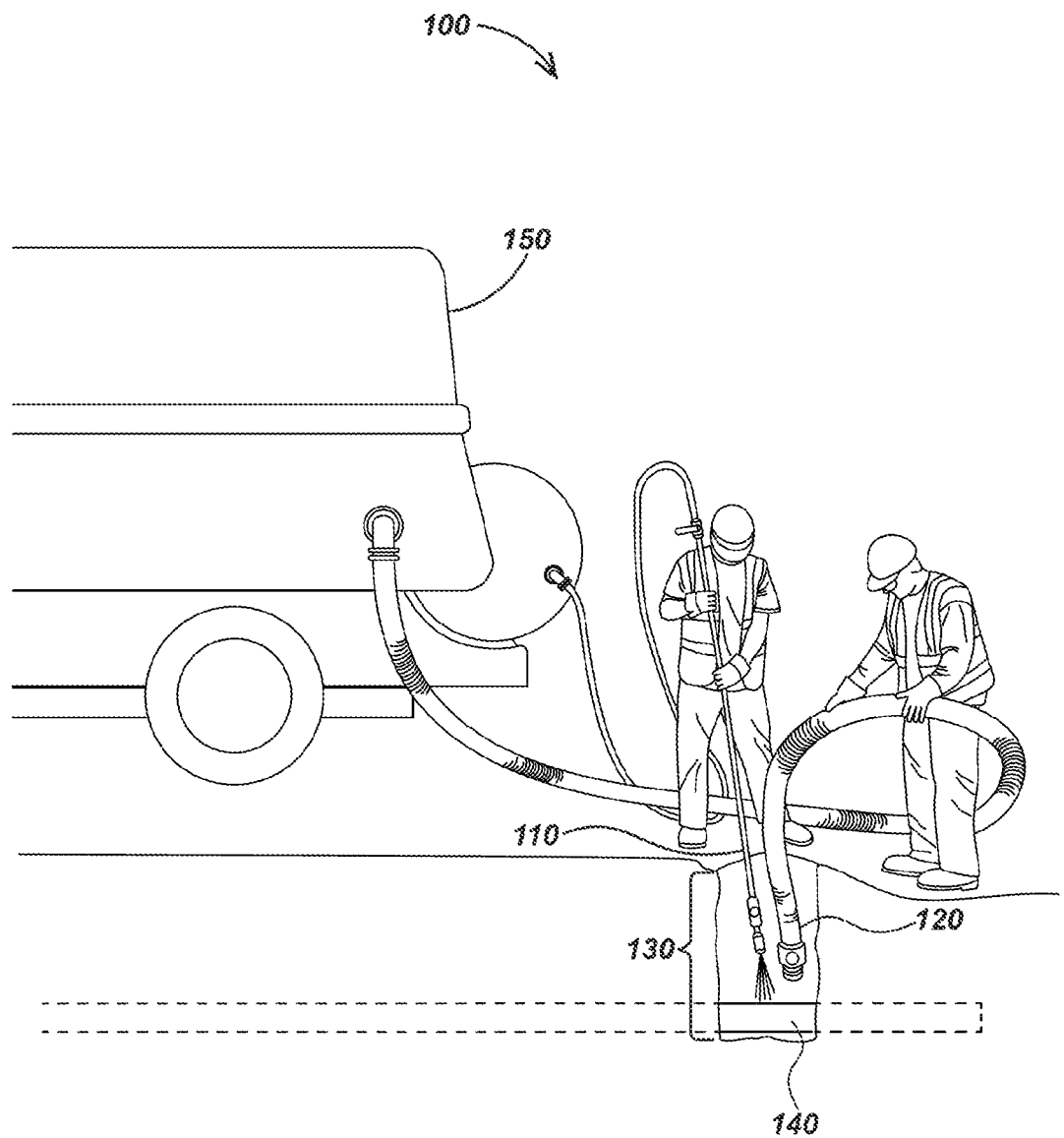
FIG. 1 is an illustration of a prior art a hydro-excavation potholing system.

This disclosure relates generally to systems, apparatuses, and methods for mapping utility potholes and associated utility lines. More specifically, but not exclusively, this disclosure relates to systems, apparatuses, and methods employing utility locator devices for mapping utility potholes and associated utility lines.

In one aspect, the present disclosure relates to a potholing mapping apparatus. The pothole mapping apparatus may include a positioning element to determine position data describing the geolocation in the world frame of the pothole mapping apparatus at the ground surface about a pothole, an orientation element to determine orientation data describing the direction, tilt, and pose of the pothole mapping apparatus in three dimensions that correlates with the position data, and a distance measuring element to determine distance data describing the distance between the pothole mapping apparatus and one or more utility lines in a pothole correlating with the position data and orientation data. The positioning element may, for instance, be or include one or more global navigation satellite system (GNSS) antennas and receivers (GPS, Galileo, GLONASS, BeiDou, or the like), inertial sensors (e.g., accelerometers, gyroscopic sensors, and/or other motion sensing devices), ground tracking apparatus for optically or mechanically determining movement, or the like. The orientation element may be or include one or more, gyroscopic sensors, inclinometers, magnetometers, or other sensors and apparatus for determine orientation in three dimensions. The distance measuring device may be or include a laser rangefinder which may be a multi-spectral laser rangefinder. Likewise, the distance measuring device may include one or more other rangefinders (e.g., optical rangefinders or other types of rangefinders). An imaging element may be included in the pothole mapping apparatus to generate images of the one or more utility lines in the pothole and surrounding area correlated with position data, orientation data, and distance data. For instance, such an imaging element may be or include one or more cameras. In some embodiments, the imaging element may include one or more telescopic or other long-focus lenses. In such embodiments, the lens(es) may be autofocused (e.g., via an autofocus mechanism that may utilize image recognition or like artificial intelligence in identifying utility lines) or manual focused (e.g., via manual focus controls that may be motorized and controlled at the pothole mapping apparatus or utility locator device including a pothole mapping apparatus). In some embodiments, the imaging element may employ high dynamic range (HDR) and/or other image stacking techniques. Further, in some embodiments, the imaging element may include a global shutter in scanning utility lines disposed in the pothole. In some embodiments, a plurality of images of the potholed utility line may be captured such that a three dimensional reconstruction of the utility lines may be generated. In some embodiments, the imaging element may be or include overlapping cameras to generate stereo optical images (e.g., which may be or include a stereo-optical ground tracking apparatus further used to tracking movement relative to the ground surface as disclosed in the incorporated applications). In some embodiments, the utility line and/or pothole environment may be illuminated via an illumination element having one or more lights. The pothole mapping apparatus may include a processing element having one or more processors to carry out methods associated with documenting mapped position and depths of potholed utility lines. A memory element may be included having one or more non-transitory memories to store instructions relating to methods associated with documenting mapped position and depths of the potholed utility lines and the resulting mapped utility line positions and depths. The potholing mapping apparatus may further having a housing element to encase electronics and other components associated with the pothole mapping apparatus and a power element for portioning of electrical power to the various powered elements. The power element may, for instance, be or include one or more batteries or other sources of electrical power.

In some embodiments, the potholing mapping apparatus of the present disclosure may further include a communication element to communicate data relating to the geolocation and depth of the potholed utility line(s) with one or more systems and devices for mapping utility lines. For instance, the communication element may be or include Bluetooth, Wi-Fi, ISM, or like communication apparatus. In some embodiments, the communication element may communicate data relating to the geolocation and depth of the potholed utility line(s) with one or more databases that includes mapped data of utility lines.

In some embodiments, the potholing mapping apparatus of the present disclosure may further include a display element to display images and associated data of the utility line or lines in the pothole. For instance, such a display element may be or include a graphical user interface. In some embodiments, the display element may display utility line images with a super imposed scale describing the dimensions of the utility lines(s).

In some embodiments, the potholing mapping apparatus of the present disclosure may be disposed in a utility locator device. The utility locator device may have one or more antennas and associated receiver circuitry to receive magnetic signals to determine and map utility line geolocations in the world frame. The utility line geolocations may be correlated with the data generated via the potholing mapping apparatus.

In another aspect, the present disclosure relates to a utility locator device including a pothole mapping apparatus. The utility locator device including a pothole mapping apparatus may include a locator subsystem including one or more antennas and associated receiver circuitry to receive magnetic signals emitted by one or more utility lines. The utility locator device including a pothole mapping apparatus may further include a pothole mapping apparatus having a positioning element to determine position data describing the geolocation in the world frame of the pothole mapping apparatus at the ground surface about a pothole, an orientation element to determine orientation data describing the direction, tilt, and pose of the pothole mapping apparatus in three dimensions that correlates with the position data, and a distance measuring element to determine distance data describing the distance between the pothole mapping apparatus and one or more utility lines in a pothole correlating with the position data and orientation data. The positioning element may, for instance, be or include one or more global navigation satellite system (GNSS) receivers (GPS, Galileo, GLONASS, BeiDou, or the like), inertial sensors (e.g., accelerometers, gyroscopic sensors, and/or other motion sensing devices), ground tracking apparatus for optically or mechanically determining movement, or the like. The orientation element may be or include one or more, gyroscopic sensors, inclinometers, magnetometers, or other sensors and apparatus for determining orientation in three dimensions. The distance measuring device may be or include a laser rangefinder which may be a multi-spectral laser rangefinder. Likewise, the distance measuring device may include one or more other rangefinders (e.g., optical rangefinders or other types of rangefinders). An imaging element may be included in the utility locator device including a pothole mapping apparatus to generate images of the one or more utility lines in the pothole and surrounding area correlated with position data, orientation data, and distance data. For instance, such an imaging element may be or include one or more cameras. In some embodiments, the imaging element may include one or more telescopic or other long-focus lenses. In such embodiments, the lens(es) may be autofocused (e.g., via an autofocus mechanism that may utilize image recognition or like artificial intelligence in identifying utility lines) or manual focused (e.g., via manual focus controls that may be motorized and controlled at the pothole mapping apparatus or utility locator device including a pothole mapping apparatus). In some embodiments, the imaging element may employ high dynamic range (HDR) and/or other image stacking techniques. Further, in some embodiments, the imaging element may include a global shutter in scanning utility lines disposed in the pothole. In some embodiments, a plurality of images of the potholed utility line may be captured such that a three-dimensional reconstruction of the utility lines may be generated. In some embodiments, the imaging element may be or include overlapping cameras to generate stereo optical images (e.g., which may be or include a stereo-optical ground tracking apparatus further used to tracking movement relative to the ground surface). The utility locator device including a pothole mapping apparatus may include a processing element having one or more processors to carry out methods associated with documenting mapped position and depths of potholed utility line(s) and determining, via magnetic signals, the positions and orientation of the same utility line(s). A memory element may further be included having one or more non-transitory memories to store instructions relating to methods associated with documenting mapped position and depths of potholed utility line(s) and the resulting mapped utility line position(s) and depth(s). The utility locator device including a pothole mapping apparatus may further include a housing element to encase electronics and other components associated with the utility locator device including a pothole mapping apparatus and a power element for portioning of electrical power to the various powered elements. Further, the utility locator device including a pothole mapping apparatus may include a communication element to communicate data relating to the geolocation and depth of the potholed utility line(s) with one or more databases, systems, and devices for utility line mapping.

In some embodiments, the utility locator device may include a pothole mapping apparatus of the present disclosure may further include an imaging element to generate images of the one or more utility lines in the pothole and surrounding area correlated with position data, orientation data, and distance data. For instance, such an imaging element may be or include one or more cameras (e.g., which may be or include a stereo-optical ground tracking apparatus further used to tracking movement relative to the ground surface as disclosed in the incorporated applications). In some embodiments, the imaging element may include one or more telescopic or other long-focus lenses. In such embodiments, the lens(es) may be autofocused (e.g., via an autofocus mechanism that may utilize image recognition or like artificial intelligence in identifying utility lines) or manual focused (e.g., via manual focus controls that may be motorized and controlled at the pothole mapping apparatus or utility locator device including a pothole mapping apparatus). In some embodiments, the imaging element may employ high dynamic range (HDR) and/or other image stacking techniques. Further, in some embodiments, the imaging element may include a global shutter in scanning utility line disposed in the pothole.

In some embodiments, the utility locator device including a pothole mapping apparatus of the present disclosure may further include a communication element to communicate data relating to the geolocation and depth of the potholed utility line(s) with one or more systems and devices for mapping utility lines. For instance, the communication element may be or include Bluetooth, Wi-Fi, ISM, or like communication apparatus. In some embodiments, the communication element may communicate data relating to the geolocation and depth of the potholed utility line(s) with one or more databases that includes mapped data of utility lines.

In some embodiments, the utility locator device including a pothole mapping apparatus of the present disclosure may further include a display element to display images and associated data of the utility line or lines in the pothole. For instance, such a display element may be or include a graphical user interface. In some embodiments, the display element may display utility line images with a super imposed scale describing the dimensions and orientation of the utility lines(s).

In some embodiments, the utility locator device including a pothole mapping apparatus of the present disclosure may be configured to be held at various tilt angles for scanning of a utility line or lines in a pothole. For instance, a utility locator device may have adjustable legs or an adjustable head to be held at different tilt angles. Likewise, a user may tilt a utility locator device including a pothole mapping apparatus of the present disclosure and a tilt indicator on a display element may alert the user to hold at various tilt angles.

In another aspect, the present disclosure relates to a utility locating and pothole mapping system. The utility locating and pothole mapping system may have one or more utility locator devices having one or more antennas and associated receiver circuitry to receive magnetic signals to determine and map utility lines in the world frame and one or more pothole mapping apparatuses that may determine the geolocation on potholed utility lines in the world frame and depth of the utility line or lines relative to the ground surface. In some embodiments, the pothole mapping apparatus is incorporated in the utility locator device. The utility locating and pothole mapping system may further include a database element communicatively coupled with the utility locator device and pothole mapping apparatus in incorporating mapped utility line geolocations and potholed utility line geolocations and depths. In some embodiments, the database element may include one or more remote servers. Some system embodiments may further include one or more electronic marking devices disposed in a known position relative to the utility in the pothole configured to broadcast signals that may be sensed at the utility locator device and/or a transmitter device configured to couple magnetic signals onto utility lines that may also be sensed at the utility locator device.

In another aspect, the present disclosure relates to a pothole mapping method for mapping potholes and one or more associated utility lines. The pothole mapping method may include determining, via a pothole mapping apparatus, position data describing the geolocation position of the pothole mapping apparatus in the world frame at the ground surface about a pothole. The pothole mapping method may further include determining, via a pothole mapping apparatus, orientation data of the pothole mapping apparatus in three dimensions correlating with position data. For instance, such orientation data may describe the tilt, pose, direction, or other orientation information of the pothole mapping apparatus in the world frame. The pothole mapping method may further include determining, via a pothole mapping apparatus, distance data describing the distance between the pothole mapping apparatus and one or more utility lines in a pothole. The distance data may correlate with the position data of the pothole mapping apparatus in the world frame. The pothole mapping method may further include determining, via a processing element, pothole mapping data describing the position of the utility line(s) in the pothole and the orientation of the utility line(s) describing the direction, tilt, and pose of the utility line(s). The pothole mapping method may further include storing, in a memory element having one or more non-transitory memories, mapped potholes and associated utility line position(s) and orientation(s).

In some method embodiments, the pothole mapping data may further be communicated with one or more systems, databases, and devices for mapping utility lines. For instance, the mapped utility line positions, orientations, and depth may be communicated to a database of other mapped potholes and other utility line mapping data (e.g., utility line positions and orientations and depths, utility line types, and the like).

In some method embodiments, the method may include generating one or more images of the utility line(s) in the pothole and surrounding environment. In some such embodiments, the scale of the dimensions of the utility lines(s) from the images of the utility line(s) may be superimposed on the display element. Further, such images and associated data generated via the pothole mapping apparatus may be shown on a display (e.g., graphical user interface or the like). Likewise, the distance data to the targeted utility may be illustrated on the display. In some such embodiments, images may be taken at different tilt angles. The images generated at different tilt angles may further be used to generate three dimensional model(s) of the one or more utility lines.

In some method embodiments, the utility line(s) targeted by a pothole mapping apparatus is verified against data regarding the utility line or utility lines determined via magnetic signals via a utility locator device. For instance, the method may include steps to verify that the pothole mapping apparatus has targeted the correct utility line or lines.

In some method embodiments, the distance data to the utility or utilities determined by the pothole mapping apparatus is compared against the depth of the same utility or utilities determined via magnetic signals received at a locator subsystem having one or more antennas and associated receiver circuitry to receive magnetic signal at a utility locator device. The method may further include steps to correct the distance data determined via magnetic signals at the utility locator device via the pothole mapping apparatus data.

In another aspect, the present disclosure relates to a utility line depth verification method. The utility line depth verification method may include determining, via a pothole mapping apparatus, orientation data of the pothole mapping apparatus in three dimensions correlating with position data and determining, via a pothole mapping apparatus, distance data describing the distance between the pothole mapping apparatus at the ground surface and one or more utility lines in a pothole correlating with the position data and orientation data. The depth of the one or more utility lines exposed in the pothole may be calculated via a processing element having one or more processors. The utility line depth verification method may further include receiving, via a locator subsystem, magnetic signals from the utility line(s) and receiving, via a locator subsystem, magnetic signals from the same utility line(s). The depth of the same utility line(s) via the magnetic signals is determined via a processing element having one or more processors. Depth measurements and calculated differences in depth measurements may be stored in a memory element having one or more non-transitory memories.

Some method embodiments may further include receiving magnetic data from one or more electronic marker devices disposed in a known position relative to the utility line(s) in the pothole at a utility locator device. In such embodiments, depth verification may be based off the electronic marker device detected at the utility locator device and the pothole mapping apparatus.

In some method embodiments, the method may include communicating data to a remote database for carrying out steps relating to comparing depth calculations.

In another aspect, the present disclosure relates to a method of providing Training Data that includes Locating Data and Potholing Data to a Neural Network to use Deep Learning/artificial intelligence to recognize patterns and make predictions related to underground utilities. The method includes collecting Locating Data describing the positions and depths of utility lines in the ground from electromagnetic signals via a utility locator device and collecting Potholing Data from identifiable characteristics revealed when a utility line is exposed in a pothole via a potholing mapping apparatus of the present invention. In a further step, the method includes assembling a Training Database that includes Locating Data and Potholing Data. Further still, the method includes steps using deep learning to train a Neural Network (Artificial Intelligence/AI) via the Training Database Data and then using AI to generate predictions regarding the positions of utility lines and utility line characteristics. The method further includes outputting predictions regarding the positions of utility lines and utility line characteristics.

The Training Database may include, but is not limited to, electromagnetic signal data, images of the utility line(s) and potholes, measurements of the depth of the utility line(s), geospatial data regarding the utility locator device and utility lines and potholes, asset tagging data, utility line types, utility line dimensions, utility line material data, scans of the utility lines, data regarding defects or other problems in the utility lines, user input data, and/or other data.

The disclosures herein may be combined in various embodiments with the disclosures in co-assigned patents and patent applications including: U.S. Pat. No. 5,808,239, issued Aug. 17, 1999, entitled VIDEO PUSH-CABLE; U.S. Pat. No. 6,545,704, issued Jul. 7, 1999, entitled VIDEO PIPE INSPECTION DISTANCE MEASURING SYSTEM; U.S. Pat. No. 6,831,679, issued Dec. 14, 2004, entitled VIDEO CAMERA HEAD WITH THERMAL FEEDBACK LIGHTING CONTROL; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 6,862,945, issued Mar. 8, 2005, entitled CAMERA GUIDE FOR VIDEO PIPE INSPECTION SYSTEM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued January 4,2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,151, issued Jun. 28, 2011, entitled PREAMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 8,289,385, issued Oct. 16, 2012, entitled PUSH-CABLE FOR PIPE INSPECTION SYSTEM; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. Pat. No. 8,587,648, issued Nov. 19, 2013, entitled SELF-LEVELING CAMERA HEAD; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 8,841,912, issued Sep. 23, 2014, entitled PREAMPLIFIER AND MIXER CIRCUITRY FOR A LOCATOR ANTENNA; U.S. Pat. No. 8,908,027, issued Dec. 9, 2014, entitled ASYMMETRIC DRAG FORCE BEARING FOR USE WITH A PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. Pat. No. 8,984,698, issued Mar. 24, 2015, entitled LIGHT WEIGHT SEWER CABLE; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. Pat. No. 9,081,109, issued Jul. 14, 2015, entitled GROUND-TRACKING DEVICES FOR USE WITH A MAPPING LOCATOR; U.S. Pat. No. 9,080,992, issued Jul. 14, 2015, entitled ADJUSTABLE VARIABLE RESOLUTION INSPECTION SYSTEMS AND METHODS; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,222,809, issued Dec. 29, 2015, entitled PORTABLE PIPE INSPECTION SYSTEMS AND APPARATUS; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued October 18,2016, entitled PIPE INSPECTION SYSTEM WITH JETTER PUSH-CABLE; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,521,303, issued Dec. 13, 2016, entitled CABLE STORAGE DRUM WITH MOVABLE CCU DOCKING APPARATUS; U.S. patent application Ser. No. 15/846,102, filed December 16,2016, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2017, entitled TRACKABLE DISTANCE MEASURING DEVICES, SYSTEMS, AND METHODS; U.S. Pat. No. 9,927,368, issued Mar. 27, 2021, entitled SELF-LEVELING INSPECTION SYSTEMS AND METHODS; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); United States Patent Application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; United States Patent Application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,769,366, issued Sep. 29, 2017, entitled SELF-GROUNDING TRANSMITTER PORTABLE CAMERA CONTROLLER FOR USE WITH PIPE INSPECTION SYSTEMS; U.S. Pat. No. 9,784,837, issued Oct. 10, 2017, entitled OPTICAL GROUND TRACKING APPARATUS, SYSTEMS & METHODS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND-TRACKING APPARATUS, SYSTEMS, AND METHODS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. patent application Ser. No. 16/255,524, filed Jan. 23, 2018, entitled RECHARGEABLE BATTERY PACK ONBOARD CHARGE STATE INDICATION METHODS AND APPARATUS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 2018, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 16/382,136, filed Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORTHOGONAL ANTENNAE; U.S. patent application Ser. No. 16/443,789, filed Jun. 18, 2018, entitled MULTI-DIELECTRIC COAXIAL PUSH-CABLES AND ASSOCIATED APPARATUS; U.S. Pat. No. 10,001,425, issued Jun. 19, 2018, entitled PORTABLE CAMERA CONTROLLER PLATFORM FOR USE WITH PIPE INSPECTION SYSTEM; U.S. Pat. No. 10,009,582, issued Jun. 26, 2018, entitled PIPE INSPECTION SYSTEM WITH REPLACEABLE CABLE STORAGE DRUM; U.S. patent application Ser. No. 16/036,713, issued Jul. 16, 2018, entitled UTILITY LOCATOR APPARATUS AND SYSTEMS; U.S. Pat. No. 10,027,526, issued Jul. 17, 2018, entitled METHOD AND APPARATUS FOR HIGH-SPEED DATA TRANSFER EMPLOYING SELF-SYNCHRONIZING QUADRATURE AMPLITUDE MODULATION; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. Pat. No. 10,100,507, issued October 16,2018, entitled PIPE CLEARING CABLES AND APPARATUS; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. patent application Ser. No. 16/810,788, filed Mar. 5, 2019, entitled MAGNETICALLY RETAINED DEVICE HANDLES; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. Pat. No. 10,288,997, issued May 14, 2019, entitled ROTATING CONTACT ASSEMBLIES FOR SELF-LEVELING CAMERA HEADS; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. Pat. No. 10,371,305, issued Aug. 6, 2019, entitled DOCKABLE TRIPODAL CAMERA CONTROL UNIT; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520, 248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. patent application Ser. No. 16/559,576, filed Sep. 3, 2019, entitled VIDEO PIPE INSPECTION SYSTEMS WITH VIDEO INTEGRATED WITH ADDITIONAL SENSOR DATA; U.S. patent application Ser. No. 16/588,834, filed Sep. 30, 2019, entitled VIDEO INSPECTION SYSTEM WITH WIRELESS ENABLED CABLE STORAGE DRUM; U.S. Pat. No. 10,440,332, issued Oct. 8, 2019, entitled INSPECTION CAMERA DEVICES AND METHODS WITH SELECTIVELY ILLUMINATED MULTISENSOR IMAGING; U.S. patent application Ser. No. 16/676, 292, filed Nov. 6, 2019, entitled ROBUST IMPEDANCE CONTROLLED SLIP RINGS; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780, 813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/827,672, filed Mar. 23, 2020, entitled DUAL ANTENNA SYSTEMS WITH VARIABLE POLARIZATION; U.S. patent application Ser. No. 16/833, 426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837, 923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS;

U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. Provisional Patent Application 63/212,713, filed Jun. 20, 2021, entitled DAYLIGHT VISIBLE AND MULTI-SPECTRAL LASER RANGEFINDER AND ASSOCIATED METHODS AND UTILITY LOCATOR DEVICES; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 17/397,940, filed Aug. 9, 2021, entitled INSPECTION SYSTEM PUSH-CABLE GUIDE APPARATUS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. Pat. No. 10,764,541, issued Sep. 1, 2020, entitled COAXIAL VIDEO PUSH-CABLES FOR USE IN INSPECTION SYSTEMS; U.S. patent application Ser. No. 17/013,831, filed Sep. 7, 2020, entitled MULTIFUNCTION BURIED UTILITY LOCATING CLIPS; U.S. patent application Ser. No. 17/014,646, filed Sep. 8, 2020, entitled INTEGRATED FLEX-SHAFT CAMERA SYSTEM AND HAND CONTROL; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Pat. No. 10,809,408, issued Oct. 20, 2020, entitled DUAL SENSED LOCATING SYSTEMS AND METHODS; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,848,655, issued Nov. 24, 2020, entitled HEAT EXTRACTION ARCHITECTURE FOR COMPACT VIDEO CAMERA HEADS; U.S. patent application Ser. No. 17/110,273, filed Dec. 2, 2020, entitled INTEGRAL DUAL CLEANER CAMERA DRUM SYSTEMS AND METHODS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; U.S. patent application Ser. No. 17/190,400, filed Mar. 3, 2021, entitled DOCKABLE CAMERA REEL AND CCU SYSTEM; U.S. Pat. No. 10,955,583, issued Mar. 23, 2021, entitled BORING INSPECTION SYSTEMS AND METHODS; U.S. Pat. No. 9,927,368, issued Mar. 27, 2021, entitled SELF-LEVELING INSPECTION SYSTEMS AND METHODS; U.S. Pat. No. 10,976,462, issued Apr. 13, 2021, entitled VIDEO INSPECTION SYSTEMS WITH PERSONAL COMMUNICATION DEVICE USER INTERFACES; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. patent application Ser. No. 17/528,956, filed Nov. 17, 2021, entitled VIDEO INSPECTION SYSTEM, APPARATUS, AND METHODS WITH RELAY MODULES AND CONNECTION PORT; U.S. patent application Ser. No. 17/541,057, filed Dec. 2, 2021, entitled COLOR-INDEPENDENT MARKER DEVICE APPARATUS, METHODS, AND SYSTEMS; U.S. patent application Ser. No. 17/541,057, filed Dec. 2, 2021, entitled VIDEO INSPECTION SYSTEM, APPARATUS, AND METHODS WITH RELAY MODULES AND CONNECTION PORTCOLOR-INDEPENDENT MARKER DEVICE APPARATUS, METHODS, AND SYSTEMS; U.S. Pat. No. 11,193,767, issued Dec. 7, 2021, entitled SMART PAINT STICK DEVICES AND METHODS; U.S. Pat. No. 11,199,510, issued Dec. 14, 2021, entitled PIPE INSPECTION AND CLEANING APPARATUS AND SYSTEMS; U.S. Provisional Patent Application 63/293,828, filed Dec. 26, 2021, entitled MODULAR BATTERY SYSTEMS INCLUDING INTERCHANGEABLE BATTERY INTERFACE APPARATUS; U.S. Pat. No. 11,209,115, issued Dec. 28, 2021, entitled PIPE INSPECTION AND/OR MAPPING CAMERA HEADS, SYSTEMS, AND METHODS; U.S. patent application Ser. No. 17/563,049, filed Dec. 28, 2021, entitled SONDE DEVICES WITH A SECTIONAL FERRITE CORE; U.S. Provisional Patent Application 63/306,088, filed Feb. 2, 2022, entitled UTILITY LOCATING SYSTEMS AND METHODS WITH FILTER TUNING FOR POWER GRID FLUCTUATIONS; U.S. patent application Ser. No. 17/687,538, filed Mar. 4, 2022, entitled ANTENNAS, MULTI-ANTENNA APPARATUS, AND ANTENNA HOUSINGS; U.S. Pat. No. 11,280,934, issued Mar. 22, 2022, entitled ELECTROMAGNETIC MARKER DEVICES FOR BURIED OR HIDDEN USE; U.S. Pat. No. 11,300,597, issued Apr. 12, 2022, entitled SYSTEMS AND METHODS FOR LOCATING AND/OR MAPPING BURIED UTILITIES USING VEHICLE-MOUNTED LOCATING DEVICES; MODULAR BATTERY SYSTEMS INCLUDING INTERCHANGEABLE BATTERY INTERFACE APPARATUS; U.S. patent application Ser. No. 18/162,663, filed Jan. 31, 2023, entitled UTILITY LOCATING SYSTEMS AND METHODS WITH FILTER TUNING FOR POWER GRID FLUCTUATIONS; U.S. Provisional Patent Application 63/485,905, filed Feb. 18, 2023, entitled SYSTEMS AND METHODS FOR INSPECTION ANIMATION; U.S. Provisional Patent Application 63/492,473, filed Mar. 27, 2023, entitled VIDEO INSPECTION AND CAMERA HEAD TRACKING SYSTEMS AND METHODS; U.S. Pat. No. 11,614,613, issued Mar. 28, 2023, entitled DOCKABLE CAMERA REEL AND CCU SYSTEM; U.S. Pat. No. 11,649,917, issued May 16, 2023, entitled INTEGRATED FLEX-SHAFT CAMERA SYSTEM WITH HAND CONTROL; U.S. Pat. No. 11,665,321, issued May 30, 2023, entitled PIPE INSPECTION SYSTEM WITH REPLACEABLE CABLE STORAGE DRUM; U.S. Pat. No. 11,674,906, issued Jun. 13, 2023, entitled SELF-LEVELING INSPECTION SYSTEMS AND METHODS; U.S. Provisional Patent Application 63/510,014, filed Jun. 23, 2023, entitled INNER DRUM MODULE WITH PUSH-CABLE INTERFACE FOR PIPE INSPECTION; U.S. Pat. No. 11,686,878, issued Jun. 27, 2023, entitled ELECTRONIC MARKER DEVICES FOR BURIED OR HIDDEN USE; U.S. Provisional Patent Application 63/524,698, filed Jul. 2, 2023, entitled FILTERING METHODS AND ASSOCIATED UTILITY LOCATOR DEVICES FOR LOCATING AND MAPPING BURIED UTILITY LINES; U.S. Provisional Patent Application 63/514,090, filed Jul. 17, 2023, entitled SMARTPHONE MAPPING APPARATUS FOR ASSET TAGGING AS USED WITH UTILITY LOCATOR DEVICES; U.S. Pat. No. 11,709,289, issued Jul. 25, 2023, entitled SONDE DEVICES WITH A SECTIONAL FERRITE CORE; U.S. patent application Ser. No. 18/365,225, filed Aug. 3, 2023, entitled SYSTEMS AND METHODS FOR INSPECTION ANIMATION; U.S. Pat. No. 11,719,376, issued Aug. 8, 2023, entitled DOCKABLE TRIPODAL CAMERA CONTROL UNIT; U.S. Pat. No. 11,719,646, issued Aug. 8, 2023, entitled PIPE MAPPING SYSTEMS AND METHODS; U.S. Pat. No. 11,719,846, issued Aug. 8, 2023, entitled BURIED UTILITY LOCATING SYSTEMS WITH WIRELESS DATA COMMUNICATION INCLUDING DETERMINATION OF CROSS COUPLING TO ADJACENT UTILITIES; U.S. patent application Ser. No. 18/233,285, filed Aug. 11, 2023, entitled BURIED OBJECT LOCATOR; U.S. patent application Ser. No. 18/236,786, filed Aug. 22, 2023, entitled MAGNETIC UTILITY LOCATOR DEVICES AND METHODS; U.S. Pat. No. 11,747,505, issued Sep. 5, 2023, entitled MAGNETIC UTILITY LOCATOR DEVICES AND METHODS; U.S. patent application Ser. No. 18/368,510, filed Sep. 14, 2023, entitled MULTIFUNCTION BURIED UTILITY LOCATING CLIPS; U.S. patent application Ser. No. 18/365,203, filed Sep. 14, 2023, entitled SYSTEMS AND METHODS FOR ELECTRONICALLY MARKING, LOCATING AND VIRTUALLY DISPLAYING BURIED UTILITIES; U.S. Pat. No. 11,768,308, issued Sep. 26, 2023, entitled SYSTEMS AND METHODS FOR ELECTRONICALLY MARKING, LOCATING AND VIRTUALLY DISPLAYING BURIED UTILITIES; U.S. Pat. No. 11,769,956, issued Sep. 26, 2023, entitled MULTIFUNCTION BURIED UTILITY LOCATING CLIPS; U.S. Pat. No. 11,782,179, issued Oct. 10, 2023, entitled BURIED OBJECT LOCATOR WITH DODECAHEDRAL ANTENNA CONFIGURATION APPARATUS AND METHODS; U.S. Pat. No. 11,789,093, issued Oct. 17, 2023, entitled THREE-AXIS MEASUREMENT MODULES AND SENSING METHODS; and U.S. Pat. No. 11,796,707, issued Oct. 24, 2023, entitled USER INTERFACES FOR UTILITY LOCATORS. The content of each of the above-described patents and applications is incorporated by reference herein in its entirety. The above applications may be collectively denoted herein as the "co-assigned applications" or "incorporated applications."

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure. As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Various additional aspects, features, and functionality are further described below in conjunction with the appended Drawings.

Terminology

As used herein, the term "pothole" may refer to a hole vertically bored into the ground that may generally be probative in nature in an attempt to find one or more utility lines that may otherwise be buried underground to prevent striking and damaging the utility line(s). Potholing operations may use various devices configured to generate potholes. For instance, some other prior art potholing systems may dispense pressurized water or other fluids, pressurized air, or the like in exposing the utility line(s). Commonly, such potholing operations may use hydro-excavation system to spray pressurized water in liquefying soil and creating a slurry that may be extracted via a vacuum. Likewise, hand digging or other techniques may be considered potholing. The term "potholed utility" may generally refer to an exposed utility line disposed in a pothole.

The "utility locator devices" of the present disclosure may, for instance, be positioned above or about a pothole exposing one or more utility lines. The utility locator devices may measure magnetic signals emitted by the one or more utility lines in order to determine the positions of and map utility lines. In some systems, a "utility locating transmitter" may be used to couple current onto one or more utility lines for the purpose of generating the magnetic signals. Likewise, some systems and methods may include the use of "electronic marker devices" in a known position relative to the one or more utility lines configured to broadcast a signal when powered that may be measured at utility locator devices to determine the positions of and map the associated utility lines. Additional disclosure regarding utility locator devices and utility locating transmitters may be found in the incorporated patents and patent applications herein.

The term "GNSS" (global navigation satellite system) refers to any satellite navigation systems including, but not limited to, global positioning system (GPS), global navigation satellite system (GLONASS), BeiDou (BDS), Quasi- Zenith Satellite Systems (QZSS), and Galileo. The GNSS devices, systems, and methods described herein may operate on both the lower L-band and upper-L band that may include the L1, L2, and L5 bands. The GNSS devices and methods described herein may further include precise point positioning real time kinematics (PPP-RTK), state space representation (SSR), and/or other like corrections.

Example Embodiments

Turning to FIG. 1, a prior art hydro-excavation potholing system 100 is illustrated. The potholing system 100 may use pressurized water dispensed from a water sprayer 110 to liquefying the soil in creating a slurry that may be extracted via a vacuum hose 120 in creating a pothole 130. The pothole 130 may be formed to probe the ground in finding one or more utility lines, such as a pipe 140, for the purpose of locating utility lines and/or allowing access for repair or maintenance. The potholing system 100 may include a vehicle 150 for storing water dispensed through the water sprayer 110 and the slurry extracted via the vacuum 120. Where the prior art potholing system 100 is illustrated as a hydro-excavation system, it should be noted that there are various other technologies or types of potholing systems. For instance, some other prior art potholing systems may utilize other fluids, pressurized air, hand digging, or other techniques and devices for digging potholes.

A vast number of probative potholes may be dug every year by potholing systems such as the potholing system 100 in order to expose utility lines that would otherwise be buried beneath the ground surface. Known prior art systems and operations may fail to take advantage of the various opportunities presented by the ground truth available in exposing utility lines via potholing both in terms of documenting and mapping the utility line data as well as various applications employing the resulting data.

Figure 2A:
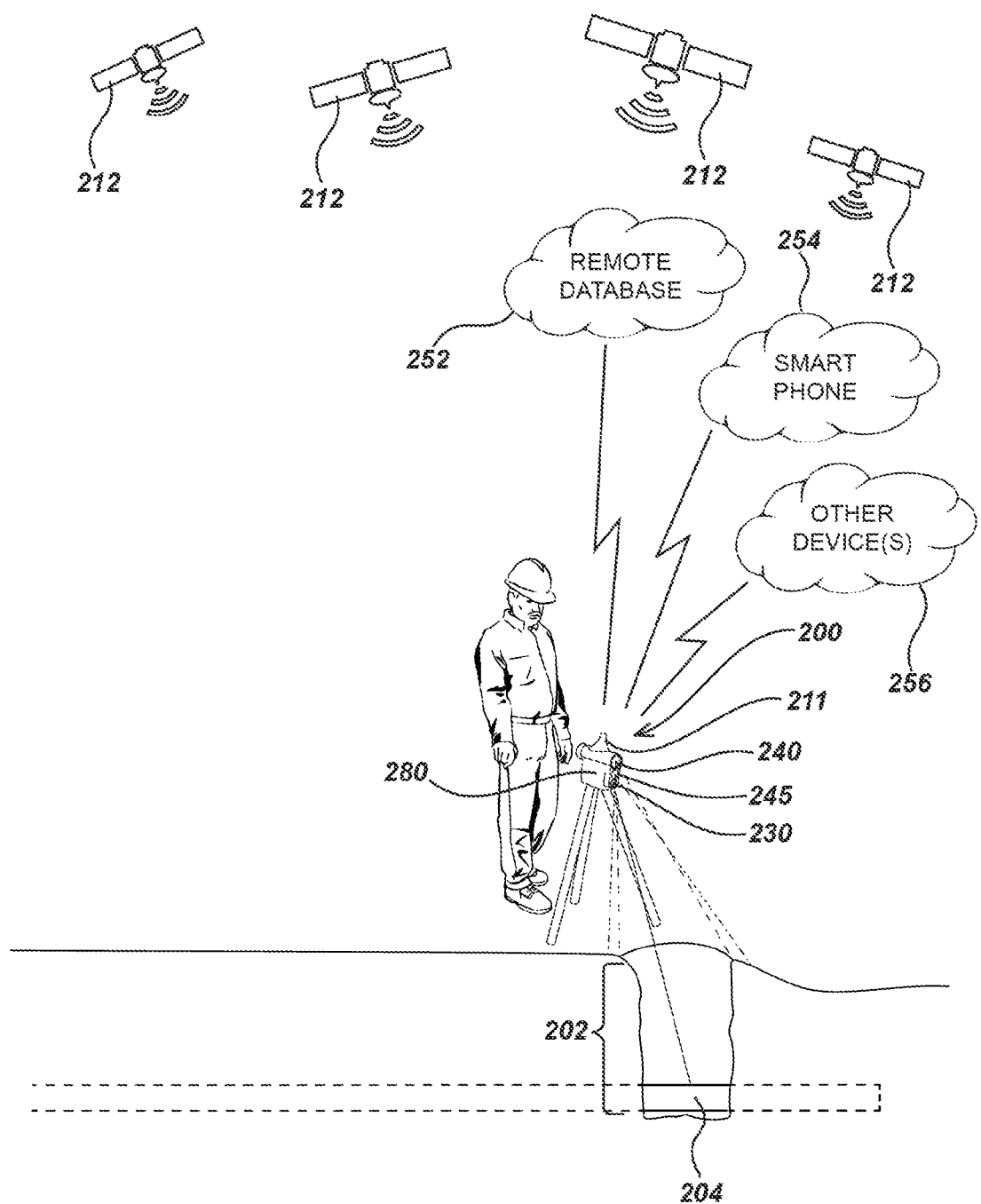
FIG. 2A is an illustration of an embodiment of pothole mapping apparatus in keeping with aspects of the present disclosure.
Figure 2B:
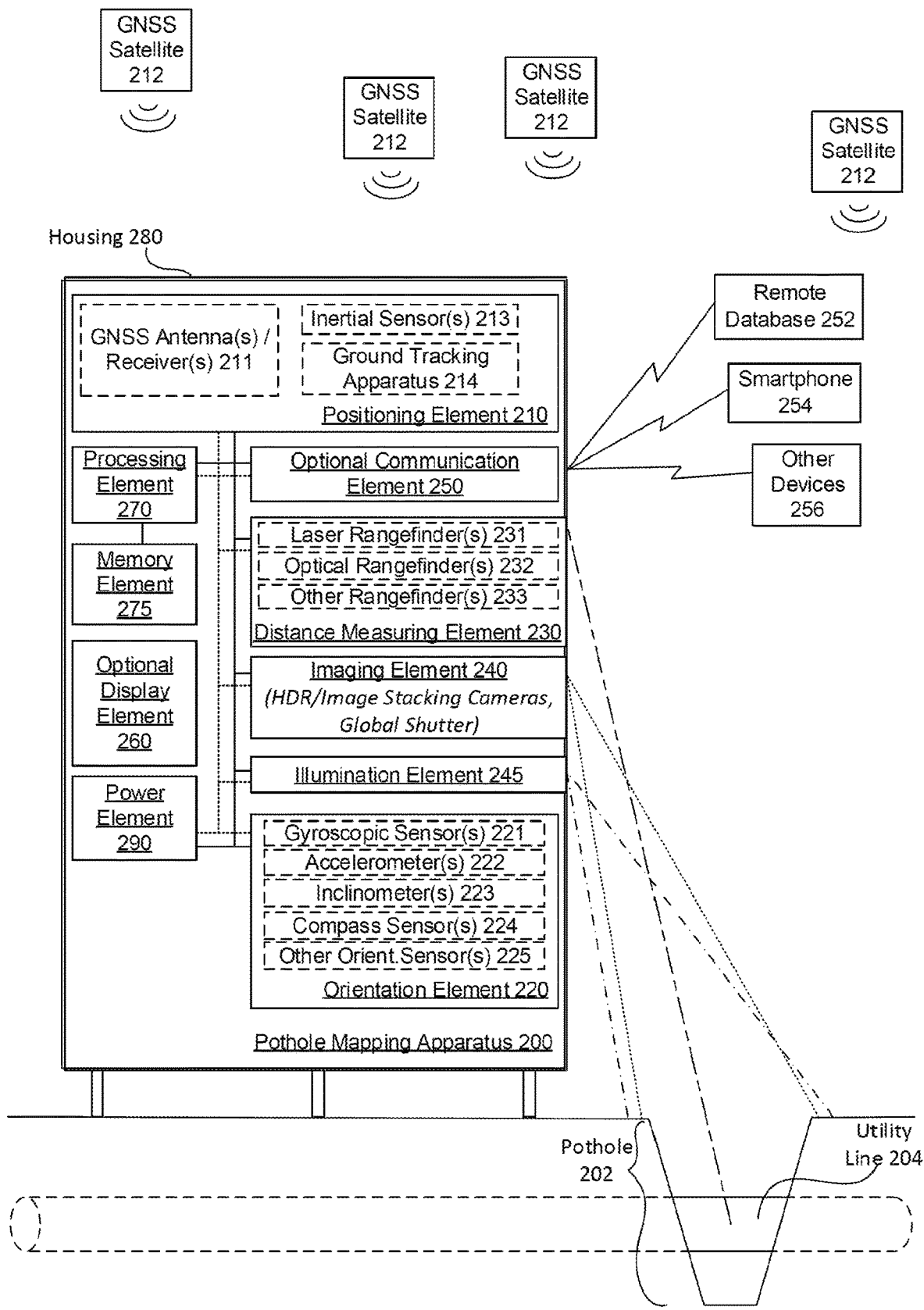
FIG. 2B is a diagram of the pothole mapping apparatus embodiment of FIG. 2A.

Turning to FIGS. 2A and 2B, a pothole mapping apparatus 200 in keeping with the present disclosure is illustrated. The pothole mapping apparatus 200 may include a positioning element 210 (FIG. 2B) to determine position data describing the geolocation of the pothole mapping apparatus in the world frame as it is positioned at the ground surface about a pothole 202. The positioning element 210 (FIG. 2B) may, for instance, be or include one or more global navigation satellite system (GNSS) receivers/antennas 211 (e.g., GPS, Galileo, GLONASS, BeiDou, or the like) to receive signals from a plurality of GNSS satellites 212. The GNSS receivers/antennas 211 may be or share aspects with the GNSS devices, systems, and methods disclosed the U.S. patent application Ser. No. 17/241,676, filed Apr. 27, 2021, entitled SPATIALLY AND PROCESSING-BASED DIVERSE REDUNDANCY FOR RTK POSITIONING OR OTHER POSITIONING SYSTEMS AND METHODS; U.S. patent application Ser. No. 17/461,833, filed Aug. 30, 2021, entitled COMBINED SATELLITE NAVIGATION AND RADIO TRANSCEIVER ANTENNA DEVICES; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; and other such system, devices, and methods disclosed in the incorporated applications.

Turning to FIG. 2B, the positioning element 200 may further include one or more inertial sensors 213 which may include, but should not be limited to, one or more accelerometers, gyroscopic sensors, inertial navigation systems (INS) and/or other like sensors for tracking movement. The positioning element 200 may further include one or more ground tracking apparatuses 214 such as those configured to optically or mechanically track movements relative to the ground surface. The ground tracking apparatuses 214 may be or share aspects with those disclosed in U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 11,366,245, issued Jun. 21, 2022, entitled BURIED UTILITY LOCATOR GROUND TRACKING APPARATUS, SYSTEMS, AND METHODS; and other devices disclosed in the incorporated applications.

Still referring to FIG. 2B, the pothole mapping apparatus 200 may include an orientation element 220 to determine orientation data describing the direction, tilt, and pose of the pothole mapping apparatus in three dimensions. The orientation data may correlate with the position data determined by the positioning element 210. The orientation element 220 may include, but should not be limited to, one or more gyroscopic sensors 221, accelerometers 222, inclinometers 223, compass sensors 224, and/or other orientation sensors 225.

Referring back to FIGS. 2A and 2B, the pothole mapping apparatus 200 may include a distance measuring element 230 to determine distance data describing the distance between the pothole mapping apparatus 200 and one or more utility lines, such as a utility line 204, in the pothole 202. The distance data may correlate with the position data determined by the positioning element 210 (FIG. 2B) and the orientation data determined by the orientation element 220 (FIG. 2B).

As best illustrated in FIG. 2B, the distance measuring element 230 may include one or more laser rangefinders 231. In some such embodiments, the laser rangefinders 231 may be or share aspects with the devices and apparatuses disclosed in U.S. patent application Ser. No. 15/866,360, filed Jan. 9, 2018, entitled TRACKED DISTANCE MEASURING DEVICES, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Pat. No. 11,397,274, issued Jul. 26, 2022, entitled TRACKED DISTANCE MEASURING DEVICES, SYSTEMS, AND METHODS; U.S. Provisional Patent Application 63/514,090, filed Jul. 17, 2023, entitled SMARTPHONE MOUNTING APPARATUS FOR ASSET TAGGING AS USED WITH UTILITY LOCATOR DEVICES; and other devices disclosed in the incorporated applications. In some embodiments, the distance measuring element 230 may further or instead include one or more optical rangefinders 232 and/or other rangefinders 233.

Referring back to FIGS. 2A and 2B, the pothole mapping apparatus 200 may further include an imaging element 240 having one or more cameras. The one or more cameras of the imaging element 240 may be configured to generate images of the one or more utility lines, such as the utility line 204 disposed in the pothole 202 and the surrounding area of the pothole 202 that may optionally be illuminated by an illumination element 245 having one or more lights. The images may further be correlated with the position data determined via the positioning element 210, the orientation data determined via the orientation element 220, and the distance data determined via the distance measuring element 230.

As shown in FIG. 2B, the one or more cameras of the imaging element 240 may be a high dynamic range (HDR) imager and/or imager utilizing other image stacking techniques. Further, in some embodiments, the one or more cameras of the imaging element 240 may include a global shutter in scanning the pothole 202. In some embodiments, the pothole mapping apparatus 200 may be configured to tilt at various tilt angles in scanning and generating images of the utility line or lines. In some embodiments, the imaging element may multiple cameras having overlapping cameras to generate stereo optical images (e.g., the pipe mapping apparatus 1000 of FIG. 10 or the utility locator device 1120 of FIGS. 11A and 11B). In some such embodiments, the multiple cameras may be a stereo-optical ground tracking apparatus disclosed in U.S. Pat. No. 9,928,613, issued Mar. 27, 2018, entitled GROUND TRACKING APPARATUS, SYSTEMS, AND METHODS; U.S. Pat. No. 11,336,245, issued Jun. 21, 2022, entitled GROUND TRACKING APPARATUS, SYSTEMS, AND METHODS; and other such apparatuses of the incorporated applications. Likewise, in some embodiments, the imaging element may include one or more telescopic or other long-focus lenses (e.g., the pipe mapping apparatus 1300 of FIG. 13 or the utility locator devices 1420 of FIGS. 14A and 14B). In such embodiments, the lens(es) may be autofocused (e.g., via an autofocus mechanism that may utilize image recognition or like artificial intelligence in identifying utility lines) or manual focused (e.g., via manual focus controls that may be motorized and controlled at the pothole mapping apparatus or utility locator device including a pothole mapping apparatus).

Figure 3:
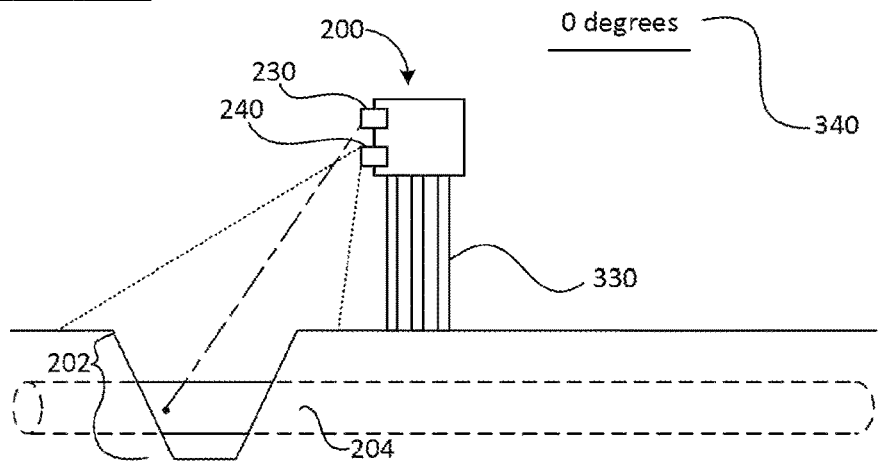
FIG. 3 is an illustration demonstrating an embodiment of scanning of a potholed utility line using different tilt angles.
Figure 3:
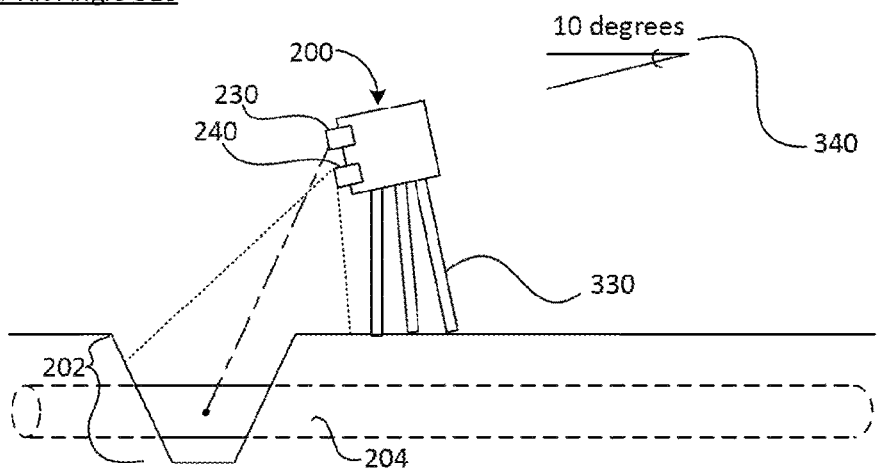
Figure 3:
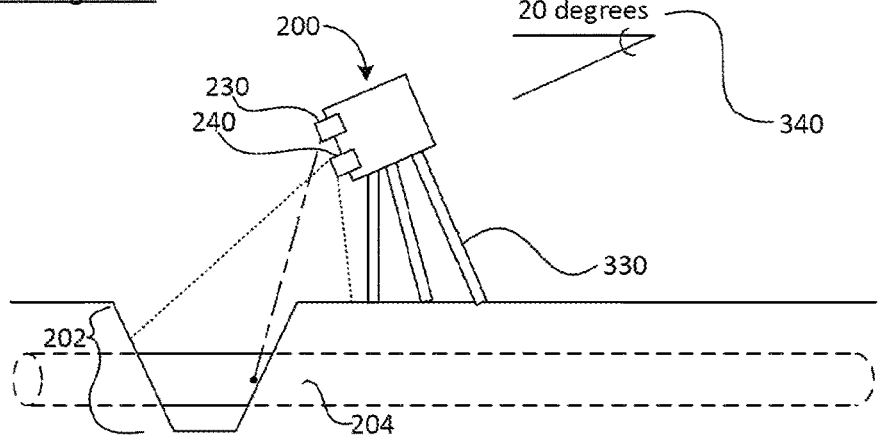

As illustrated in FIG. 3, the pothole mapping apparatus 200 is illustrated tilted at various angles in scanning and generating images of the utility line 204 disposed in the pothole 202. For instance, the pothole mapping apparatus 200 may be tilted at a first tilt angle 300, a second tilt angle 310, a third tilt angle 320. In other embodiments, a pothole mapping apparatus in keeping with the present disclosure may be tilted at other numbers of tilt angles through to an nth tilt angle. The pothole mapping apparatus 200 may be held at each of the tilt angles (e.g., the first tilt angle 300, the second tilt angle 310, and the third tilt angle 320), in various different ways. For instance, the legs of a tripod 330 may be configured to extend, collapse, or otherwise be adjusted by a user to achieve different tilt angles. Likewise, in some embodiments the head of the pothole mapping apparatus 200 or utility locator device including a pothole mapping apparatus (e.g., the utility locator device 620 having a pothole mapping apparatus 200 shown in FIGS. 6A and 6B) may be configured to tilt at various tilt angles (not illustrated). In yet further embodiments, a user may hold the pothole mapping apparatus 200 at various angles (not illustrated), for instance, supported on the front leg or legs of a tripod such as the tripod 330. In some such embodiments, the tilt angle may be indicated via a tilt indicator 340 which may be shown on an electronic display. The tilt indicator 340 may be used to, for instance, to guide the user to hold the pothole mapping apparatus 200 or utility locator device including a pothole mapping apparatus at specific tilt angles. It should be noted that the different tilt angles may facilitate the scanning of utility lines (e.g., the utility line 204) and generate both distance measurements and images of one or more utility lines in a pothole (e.g., the pothole 202). The images taken at different tilt angles may allow for the virtually reconstruct a three-dimensional image of the utility line or lines such as that shown with the utility line 504 on the display element 500 of FIG. 5.

Returning back to FIGS. 2A and 2B, the potholing mapping apparatus 200 may optionally include a communication element 250 configured to communicate data relating to the geolocation and depth of the potholed utility line(s), such as the utility line 204, with one or more systems and devices for mapping utility lines. For instance, the communication element may be or include Bluetooth, Wi-Fi, ISM, or like communication apparatus. In some embodiments, the communication element 250 may communicate data relating to the geolocation and depth of the potholed utility line(s) that includes mapped data of utility lines with one or more remote databases 252, smartphones 254, and other devices 256.

Turning to FIG. 2B, the potholing mapping apparatus 200 may further include a display element 260 to display images and associated data of the utility line 204. For instance, such a display element 260 may be or include a graphical user interface. In some embodiments, the display element may display utility line images with a super imposed scale describing the dimensions of the utility lines(s). Likewise, images and associated data of the utility line 204 may be correlated of data from other sourced (e.g., buried utility line data from utility locator devices and/or associated utility locating databases).

Figure 4:
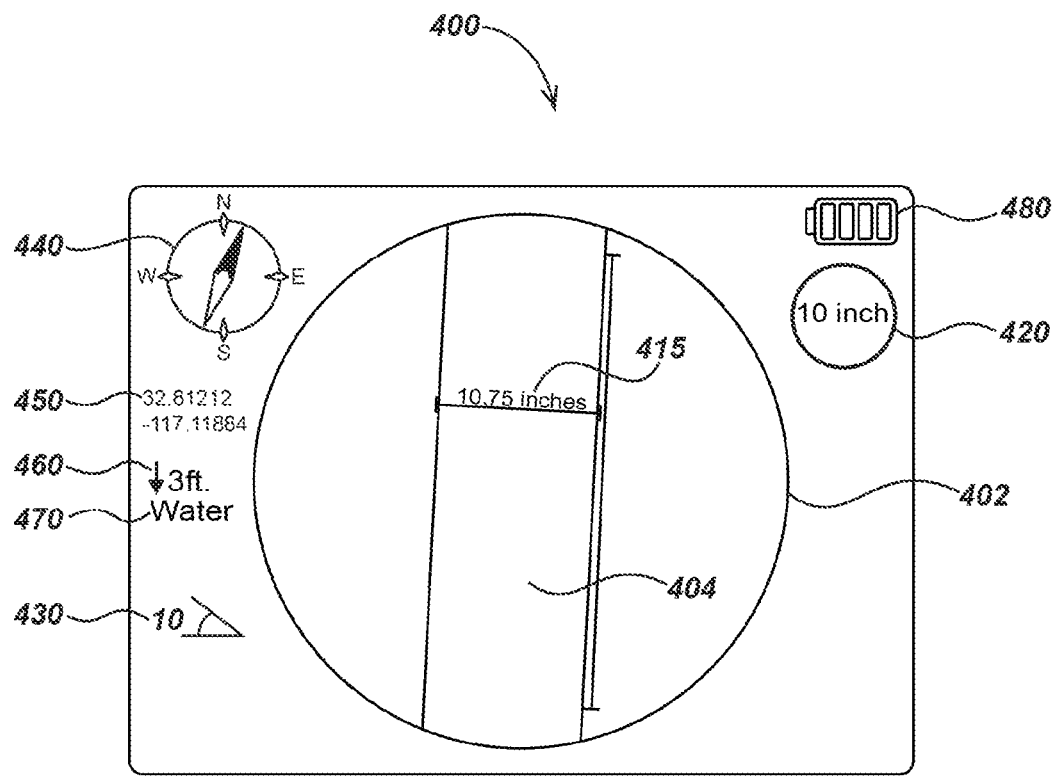
FIG. 4 is an illustration of a display element embodiment.
Figure 6A:
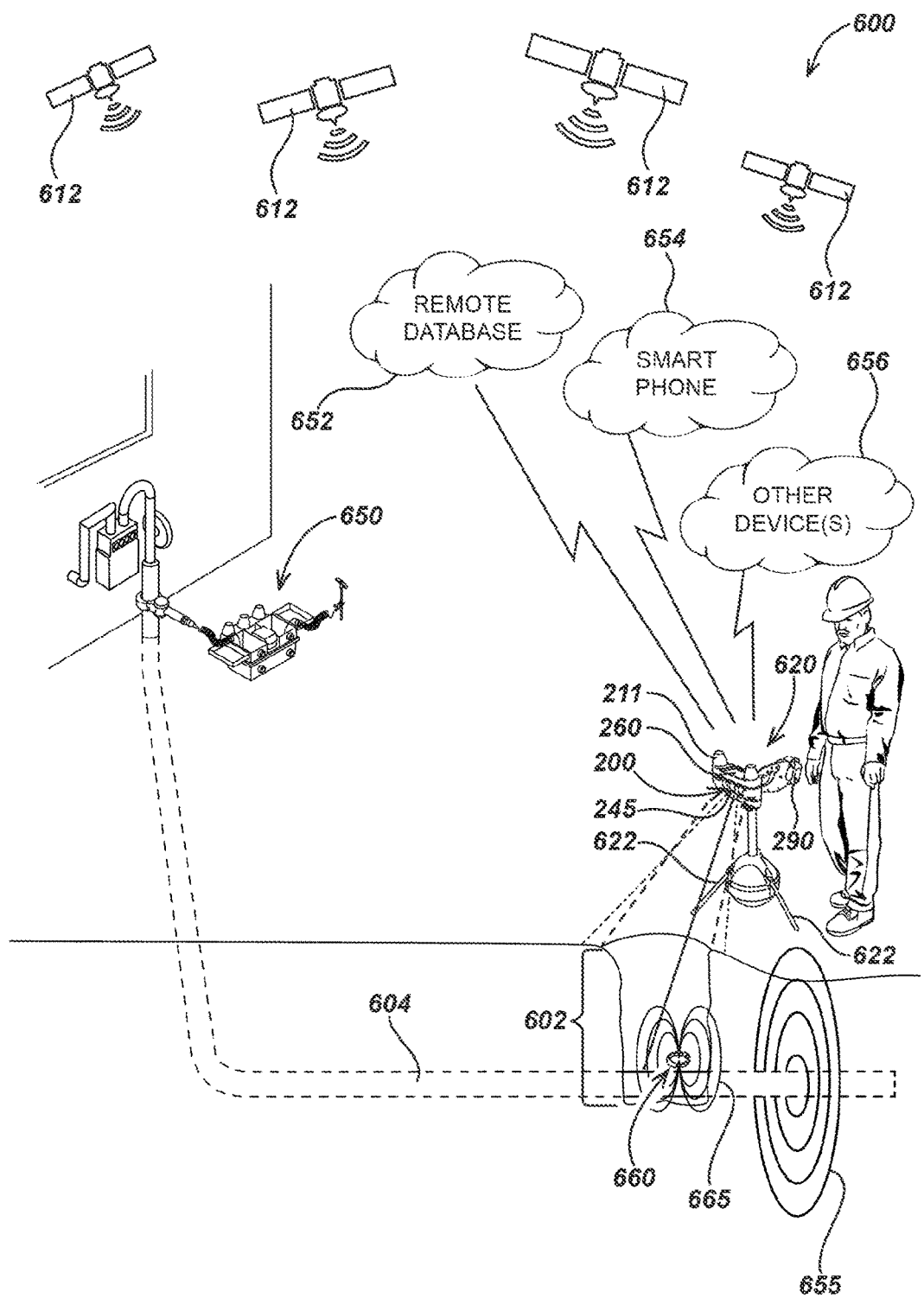
FIG. 6A is an illustration of a utility locating and pothole mapping system embodiment that includes a utility locator device having a pothole mapping apparatus.
Figure 6B:
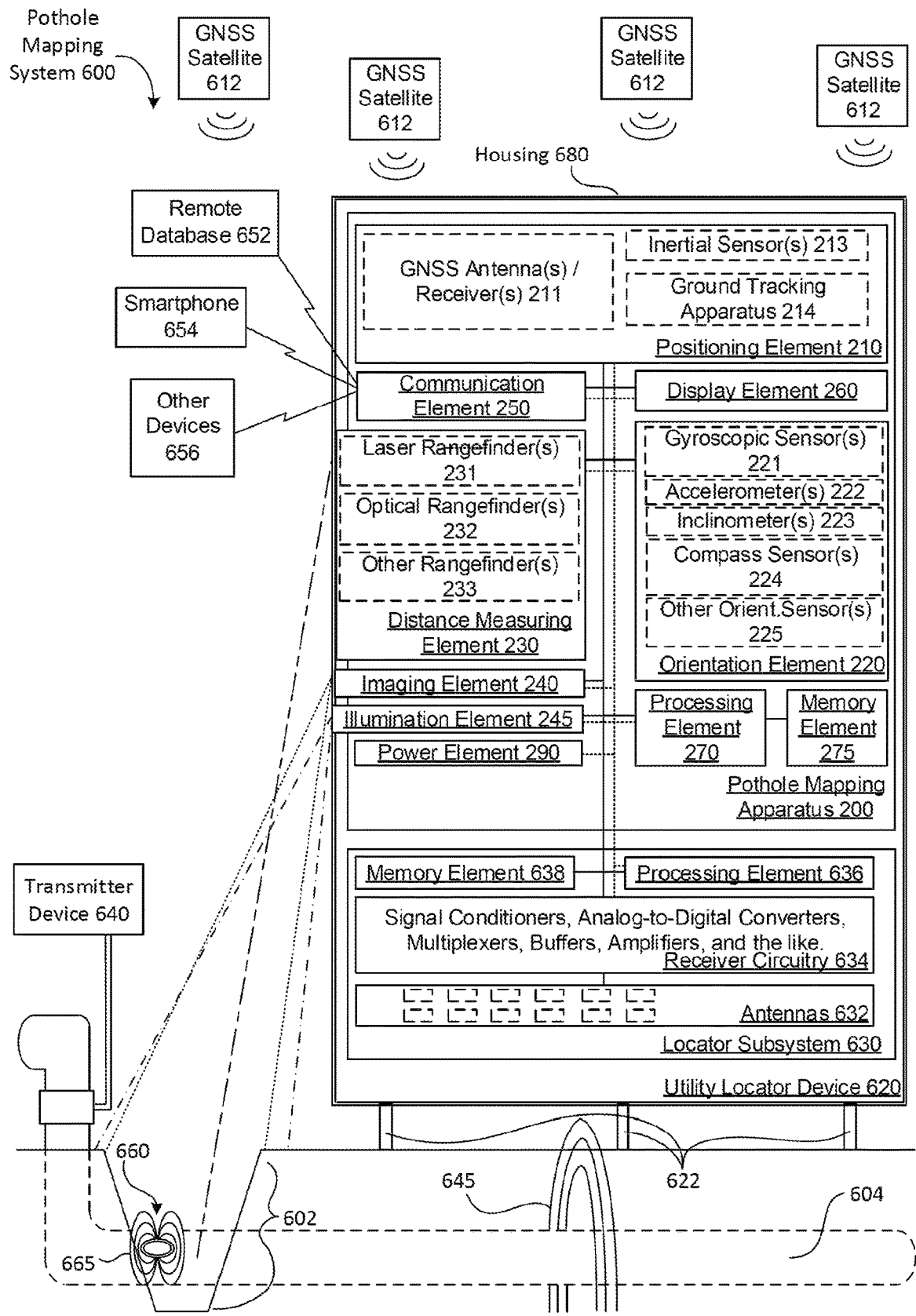
FIG. 6B is a diagram of the utility locating and pothole mapping system embodiment that includes a utility locator device having a pothole mapping apparatus of FIG. 6A.

Turning to FIG. 4, a display element 400 is illustrated which may be or share aspects with the display element 260 of FIG. 2B to display images and data relating to utility lines as generated by a pothole mapping apparatus (e.g., the pothole mapping apparatus 200 of FIGS. 2A and 2B) or utility locator device that includes a pothole mapping apparatus (e.g., the utility locator device 620 of FIGS. 6A and 6B). For instance, the display element 400 may display images of one or more utility lines, such as a utility line 404, and surrounding environment which may include a pothole 402. One or more measurements 415 describing the utility line 404 may be superimposed on the utility line 404 on the display element 400. A pipe size indicator 420 may indicate the size of the utility line 404 based on the measurements 415. An inclination angle indicator 430 may be shown on the display element 400 indicating the degree of tilt of a pothole mapping apparatus or utility locator device having a pothole mapping apparatus in keeping with the present disclosure. For instance, the inclination angle indicator 430 may be utilized in determining different tilt angles when scanning a potholed utility line as demonstrated in FIG. 3. The display element 400 may further include a heading indicator 440 describing a heading relative to north, a geolocation indicator 450 showing GNSS coordinates, and a depth indicator 460 which may indicate the depth of the utility line 404 below the grounds surface. Further, the display element 400 may include a utility type indicator 470. The potholing of the utility line 404 provides an opportunity to visually verify the utility line type. A user may thereby select the utility type indicated by the utility type indicator 470. Likewise, in some embodiments, the utility type indicated on the utility type indicator 470 may be determined by image recognition algorithms based on the images of the utility line 404. The display element 400 may further include a battery level indicator 480 indicating the level of charge remaining in the battery/power element of the pothole mapping apparatus or utility locator device that includes a pothole mapping apparatus.

Figure 5:
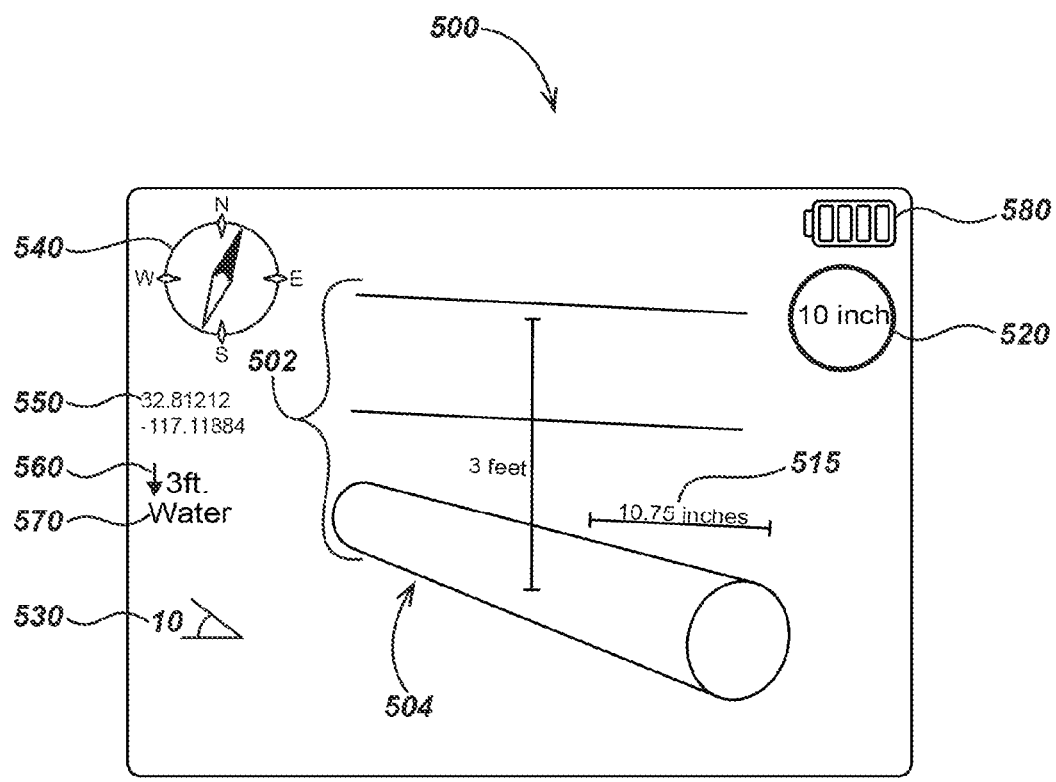
FIG. 5 is an illustration of another display element embodiment demonstrating three dimensional representation of utility lines.

Turning to FIG. 5, a display element 500 is illustrated which may be or share aspects with the display element 260 of FIG. 2B. The display element 500 is illustrated displaying images and data relating to utility lines as generated by a pothole mapping apparatus (e.g., the pothole mapping apparatus 200 of FIGS. 2A and 2B) or utility locator device that includes a pothole mapping apparatus (e.g., the utility locator device 620 of FIGS. 6A and 6B). Some pothole mapping apparatus embodiments or utility locator device embodiments that includes a pothole mapping apparatus may be configured to scan the pothole and one or more potholed utility lines in creating a three-dimensional representation of that utility line or lines. For instance, a pothole mapping apparatus or utility locator device that includes a pothole mapping apparatus in keeping with the present disclosure may scan a utility line using multiple tilt angles as demonstrated in FIG. 3 may virtually reconstruct a three-dimensional image of the utility line, such as a utility line 504 in a pothole 502 on the display element 500. One or more measurements 515 describing the utility line 504 may be superimposed on the utility line 504 on the display element 500. A pipe size indicator 520 may indicate the size of the utility line 504 based on the measurements 515. An inclination angle indicator 530 may be shown on the display element 500 indicating the degree of tilt of a pothole mapping apparatus or utility locator device having a pothole mapping apparatus in keeping with the present disclosure. For instance, the inclination angle indicator 530 may be utilized in determining different tilt angles when scanning a potholed utility line as demonstrated in FIG. 3. The display element 500 may further include a heading indicator 540 describing a heading relative to north, a geolocation indicator 550 showing GNSS coordinates, and a depth indicator 560 which may indicate the depth of the utility line 504 below the grounds surface. Further, the display element 500 may include a utility type indicator 570. The potholing of the utility line 504 provides an opportunity to visually verify the utility line type. A user may thereby select the utility type indicated by the utility type indicator 570. Likewise, in some embodiments, the utility type indicated on the utility type indicator 570 may be determined by image recognition algorithms based on the images of the utility line 504. The display element 500 may further include a battery level indicator 480 indicating the level of charge remaining in the battery/power element of the pothole mapping apparatus or utility locator device that includes a pothole mapping apparatus.

It should be noted, the display element 400 of FIG. 4, the display element 500 of FIG. 5, and the various indicators and other representations thereon may be used on pothole mapping apparatus or utility locator devices that include a pothole mapping apparatus in keeping with the present disclosure as well as on various other devices including but not limited to remote servers, smart phones or other computing devices, or other devices. Likewise, such information and images may be correlated with other mapped utility line data and displayed on a display element such as the display element 400 of FIG. 4 or the display element 500 of FIG. 5.

Figure 8:
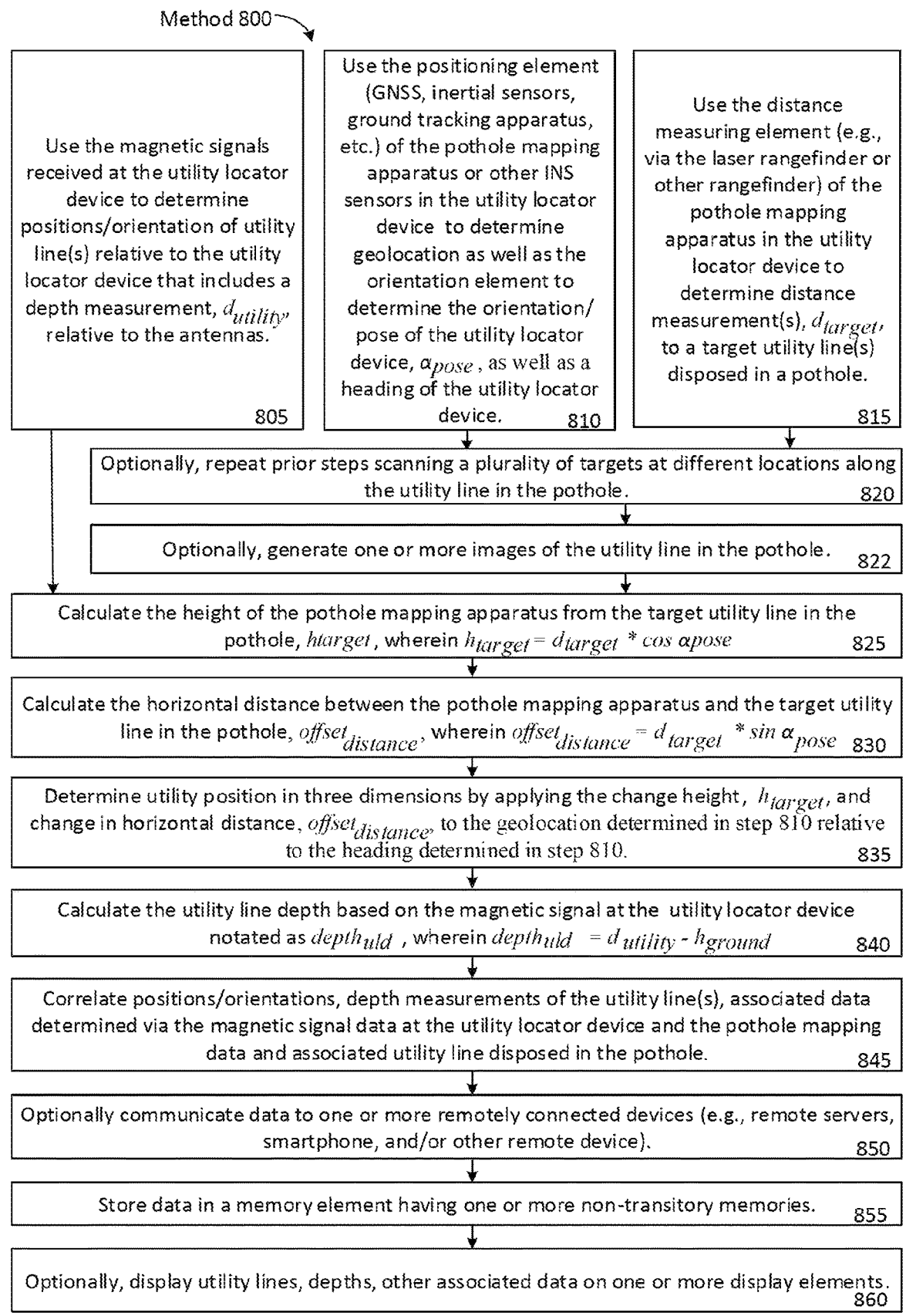
FIG. 8 is a block diagram describing an embodiment of a pothole mapping method.
Figure 9:
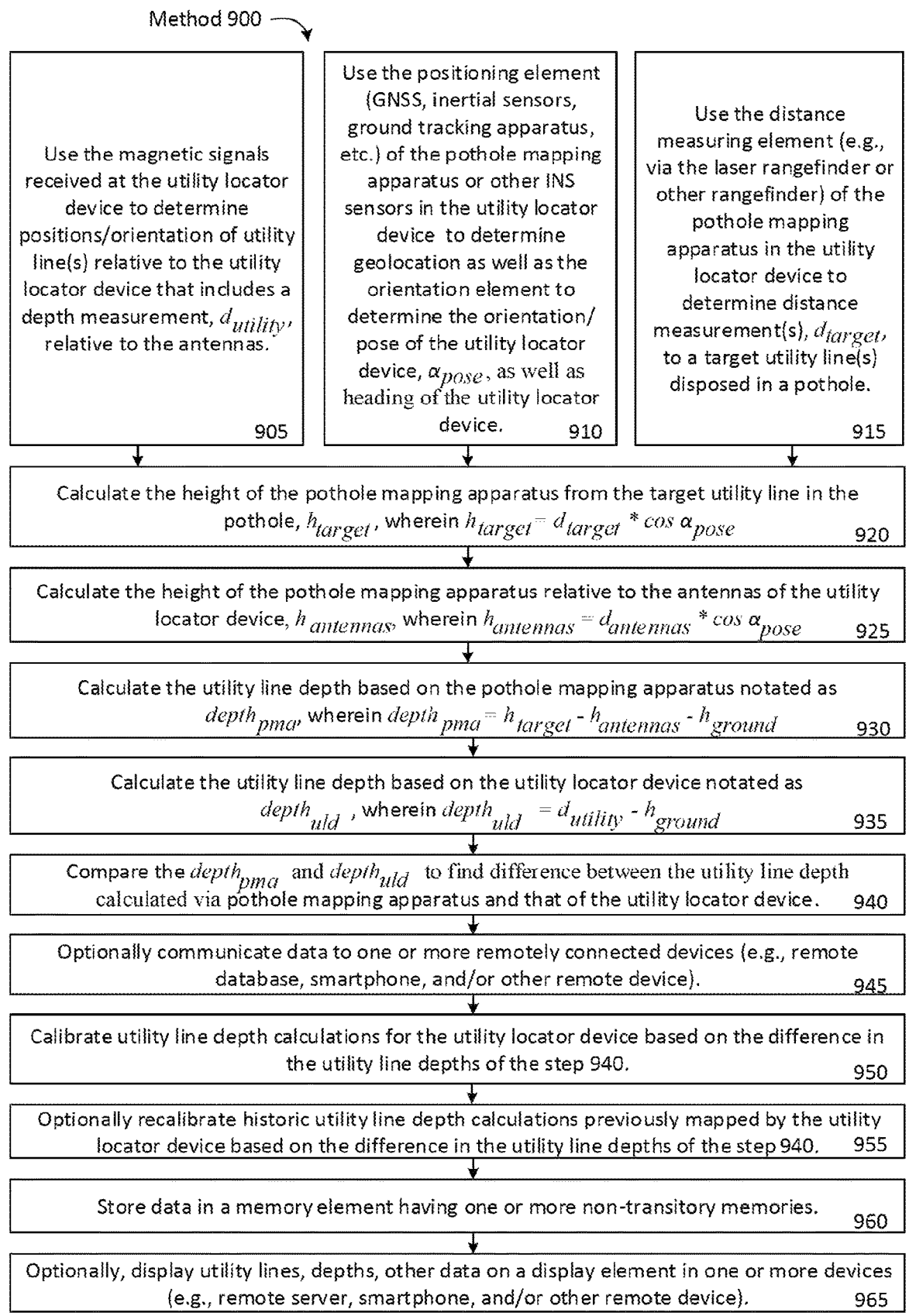
FIG. 9 is a block diagram of an embodiment of calibrating utility locator device depth measurement based on utility line depth measurements from a pothole mapping apparatus.

Referring back to FIG. 2B, the pothole mapping apparatus 200 may include a processing element 270 having one or more processors to carry out methods associated with documenting mapped position and depths of potholed utility lines (e.g., the method 800 of FIG. 8 and the method 900 of FIG. 9). Further, the pothole mapping apparatus 200 may include a memory element 275 having one or more non-transitory memories to store instructions relating to methods associated with documenting mapped position and depths of the potholed utility lines and the resulting mapped utility line positions and depths (e.g., the method 800 of FIG. 8 and the method 900 of FIG. 9). The potholing mapping apparatus 200 may also include a housing element 280 to encase electronics and other components associated with the pothole mapping apparatus 200 and a power element 290 for portioning of electrical power to the various powered elements. The power element may, for instance, be one or more batteries. The batteries may be or share aspects with the batteries as described in U.S. Pat. No. 10,090,498, issued Oct. 2, 2018, MODULAR BATTERY PACK APPARATUS, SYSTEMS, AND METHODS INCLUDING VIRAL AND/OR CODE TRANSFER and U.S. patent application Ser. No. 16/140,467, issued Sep. 24, 2018, entitled MODULAR BATTERY PACK APPARATUS, SYSTEMS, AND METHODS INCLUDING VIRAL AND/OR CODE TRANSFER; U.S. patent application Ser. No. 16/520,248, issued Jul. 23, 2019, entitled MODULAR BATTERY PACK APPARATUS, SYSTEMS, AND METHODS INCLUDING VIRAL AND/OR CODE TRANSFER; U.S. patent application Ser. No. 16/837,923, issued Apr. 1, 2020, entitled MODULAR BATTERY PACK APPARATUS, SYSTEMS, AND METHODS INCLUDING VIRAL AND/OR CODE TRANSFER; and U.S. Pat. No. 11,171,369, issued Nov. 9, 2021, entitled MODULAR BATTERY PACK APPARATUS, SYSTEMS, AND METHODS INCLUDING VIRAL AND/OR CODE TRANSFER the contents of which are incorporated by reference herein in their entirety.

Turning to FIGS. 6A and 6B, a pothole mapping system 600 is illustrated which may include a utility locator device 620 that further includes a pipe mapping apparatus in keeping with the present disclosure such as the pipe mapping apparatus 200 from FIGS. 2A and 2B. The utility locator device 620 may be configured to determine positions, orientations, and depths of one or more utility lines via magnetic signals, such as the utility line 604 via magnetic signal 645. The utility locator device 620 may be or share aspects with the utility locator devices disclosed in U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,927,545, issued Mar. 27, 2018, entitled MULTI-FREQUENCY LOCATING SYSTEMS AND METHODS; U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 10,078,149, issued Sep. 18, 2018, entitled BURIED OBJECT LOCATOR APPARATUS AND SYSTEMS; and U.S. Pat. No. 10,162,074, issued Dec. 25, 2018, entitled UTILITY LOCATORS WITH RETRACTABLE SUPPORT STRUCTURES AND APPLICATIONS THEREOF; U.S. Pat. No. 10,670,766, issued Jun. 2, 2020, entitled UTILITY LOCATING SYSTEMS, DEVICES, AND METHODS USING RADIO BROADCAST SIGNALS; and U.S. Pat. No. 10,564,309, filed Feb. 18, 2020, entitled SYSTEMS AND METHODS FOR UNIQUELY IDENTIFYING BURIED UTILITIES IN A MULTI-UTILITY ENVIRONMENT as well as the other utility locator devices of the incorporated applications.

Still referring to FIGS. 6A and 6B, the magnetic signal 645 may be caused by electrical current flowing through the utility line 604 (e.g., an electrical line) or otherwise coupled to the conductive utility line 604 (e.g., a copper water pipe, cast iron drain line, or the like) from current being coupled thereto via a transmitter device 640. In some system embodiments, an electronic marker device 660 placed in a known position relative to the utility line 604. The electronic marker device 660 may transmit a signal 665 generally as a response from first receiving a signal from a utility locator device or other outside excitation source (not illustrated). The signal 665 may further be received at the utility locator device 630 for determining position of the electronic marker device 660, and thereby the associated utility line 604. The electronic marker device 660 may be or share aspects with the those disclosed in U.S. patent application Ser. No. 15/681, 250, filed Aug. 18, 2017, entitled ELECTRONIC MARKER DEVICES AND SYSTEMS; U.S. Pat. No. 9,746,572, issued Aug. 29, 2017, entitled ELECTRONIC MARKER DEVICES AND SYSTEMS; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,859,727, issued Dec. 8, 2020, entitled ELECTRONIC MARKER DEVICES AND SYSTEMS; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. Pat. No. 11,280,934, issued Mar. 22, 2022, entitled ELECTROMAGNETIC MARKER DEVICES FOR BURIED OR HIDDEN USE; U.S. Pat. No. 11,333, 786, issued May 17, 2022, entitled BURIED UTILITY MARKER DEVICES, SYSTEMS, AND METHODS; and U.S. Pat. No. 11,467,317, issued Oct. 11, 2022, entitled ELECTROMAGNETIC MARKER DEVICES WITH SEPARATE RECEIVE AND TRANSMIT ANTENNA ELEMENTS; as well as the other marker devices of the incorporated applications.

Turning to FIG. 6B, the utility locator device 620 may include one or more antennas 632 and associated receiver circuitry 634 (e.g., signal conditioners, analog-to-digital converters, multiplexers, amplifiers, and the like) to receive magnetic signals 645 and/or signals 665 emitted by the electronic marker device 660. It should noted that though the utility locator device 620 is illustrated as having twelve antennas 632, in other embodiments other numbers of antennas may be used. Processing of magnetic signals 645, signals 665, and/or processing of other data which may include that from the pothole mapping apparatus 200 may occur in a processing element 636 having one or more processors in the locator subsystem 630. Alternatively or additionally processing of data may occur in the processing element 236 disposed in the pothole mapping apparatus 200 and/or in one or more remotely connected devices (e.g., remote database 652, smartphone 654, and/or other devices 656). Utility line data of potholed utility lines may, for instance, be combined with other mapped utility lines in a remote database (e.g., remote database 652). This may be particular advantageous where the potholed utility lines are non-conductive, allowing the mapped utility lines in the remote database (e.g., remote database 652) to further include data regarding non-conductive utility lines that may otherwise be unavailable from maps generated by data collected from utility locator devices. Further, data relating to determining utility line positions, orientations, depth which may include the geolocations of potholes (e.g., pothole 602) determined via GNSS receivers/antennas 211 thorough receiving navigation signals from a plurality of GNSS satellites 612 as well as instructions related to methods described herein may be store in a memory element 638 having one or more non-transitory memories disposed in the locator subsystem 630, the memory element 275 disposed in the pothole mapping apparatus 200, and/or a memory element in one or more remotely connected devices (e.g., remote database 652, smartphone 654, and/or other devices 656). The utility locator device 620 including the pothole mapping apparatus 200 may further include a housing element 680 to encase electronics and other components.

Figure 7:
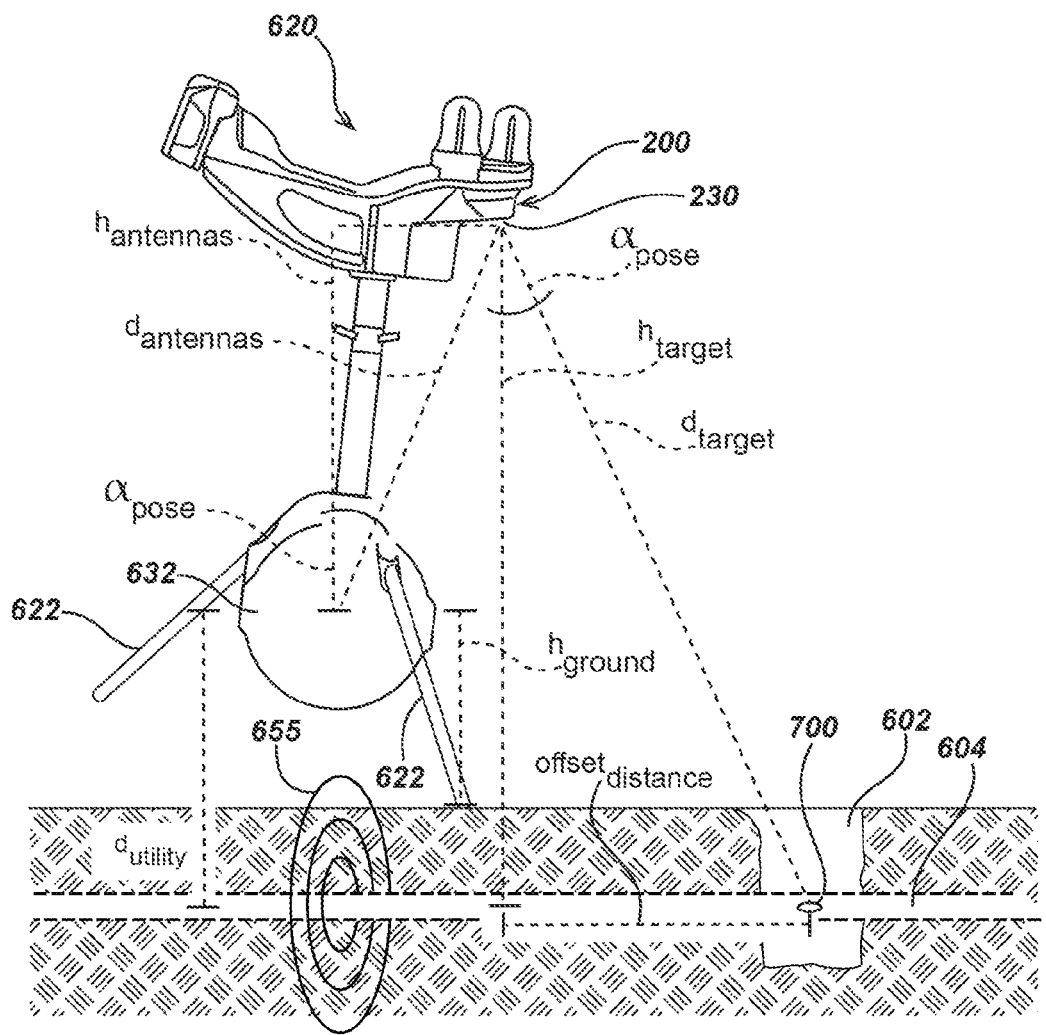
FIG. 7 is another illustration of a utility locator device embodiment having a pothole mapping apparatus.

Turning to FIG. 7, the utility locator device 620 including the pothole mapping apparatus 220 is illustrated to demonstrate the pothole mapping apparatus 220 in mapping a utility line 604 disposed in the pothole 602 while simultaneously determining positions, orientations, and depth of the same utility line 604 via magnetic signals 655 sensed at the antennas 632 of the utility locator device 620. It should be noted that the various variables are defined through FIG. 7 that may be used in the method 800 of FIG. 8 and the method of FIG. 9 subsequently disclosed herein.

As previously disclosed, the pothole mapping apparatus 220 may include distance measuring element 230. For instance, the distance measuring element 230 may be a laser rangefinder such as those disclosed in U.S. patent application Ser. No. 15/866,360, filed Jan. 9, 2018, entitled TRACKED DISTANCE MEASURING DEVICES, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Pat. No. 11,397,274, issued Jul. 26, 2022, entitled TRACKED DISTANCE MEASURING DEVICES, SYSTEMS, AND METHODS; U.S. Provisional Patent Application 63/514, 090, filed Jul. 17, 2023, entitled SMARTPHONE MOUNTING APPARATUS FOR ASSET TAGGING AS USED WITH UTILITY LOCATOR DEVICES; and other rangefinder devices disclosed in the incorporated applications. In other embodiments, the distance measuring element 230 may additionally or instead include other rangefinders (e.g., optical rangefinders 232 and/or other rangefinders 233). The distance measuring element 230 may determine a distance $d_{target}$ from the distance measuring element 230 to a target 700 which may be on the utility line 604 in pothole 602. A height, notated as $h_{target}$, may describe the vertical distance of the distance measuring element 230 from the distance measuring element 230 to the utility line 604. An angle $\alpha_{pose}$ may describe the angle from the height $h_{target}$ toward the target 700 as determined via the orientation element 220 (FIG. 2B) of distance measuring element 230. Further a horizontal distance between the distance measuring element 230 and the target 700 may be notated herein as $\text{offset}_{distance}$.

It should be noted that a distance $d_{antennas}$ between the distance measuring element 230 and the antennas 632 of the utility locator device 620 may be known as both exist in the same rigid body of the utility locator device 620. A height $h_{antennas}$ may describe the vertical distance from the distance measuring element 230 to the antennas 632.

The antennas 632 may sense magnetic signals 655 from the utility line 604 in the ground in determining the position and orientation/pose thereof. It should also be noted that in some method embodiments, a signal from an electronic marker device positioned in a known position relative to a utility line may be substituted for the magnetic signals 655 in determining the location and orientation/pose of the utility line (e.g., the signals 665 emitted by the electronic marker device 660 illustrated in FIGS. 6A and 6B). Likewise, a depth measurement, notated herein as $d_{utility}$, may be determined measuring between the antennas 632 and the utility line 604. Further, the depth of the utility line 604 relative to the ground surface determined through the magnetic signals 655 received at antennas 632 in the utility locator device 620 may be notated in FIGS. 8 and 9 as $depth_{uld}$ and may be determined via method 800 of FIG. 8 wherein $depth_{uld}=d_{utility}-h_{ground}$ and $h_{ground}$ is a known value distance from the antenna 632 to the ground surface when resting upon tripod 622. Likewise, the depth of the utility line 604 relative to the ground surface as determined via data generated by the pothole mapping apparatus 200 may be notated in FIGS. 8 and 9 as $depth_{pma}$ may be determined via method 800 of FIG. 8 wherein $depth_{pma}=h_{target}-h_{antennas}-h_{ground}$. It should be noted, the subsequent methods disclosed in this application, the method 800 of FIG. 8 and the method 900 of FIG. 9, may utilize the variables defined in FIG. 7.

Turning to FIG. 8, a method 800 for documenting potholes is disclosed. The method 800 may include a series of simultaneous steps 805, 810, and 815. In the step 805, the method 800 may include using the magnetic signals (e.g., the magnetic signals 655 of FIG. 7) received at the utility locator device (e.g., the utility locator device 620 of FIG. 7) to determine positions/orientation of utility line(s) (e.g., the utility line 604 of FIG. 7) relative to the utility locator device (e.g., the utility locator device 620 of FIG. 7) that includes a depth measurement, $d_{utility}$, relative to the antennas (e.g., the antenna 632 of FIG. 7). The step 810 may include using the positioning element (GNSS, inertial sensors, ground tracking apparatus, or the like which may be or share aspects with the positioning element 210 of FIG. 2B) of the pothole mapping apparatus (e.g., the pothole mapping apparatus 200 of FIGS. 2A, 2B, and 7) or other INS sensors in the utility locator device to determine the geolocation of the utility locator device as well as the orientation element to determine the orientation/pose of the utility locator device, $\alpha_{pose}$, as well as a heading of the utility locator device. The step 815 may include using the distance measuring element (e.g., via the laser rangefinder or other rangefinder which may be or share aspects with the distance measuring element 230 of FIG. 2B) of the pothole mapping apparatus to determine distance measurement(s), $d_{target}$, to a target utility line(s) disposed in a pothole (e.g., the utility line 604 in pothole 602 of FIG. 7). In a step 820, the steps 810 and 815 may optionally repeat scanning a plurality of targets at different locations along the utility line in the pothole. The step 820 may, for instance, utilize different tilt angles as disclosed with FIG. 3 to generate a plurality of different measurements and images of the one or more utility lines and surrounding environment. In another optional step 822, one or more images of the utility line(s) in the pothole may be generated. It should be noted, the one or more images may include the dot location of a laser rangefinder apparatus (e.g., the location of the laser dot 1632 of FIGS. 16A and 16B). In a step 825 subsequent to steps 805 and 820, the height of the pothole mapping apparatus from the target utility line in the pothole, $h_{target}$, may be calculated. For instance, the height may be calculated by $h_{target}=d_{target}*\cos \alpha_{pose}$. In a step 830, the horizontal distance between the pothole mapping apparatus and the target utility line in the pothole, $offset_{distance}$, may be calculated. For instance, the horizontal distance may be calculated by $offset_{distance}=d_{target}*\sin \alpha_{pose}$. In a step 835 the utility line position in three dimensions may be determine by applying the change height, $h_{target}$, and change in horizontal distance, $offset_{distance}$, to the geolocation determined in step 810 relative to the heading also determined in step 810. In a step 840, the utility line depth may be determined based on the magnetic signal received at the utility locator device notated herein as $depth_{uld}$ wherein $depth_{uld}=d_{utility}-h_{ground}$. In a step 845 the depth measurements of the utility line(s), associated data determined via the magnetic signal data at the utility locator device and the pothole mapping data and associated utility line disposed in the pothole may be correlated. In a step 850, data may optionally be communicated to one or more remotely connected devices (e.g., remote database, smartphone, and/or other remote device). It should be noted that the step 850 may occur at other points in other method embodiments and data processing may occur in the one or more communicatively coupled devices. In a step 855, data may be stored in a memory element having one or more non-transitory memories. The memory element and associated storage of data may occur in the pipe mapping apparatus, utility locator devices, or other connected device (e.g., smartphone, remote server, and/or other device). In a step 860, utility lines, depths, other associated data may optionally be displayed on one or more display elements (e.g., the display element 260 of FIG. B. the display element 400 of FIG. 4, and/or the display element 500 of FIG. 5). The display element may be in the pipe mapping apparatus, utility locator devices, or other connected device (e.g., smartphone, remote server, and/or other device).

Turning to FIG. 9, a method 900 for calibrating utility locator device depth measurements based on utility line depth measurements from a pothole mapping apparatus is disclosed. The method 900 may include a series of simultaneous steps 905, 910, and 915. In the step 905 may using the magnetic signals (e.g., the magnetic signals 655 of FIG. 7) received at the utility locator device (e.g., the utility locator device 620 of FIG. 7) to determine positions/orientation of utility line(s) (e.g., the utility line 604 of FIG. 7) relative to the utility locator device that includes a depth measurement, $d_{utility}$, relative to the antennas (e.g., the antenna 632 of FIG. 7). The step 910 may include using the positioning element (GNSS, inertial sensors, ground tracking apparatus, etc.) of the pothole mapping apparatus or other INS sensors in the utility locator device to determine the geolocation of the utility locator device as well as the orientation element to determine the orientation/pose of the utility locator device, $\alpha_{pose}$, as well as a heading of the utility locator device. The step 915 may include using the distance measuring element (e.g., via the laser rangefinder or other rangefinder) of the pothole mapping apparatus in the utility locator device to determine distance measurement(s), $d_{target}$, to a target utility line(s) disposed in a pothole. In step 915, it should be noted that the utility or utilities in the pothole as well as the surrounding environment may be illuminated (e.g., via an illumination element 1045 of FIG. 10 or the illumination element 1345 of FIG. 13). In a step 920 subsequent to steps 905, 910, and 915, the height of the pothole mapping apparatus from the target utility line in the pothole, $h_{target}$, may be calculated. For instance, the height of the pothole mapping apparatus from the target utility line in the pothole may be calculate by $h_{target}=d_{target}*\cos \alpha_{pose}$. In a step 925, the height of the pothole mapping apparatus relative to the antennas of the utility locator device, $h_{antennas}$, may be calculated. For instance, the height of the pothole mapping apparatus relative to the antennas of the utility locator device wherein $h_{antennas}=d_{antennas}-\cos \alpha_{pose}$. In a step 930, the utility line depth based on the pothole mapping apparatus, notated as $depth_{pma}$, may be calculated. For instance, the utility line depth based on the pothole mapping apparatus may be calculated by $depth_{pma}=h_{target}-h_{antennas}-h_{ground}$. In a step 935, the utility line depth based on the utility locator device, notated as $depth_{uld}$, may be calculated. For instance, the utility line depth based on the utility locator device may be calculated by $depth_{uld}=d_{utility}-h_{ground}$. In a step 940, the difference between the utility line depth calculated via pothole mapping apparatus, $depth_{pma}$, and the utility line depth calculated via utility locator device, $depth_{uld}$, may be compared. In a step 945, data may optionally be communicated to one or more remotely connected devices (e.g., remote database, smartphone, and/or other remote device). In a step 950, the utility line depth calculations for the utility locator device may be calibrated based on the difference in the utility line depths of the step 940. For instance, the difference may be applied to future depth calculation. Likewise, in some embodiments, the difference may be communicated to other utility locator devices and those other utility locator devices may be calibrated based on the depth calculation differences. In a step 955, historic utility line depth calculations previously mapped by the utility locator device may be recalibrated based on the difference in the utility line depths of the step 940. For instance, a pre-existing database of utility line data that includes depth measurements may be recalculated based on the difference between the utility line depth calculated via pothole mapping apparatus, $depth_{pma}$, and the utility line depth calculated via utility locator device, $depth_{uld}$. In a step 960, data may be stored in a memory element having one or more non-transitory memories. The memory element and associated storage of data may occur in the pipe mapping apparatus, utility locator devices, or other connected device (e.g., smartphone, remote server, and/or other device). In a step 965, utility lines, depths, other data may be displayed on a display element in one or more devices (e.g., the utility locator device, pipe mapping apparatus, smartphone, and/or other remote device). The display element may be or share aspects with the display element 260 of FIG. B. the display element 400 of FIG. 4, and/or the display element 500 of FIG. 5.

Figure 10:
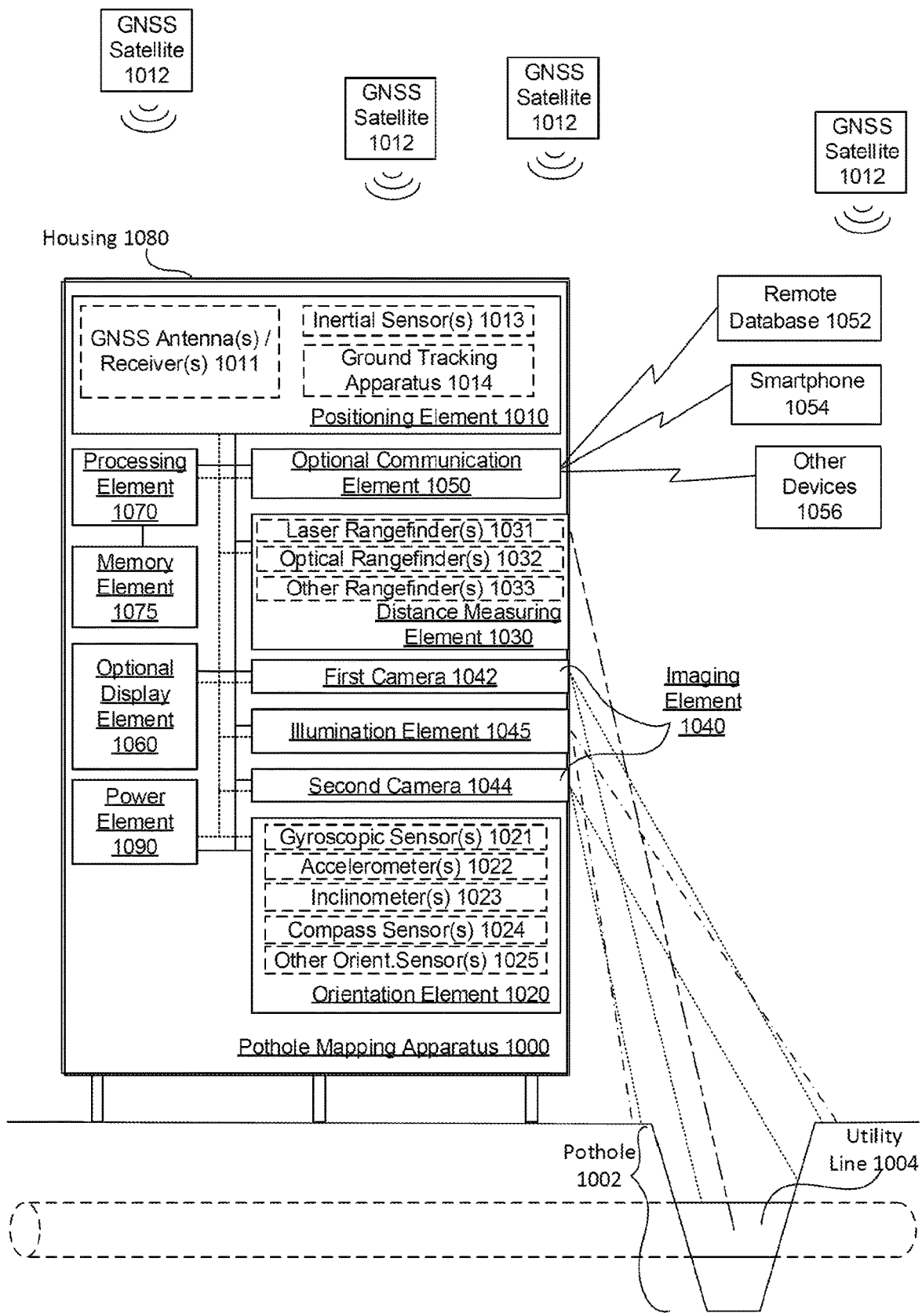
FIG. 10 is another pothole mapping apparatus embodiment in keeping with aspects of the present disclosure having multiple space apart cameras.

Turning to FIG. 10, a pothole mapping apparatus 1000 in keeping with the present disclosure is illustrated which may be or share aspects with the pothole mapping apparatus 200 of FIGS. 2A and 2B with the addition of multiple cameras having overlapping field of view (e.g., an imaging element 1040 having both a first camera 1042 and a second camera 1044). The imagining element 1040 may be or share aspects with the apparatuses disclosed in U.S. Pat. No. 9,928,613, issued Mar. 27, 2018, entitled GROUND TRACKING APPARATUS, SYSTEMS, AND METHODS; U.S. Pat. No. 11,336,245, issued Jun. 21, 2022, entitled GROUND TRACKING APPARATUS, SYSTEMS, AND METHODS; and other such apparatuses of the incorporated applications.

The pothole mapping apparatus 1000 may include a positioning element 1010 to determine position data describing the geolocation of the pothole mapping apparatus in the world frame as it is positioned at the ground surface about a pothole 1002. The positioning element 1010 may, for instance, be or include one or more global navigation satellite system (GNSS) receivers/antennas 1011 (e.g., GPS, Galileo, GLONASS, BeiDou, or the like) to receive signals from a plurality of GNSS satellites 1012. The GNSS receivers/antennas 1011 may be or share aspects with the GNSS devices, systems, and methods disclosed the U.S. patent application Ser. No. 17/241,676, filed Apr. 27, 2021, entitled SPATIALLY AND PROCESSING-BASED DIVERSE REDUNDANCY FOR RTK POSITIONING OR OTHER POSITIONING SYSTEMS AND METHODS; U.S. patent application Ser. No. 17/461,833, filed Aug. 30, 2021, entitled COMBINED SATELLITE NAVIGATION AND RADIO TRANSCEIVER ANTENNA DEVICES; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; and other such system, devices, and methods disclosed in the incorporated applications.

Still referring to FIG. 10, the positioning element 1000 may further include one or more inertial sensors 1013 which may include, but should not be limited to, one or more accelerometers, gyroscopic sensors, inertial navigation systems (INS) and/or other like sensors for tracking movement. The positioning element 1000 may further include one or more ground tracking apparatuses 1014 such as those configured to optically or mechanically track movements relative to the ground surface. The ground tracking apparatuses 1014 may be or share aspects with those disclosed in U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; and other devices disclosed in the incorporated applications.

Still referring to FIG. 10, the pothole mapping apparatus 1000 may include an orientation element 1020 to determine orientation data describing the direction, tilt, and pose of the pothole mapping apparatus in three dimensions. The orientation data may correlate with the position data determined by the positioning element 1010. The orientation element 1020 may include, but should not be limited to, one or more gyroscopic sensors 1021, accelerometers 1022, inclinometers 1023, compass sensors 1024, and/or other orientation sensors 1025.

Still referring to FIG. 10, the pothole mapping apparatus 1000 may include a distance measuring element 1030 to determine distance data describing the distance between the pothole mapping apparatus 1000 and one or more utility lines, such as a utility line 1004, in the pothole 1002. The distance data may correlate with the position data determined by the positioning element 1010 and the orientation data determined by the orientation element 1020.

As illustrated in FIG. 10, the distance measuring element 1030 may include one or more laser rangefinders 1031. In some such embodiments, the laser rangefinders 1031 may be or share aspects with the devices and apparatuses disclosed in U.S. patent application Ser. No. 15/866,360, filed Jan. 9, 2018, entitled TRACKED DISTANCE MEASURING DEVICES, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Pat. No. 11,397,274, issued Jul. 26, 2022, entitled TRACKED DISTANCE MEASURING DEVICES, SYSTEMS, AND METHODS; U.S. Provisional Patent Application 63/514,090, filed Jul. 17, 2023, entitled SMARTPHONE MOUNTING APPARATUS FOR ASSET TAGGING AS USED WITH UTILITY LOCATOR DEVICES and other devices disclosed in the incorporated applications. In some embodiments, the distance measuring element 1030 may further or instead include one or more optical rangefinders 1032 and/or other rangefinders 1033.

Still referring to FIG. 10, the pothole mapping apparatus 1000 may further include the imaging element 1040 having the first camera 1042 and second camera 1044 wherein the first camera 1042 and second camera 1044 may have overlapping fields of view. In such embodiments, the images generated via the overlapping fields of view of the first camera 1042 and the second camera 1044 may be used to further generate three dimensional models of the utility line 1004 such as the three-dimensional utility line 504 illustrated on the display element 500 of FIG. 5. The utility line 1004 disposed in the pothole 1002 and the surrounding area of the pothole 1002, may optionally be illuminated by an illumination element 1045 having one or more lights. The images may further be correlated with the position data determined via the positioning element 1010, the orientation data determined via the orientation element 1020, and the distance data determined via the distance measuring element 1030. In other embodiments, other numbers of cameras may be included in an imaging element of a pothole mapping apparatus in keeping with the present disclosure. It should be noted, in some embodiments having a plurality of cameras in the imaging element, the degree of overlap may be controlled. For instance, degree of overlap may be a function of the cameras focus on the utility line or lines (e.g., via autofocus through image recognition or other artificial intelligence recognizing the utility line or lines or through manual focus or of cameras which may be motorized).

The first camera 1042 and the second camera 1044 of the imaging element 1040 may be or include high dynamic range (HDR) imagers and/or imagers utilizing other image stacking techniques. Further, in some embodiments, the first camera 1042 and the second camera 1044 of the imaging element 1040 may include a global shutter in scanning the pothole 1002. In some embodiments, the pothole mapping apparatus 1000 may be configured to tilt at various tilt angles in scanning and generating images of the utility line or lines (e.g., the first tilt angle 300, the second tilt angle 310, and the third tilt angle 320 of FIG. 3).

Still referring to FIG. 10, the potholing mapping apparatus 1000 may optionally include a communication element 1050 configured to communicate data relating to the geolocation and depth of the potholed utility line(s), such as the utility line 1004, with one or more systems and devices for mapping utility lines. For instance, the communication element may be or include Bluetooth, Wi-Fi, ISM, or like communication apparatuses. In some embodiments, the communication element 1050 may communicate data relating to the geolocation and depth of the potholed utility line(s) that includes mapped data of utility lines with one or more remote databases 1052, smartphones 1054, and other devices 1056.

Still referring to FIG. 10, the potholing mapping apparatus 1000 may further include a display element 1060 to display images and associated data of the utility line 1004. For instance, such a display element 1060 may be or include a graphical user interface. In some embodiments, the display element may display utility line images with a superimposed scale describing the dimensions of the utility lines (s) (e.g., the measurements 415 superimposed on and describing the utility line 402 of FIG. 4). Likewise, images and associated data of the utility line 1004 may be correlated of data from other sourced (e.g., buried utility line data from utility locator devices and/or associated utility locating databases).

Still referring to FIG. 10, the pothole mapping apparatus 1000 may include a processing element 1070 having one or more processors to carry out methods associated with documenting mapped position and depths of potholed utility lines (e.g., the method 800 of FIG. 8 and the method 900 of FIG. 9). Further, the pothole mapping apparatus 1000 may include a memory element 1075 having one or more non-transitory memories to store instructions relating to methods associated with documenting mapped position and depths of the potholed utility lines and the resulting mapped utility line positions and depths (e.g., the method 800 of FIG. 8 and the method 900 of FIG. 9). The potholing mapping apparatus 1000 may also include a housing element 1080 to encase electronics and other components associated with the pothole mapping apparatus 1000 and a power element 1090 for portioning of electrical power to the various powered elements. The power element 1090 may, for instance, be one or more batteries. The batteries may be or share aspects with the batteries as described in U.S. Pat. No. 10,090,498, issued Oct. 2, 2018, MODULAR BATTERY PACK APPARATUS, SYSTEMS, AND METHODS INCLUDING VIRAL AND/OR CODE TRANSFER and U.S. patent application Ser. No. 16/140,467, issued Sep. 24, 2018, entitled MODULAR BATTERY PACK APPARATUS, SYSTEMS, AND METHODS INCLUDING VIRAL AND/OR CODE TRANSFER; U.S. patent application Ser. No. 16/520,248, issued Jul. 23, 2019, entitled MODULAR BATTERY PACK APPARATUS, SYSTEMS, AND METHODS INCLUDING VIRAL AND/OR CODE TRANSFER; U.S. patent application Ser. No. 16/837,923, issued Apr. 1, 2020, entitled MODULAR BATTERY PACK APPARATUS, SYSTEMS, AND METHODS INCLUDING VIRAL AND/OR CODE TRANSFER; U.S. Pat. No. 11,171,369, issued Nov. 9, 2021, entitled MODULAR BATTERY PACK APPARATUS, SYSTEMS, AND METHODS INCLUDING VIRAL AND/OR CODE TRANSFER; and U.S. Pat. No. 11,476,539, issued Oct. 18, 2022, entitled MODULAR BATTERY PACK APPARATUS, SYSTEMS, AND METHODS INCLUDING VIRAL AND/OR CODE TRANSFER the contents of which are incorporated by reference herein in their entirety.

Figure 11A:
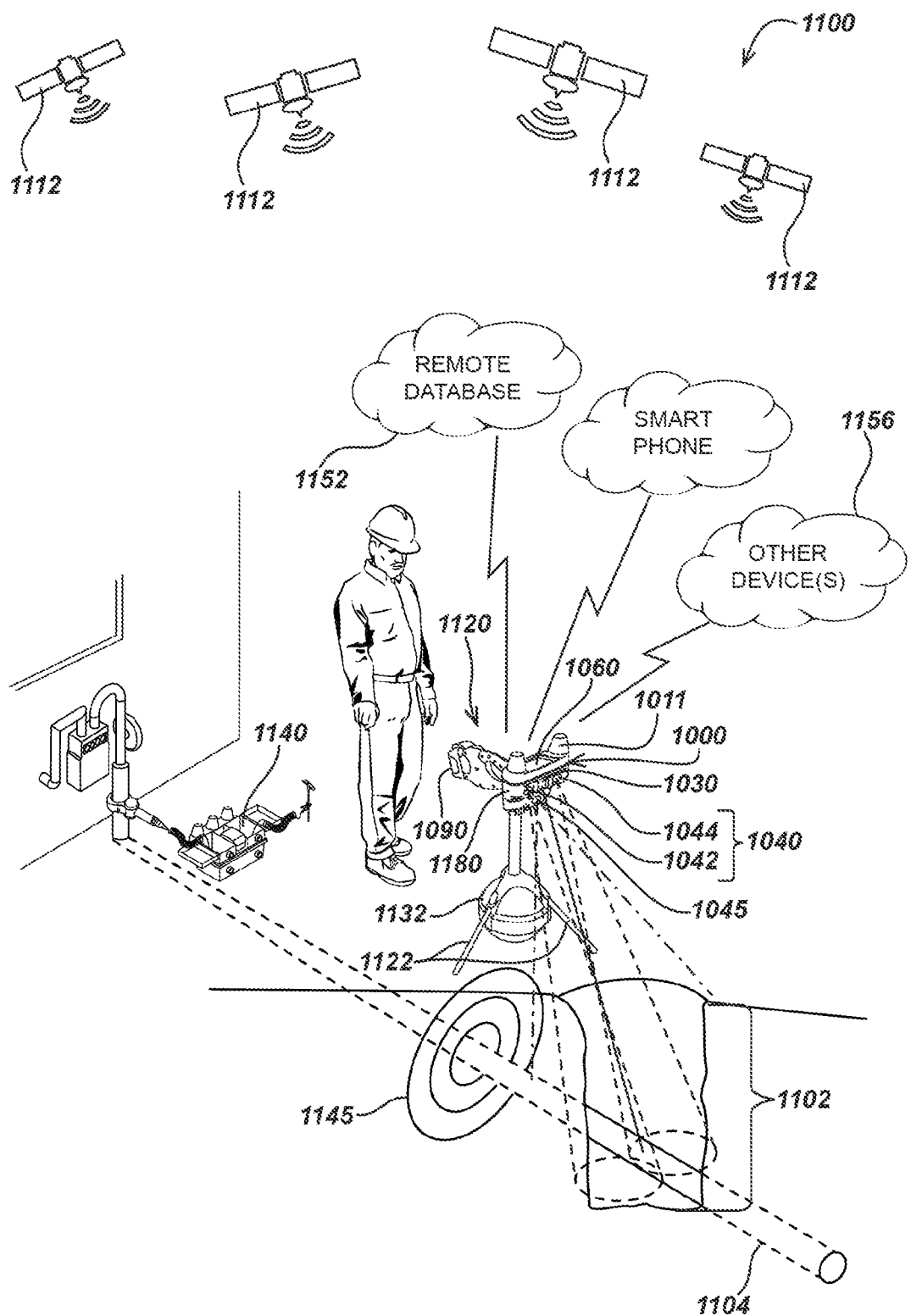
FIG. 11A is an illustration of the pothole mapping apparatus embodiment of FIG. 10 disposed in a utility locator device.
Figure 11B:
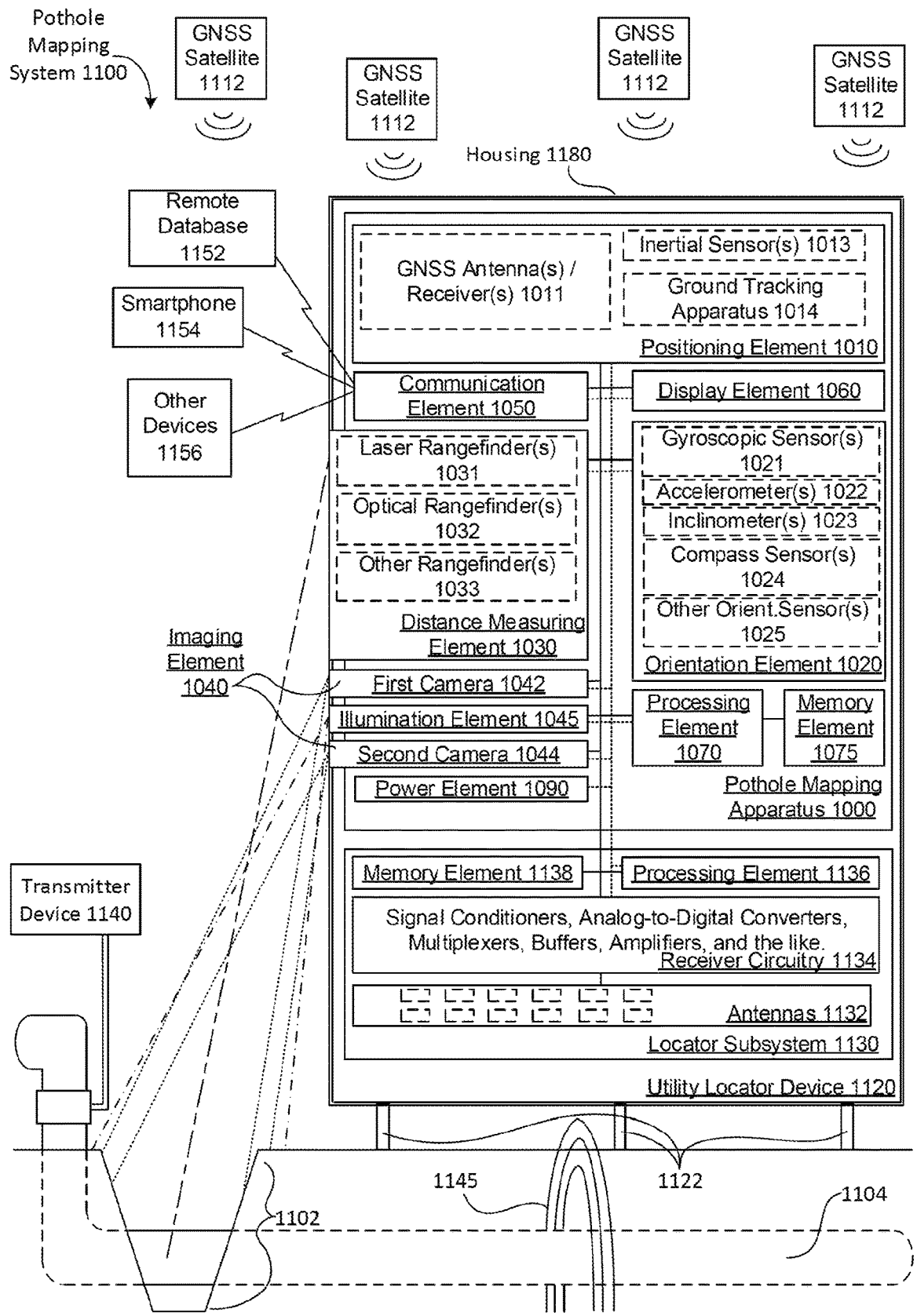
FIG. 11B is a diagram of the pothole mapping apparatus embodiment of FIG. 10 disposed in a utility locator device.

Turning to FIGS. 11A and 11B, a pothole mapping system 1100 is illustrated which may include a utility locator device 1120 that further includes a pipe mapping apparatus in keeping with the present disclosure such as the pipe mapping apparatus 1000 from FIG. 10. The utility locator device 1120 may be configured to determine positions, orientations, and depths of one or more utility lines via magnetic signals, such as the utility line 1004 via magnetic signal 1045. The utility locator device 1020 may be or share aspects with the utility locator devices disclosed in U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,927,545, issued Mar. 27, 2018, entitled MULTI-FREQUENCY LOCATING SYSTEMS AND METHODS; U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 10,078,149, issued Sep. 18, 2018, entitled BURIED OBJECT LOCATOR APPARATUS AND SYSTEMS; and U.S. Pat. No. 10,162,074, issued Dec. 25, 2018, entitled UTILITY LOCATORS WITH RETRACTABLE SUPPORT STRUCTURES AND APPLICATIONS THEREOF; U.S. Pat. No. 10,670,766, issued Jun. 2, 2020, entitled UTILITY LOCATING SYSTEMS, DEVICES, AND METHODS USING RADIO BROADCAST SIGNALS; and U.S. Pat. No. 10,564,309, filed Feb. 18, 2020, entitled SYSTEMS AND METHODS FOR UNIQUELY IDENTIFYING BURIED UTILITIES IN A MULTI-UTILITY ENVIRONMENT as well as the other utility locator devices of the incorporated applications.

Still referring to FIGS. 11A and 11B, the magnetic signal 1145 may be caused by electrical current flowing through the utility line 1104 (e.g., an electrical line) or otherwise coupled to the conductive utility line 1104 (e.g., a copper water pipe, cast iron drain line, or the like) from current being coupled thereto via a transmitter device 1140. In some system embodiments, an electronic marker device placed in a known position relative to the utility line 1204 may instead or additionally be used to determine the position of the associated utility line 1204. Such an electronic marker device may be or share aspects with the those disclosed in U.S. patent application Ser. No. 15/681,250, filed Aug. 18, 2017, entitled ELECTRONIC MARKER DEVICES AND SYSTEMS; U.S. Pat. No. 9,746,572, issued Aug. 29, 2017, entitled ELECTRONIC MARKER DEVICES AND SYSTEMS; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,859,727, issued Dec. 8, 2020, entitled ELECTRONIC MARKER DEVICES AND SYSTEMS; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. Pat. No. 11,333,786, issued May 17, 2022, entitled BURIED UTILITY MARKER DEVICES, SYSTEMS, AND METHODS; and U.S. Pat. No. 11,467,317, issued Oct. 11, 2022, entitled ELECTROMAGNETIC MARKER DEVICES WITH SEPARATE RECEIVE AND TRANSMIT ANTENNA ELEMENTS as well as the other marker devices of the incorporated applications.

Turning to FIG. 11B, the utility locator device 1120 may include one or more antennas 1132 and associated receiver circuitry 1134 (e.g., signal conditioners, analog-to-digital converters, multiplexers, amplifiers, and the like) to receive magnetic signals 1145 and/or signals emitted by electronic marker devices. It should be noted that though the utility locator device 1120 is illustrated as having twelve antennas 1132, in other embodiments other numbers of antennas may be used. Processing of magnetic signals 1145 and/or processing of other data which may include that from the pothole mapping apparatus 1000 may occur in a processing element 1136 having one or more processors in the locator subsystem 1130. Alternatively or additionally, processing of data may occur in the processing element 1036 disposed in the pothole mapping apparatus 1000 and/or in one or more remotely connected devices (e.g., remote database 1152, smartphone 1154, and/or other devices 1156). Utility line data of potholed utility lines may, for instance, be combined with other mapped utility lines in a remote database (e.g., remote database 1152). This may be particular advantageous where the potholed utility lines are non-conductive, allowing the mapped utility lines in the remote database (e.g., remote database 1152) to further include data regarding non-conductive utility lines that may otherwise be unavailable from maps generated by data collected from utility locator devices. Further, data relating to determining utility line positions, orientations, depth which may include the geolocations of potholes (e.g., pothole 1102) determined via GNSS receivers/antennas 1011 thorough receiving navigation signals from a plurality of GNSS satellites 1112 as well as instructions related to methods described herein may be store in a memory element 1138 having one or more non-transitory memories disposed in the locator subsystem 1130, the memory element 1075 disposed in the pothole mapping apparatus 1000, and/or a memory element in one or more remotely connected devices (e.g., remote database 1152, smartphone 1154, and/or other devices 1156). The utility locator device 1120 including the pothole mapping apparatus 1000 may further include a housing element 1180 to encase electronics and other components.

Figure 12:
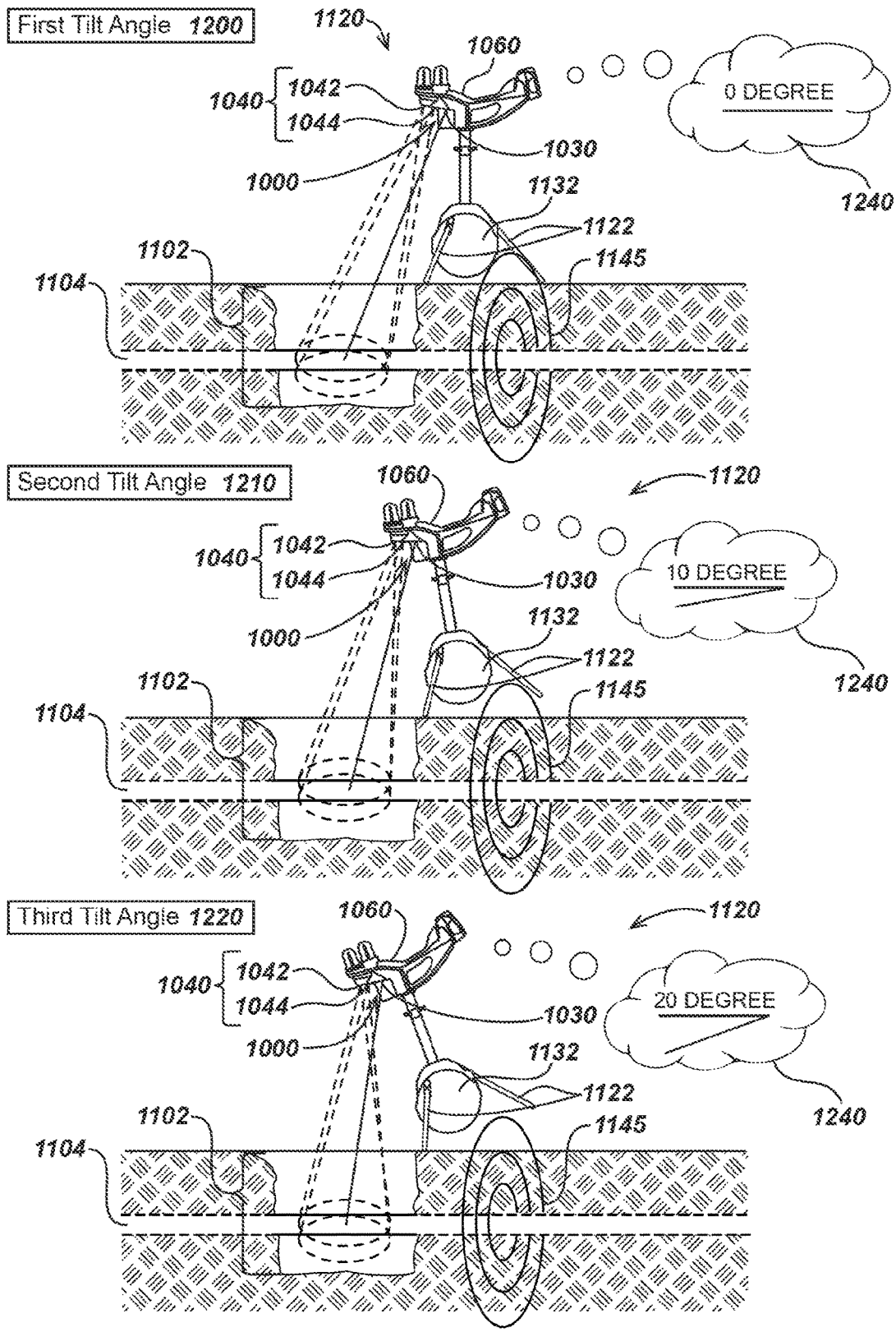
FIG. 12 is an illustration demonstrating an embodiment of scanning of a potholed utility line using different tilt angles by the utility locator device of FIGS. 11A and 11B.

As illustrated in FIG. 12, the utility locator device 1120 including the pothole mapping apparatus 1000 is illustrated tilted at various angles in scanning and generating images of the utility line 1104 disposed in the pothole 1102. For instance, the utility locator device 1120 including the pothole mapping apparatus 1000 may be tilted at a first tilt angle 1200, a second tilt angle 1210, a third tilt angle 1220. In other embodiments, a utility locator device including the pothole mapping apparatus in keeping with the present disclosure may be tilted at other numbers of tilt angles through to an nth tilt angle. The utility locator device 1120 including the pothole mapping apparatus 1000 may be held at each of the tilt angles (e.g., the first tilt angle 1200, the second tilt angle 1210, and the third tilt angle 1220), in various different ways. For instance, the legs of a tripod 1122 may be configured to extend, collapse, or otherwise be adjusted by a user to achieve different tilt angles. Likewise, in some embodiments the head of the utility locator device 1120 including the pothole mapping apparatus 1000 may be configured to tilt at various tilt angles (not illustrated). In yet further embodiments, a user may hold the utility locator device 1120 including the pothole mapping apparatus 1000 at various angles, for instance, supported on the front leg or legs of a tripod such as the tripod 1122. In some such embodiments, the tilt angle may be indicated via a tilt indicator 1240 which may be shown on an electronic display. The tilt indicator 1240 may be used to, for instance, to guide the user to hold the utility locator device 1120 including the pothole mapping apparatus 1000 at specific tilt angles. It should be noted that the different tilt angles may facilitate the scanning of utility lines (e.g., the utility line 1104) and generate both distance measurements and images of one or more utility lines in a pothole (e.g., the pothole 1102). The images taken at different tilt angles may allow for the virtually reconstruct a three-dimensional image of the utility line or lines such as that shown with the utility line 504 on the display element 500 of FIG. 5.

Figure 13:
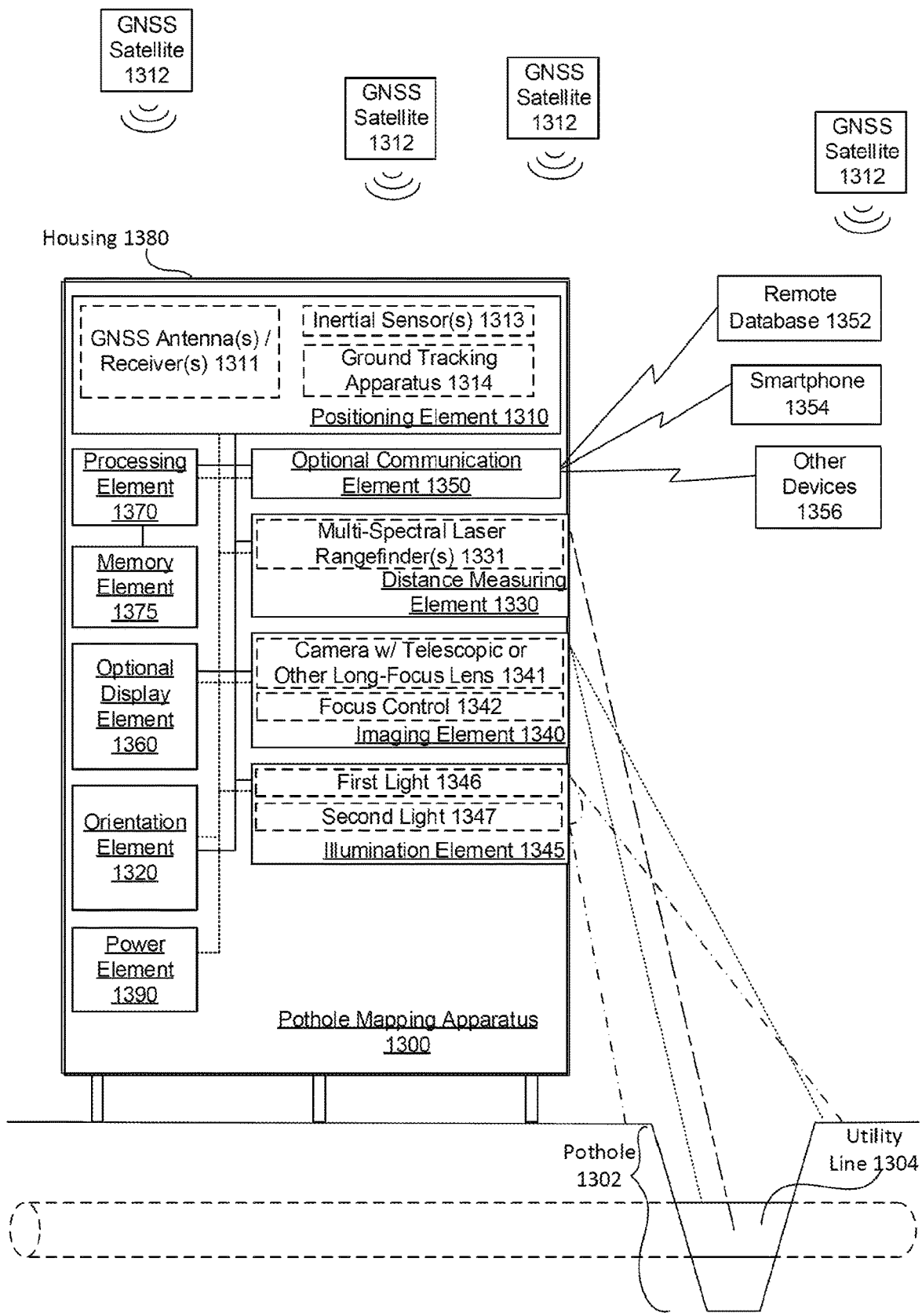
FIG. 13 is a diagram of another pothole mapping apparatus embodiment in keeping with aspects of the present disclosure having an imaging element with telescopic or other long-focus lens(es).

Turning to FIG. 13, a pothole mapping apparatus 1300 in keeping with the present disclosure is illustrated which may be or share aspects with the pothole mapping apparatus 200 of FIGS. 2A and 2B or the pothole mapping apparatus 1000 of FIG. 10 further including one or more telephoto or other long-focus lenses that may be configured to focus on a utility line in a pothole (e.g., an imaging element 1340 having a camera with telescopic or other long-focus lens 1341 and a focus control 1342). The pothole mapping apparatus 1300 may include a positioning element 1310 to determine position data describing the geolocation of the pothole mapping apparatus in the world frame as it is positioned at the ground surface about a pothole 1302. The positioning element 1310 may, for instance, be or include one or more global navigation satellite system (GNSS) receivers/antennas 1311 (e.g., GPS, Galileo, GLONASS, BeiDou, or the like) to receive signals from a plurality of GNSS satellites 1312. The GNSS receivers/antennas 1311 may be or share aspects with the GNSS devices, systems, and methods disclosed the U.S. patent application Ser. No. 17/241,676, filed Apr. 27, 2021, entitled SPATIALLY AND PROCESSING-BASED DIVERSE REDUNDANCY FOR RTK POSITIONING OR OTHER POSITIONING SYSTEMS AND METHODS; U.S. patent application Ser. No. 17/461,833, filed Aug. 30, 2021, entitled COMBINED SATELLITE NAVIGATION AND RADIO TRANSCEIVER ANTENNA DEVICES; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; and other such system, devices, and methods disclosed in the incorporated applications.

Still referring to FIG. 13, the positioning element 1300 may further include one or more inertial sensors 1313 which may include, but should not be limited to, one or more accelerometers, gyroscopic sensors, inertial navigation systems (INS) and/or other like sensors for tracking movement. The positioning element 1300 may further include one or more ground tracking apparatuses 1314 such as those configured to optically or mechanically track movements relative to the ground surface. The ground tracking apparatuses 1314 may be or share aspects with those disclosed in U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; and other devices disclosed in the incorporated applications.

Still referring to FIG. 13, the pothole mapping apparatus 1300 may include an orientation element 1320 to determine orientation data describing the direction, tilt, and pose of the pothole mapping apparatus in three dimensions. The orientation data may correlate with the position data determined by the positioning element 1310. The orientation element 1320 may include, but should not be limited to, one or more gyroscopic sensors, accelerometers, inclinometers, compass sensors, and/or other orientation sensors.

Still referring to FIG. 13, the pothole mapping apparatus 1300 may include a distance measuring element 1330 to determine distance data describing the distance between the pothole mapping apparatus 1300 and one or more utility lines, such as the utility line 1304, in a pothole 1302. The distance data may correlate with the position data determined by the positioning element 1310 and the orientation data determined by the orientation element 1320.

The distance measuring element 1330 may include a multi-spectral laser rangefinder 1331 which may be or share aspects with the devices and apparatuses disclosed in U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Provisional Patent Application 63/514,090, filed Jul. 17, 2023, entitled SMARTPHONE MOUNTING APPARATUS FOR ASSET TAGGING AS USED WITH UTILITY LOCATOR DEVICES; and other devices disclosed in the incorporated applications. In some embodiments, the distance measuring element 1030 may further or instead include one or more other types of laser rangefinders, optical rangefinders, and/or other types of rangefinders.

Still referring to FIG. 13, the pothole mapping apparatus 1300 may further include an imaging element 1340 having a camera with telescopic or other long-focus lens 1341 and a focus control 1342. In such embodiments, the focus control 1342 may be an autofocus mechanism wherein a utility line 1304 may be focused on through image recognition or other artificial intelligence to recognize the utility line 1304. For instance, the artificial intelligence or other utility recognition may include the systems and methods disclosed in U.S. patent application Ser. No. 17/935,564, filed Sep. 26, 2022, entitled SYSTEMS AND METHODS FOR DETERMINING AND DISTINGUISHING BURIED OBJECTS USING ARTIFICIAL INTELLIGENCE if the incorporated applications. Likewise, in some embodiments, the focus control may be manual and adjusted via a user. For instance, the focus control 1342 may include one or more buttons to adjust focus via a motorized manual focus mechanism. The utility line 1302 disposed in the pothole 1304 and the surrounding area of the pothole 1304, may optionally be illuminated by an illumination element 1345 having a first light 1346 and a second light 1347. The images may further be correlated with the position data determined via the positioning element 1310, the orientation data determined via the orientation element 1320, and the distance data determined via the distance measuring element 1330. In other embodiments, other numbers of cameras may be included in an imaging element of a pothole mapping apparatus in keeping with the present disclosure. It should be noted, in some embodiments having a plurality of cameras in the imaging element, the degree of overlap may be controlled. For instance, degree of overlap may be a function of the cameras focus on the utility line or lines (e.g., via autofocus through image recognition or other artificial intelligence recognizing the utility line or lines or through manual focus or of cameras which may be motorized).

The camera with telescopic or other long-focus lens 1341 of the imaging element 1340 may be or include high dynamic range (HDR) imagers and/or imagers utilizing other image stacking techniques. Further, in some embodiments, camera with telescopic or other long-focus lens 1341 of the imaging element 1340 may include a global shutter in scanning the pothole 1302. In some embodiments, the pothole mapping apparatus 1300 may be configured to tilt at various tilt angles in scanning and generating images of the utility line or lines (e.g., the first tilt angle 300, the second tilt angle 310, and the third tilt angle 320 of FIG. 3).

Still referring to FIG. 13, the potholing mapping apparatus 1300 may optionally include a communication element 1350 configured to communicate data relating to the geolocation and depth of the potholed utility line(s), such as the utility line 1302, with one or more systems and devices for mapping utility lines. For instance, the communication element may be or include Bluetooth, Wi-Fi, ISM, or like communication apparatus. In some embodiments, the communication element 1350 may communicate data relating to the geolocation and depth of the potholed utility line(s) that includes mapped data of utility lines with one or more remote databases 1352, smartphones 1354, and other devices 1356.

Still referring to FIG. 13, the potholing mapping apparatus 1300 may further include a display element 1360 to display images and associated data of the utility line 1302. For instance, such a display element 1360 may be or include a graphical user interface. In some embodiments, the display element may display utility line images with a superimposed scale describing the dimensions of the utility lines(s) (e.g., the measurements 415 superimposed on and describing the utility line 402 of FIG. 4). Likewise, images and associated data of the utility line 1302 may be correlated of data from other sourced (e.g., buried utility line data from utility locator devices and/or associated utility locating databases).

Still referring to FIG. 13, the pothole mapping apparatus 1300 may include a processing element 1370 having one or more processors to carry out methods associated with documenting mapped position and depths of potholed utility lines (e.g., the method 800 of FIG. 8 and the method 900 of FIG. 9). Further, the pothole mapping apparatus 1300 may include a memory element 1375 having one or more non-transitory memories to store instructions relating to methods associated with documenting mapped position and depths of the potholed utility lines and the resulting mapped utility line positions and depths (e.g., the method 800 of FIG. 8 and the method 900 of FIG. 9). The potholing mapping apparatus 1300 may also include a housing element 1380 to encase electronics and other components associated with the pothole mapping apparatus 1300 and a power element 1390 for portioning of electrical power to the various powered elements. The power element 1390 may, for instance, be one or more batteries. The batteries may be or share aspects with the batteries as described in U.S. Pat. No. 10,090,498, issued Oct. 2, 2018, MODULAR BATTERY PACK APPARATUS, SYSTEMS, AND METHODS INCLUDING VIRAL AND/OR CODE TRANSFER and U.S. patent application Ser. No. 16/140,467, issued Sep. 24, 2018, entitled MODULAR BATTERY PACK APPARATUS, SYSTEMS, AND METHODS INCLUDING VIRAL AND/OR CODE TRANSFER; U.S. patent application Ser. No. 16/520,248, issued Jul. 23, 2019, entitled MODULAR BATTERY PACK APPARATUS, SYSTEMS, AND METHODS INCLUDING VIRAL AND/OR CODE TRANSFER, U.S. patent application Ser. No. 16/837,923, issued Apr. 1, 2020, entitled MODULAR BATTERY PACK APPARATUS, SYSTEMS, AND METHODS INCLUDING VIRAL AND/OR CODE TRANSFER; U.S. Pat. No. 11,171,369, issued Nov. 9, 2021, entitled MODULAR BATTERY PACK APPARATUS, SYSTEMS, AND METHODS INCLUDING VIRAL AND/OR CODE TRANSFER; and U.S. Pat. No. 11,476,539, issued Oct. 18, 2022, entitled MODULAR BATTERY PACK APPARATUS, SYSTEMS, AND METHODS INCLUDING VIRAL AND/OR CODE TRANSFER the contents of which are incorporated by reference herein in their entirety.

Figure 14A:
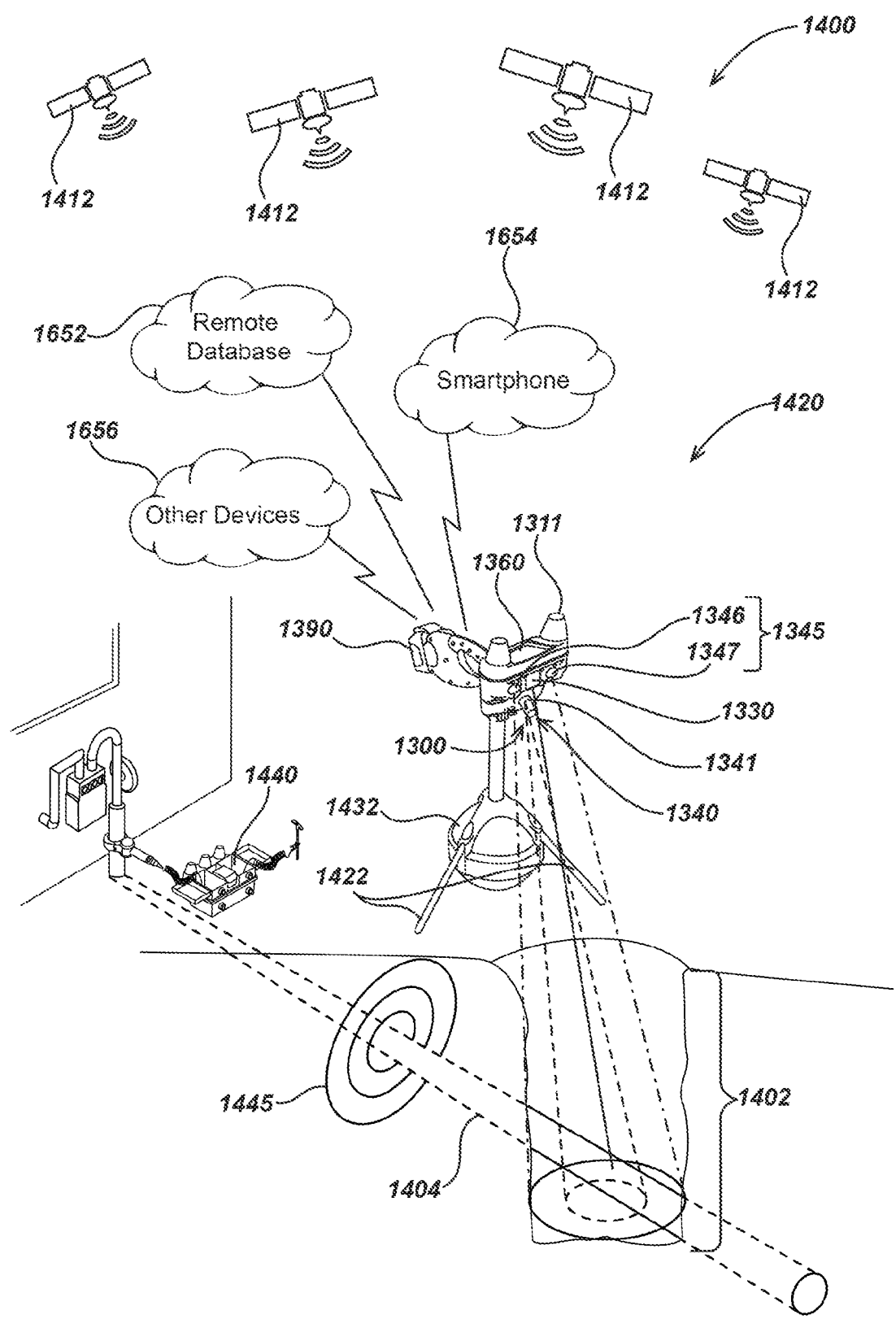
FIG. 14A is an illustration of the pothole mapping system employing the pothole mapping apparatus embodiment of FIG. 13 disposed in a utility locator device.
Figure 14B:
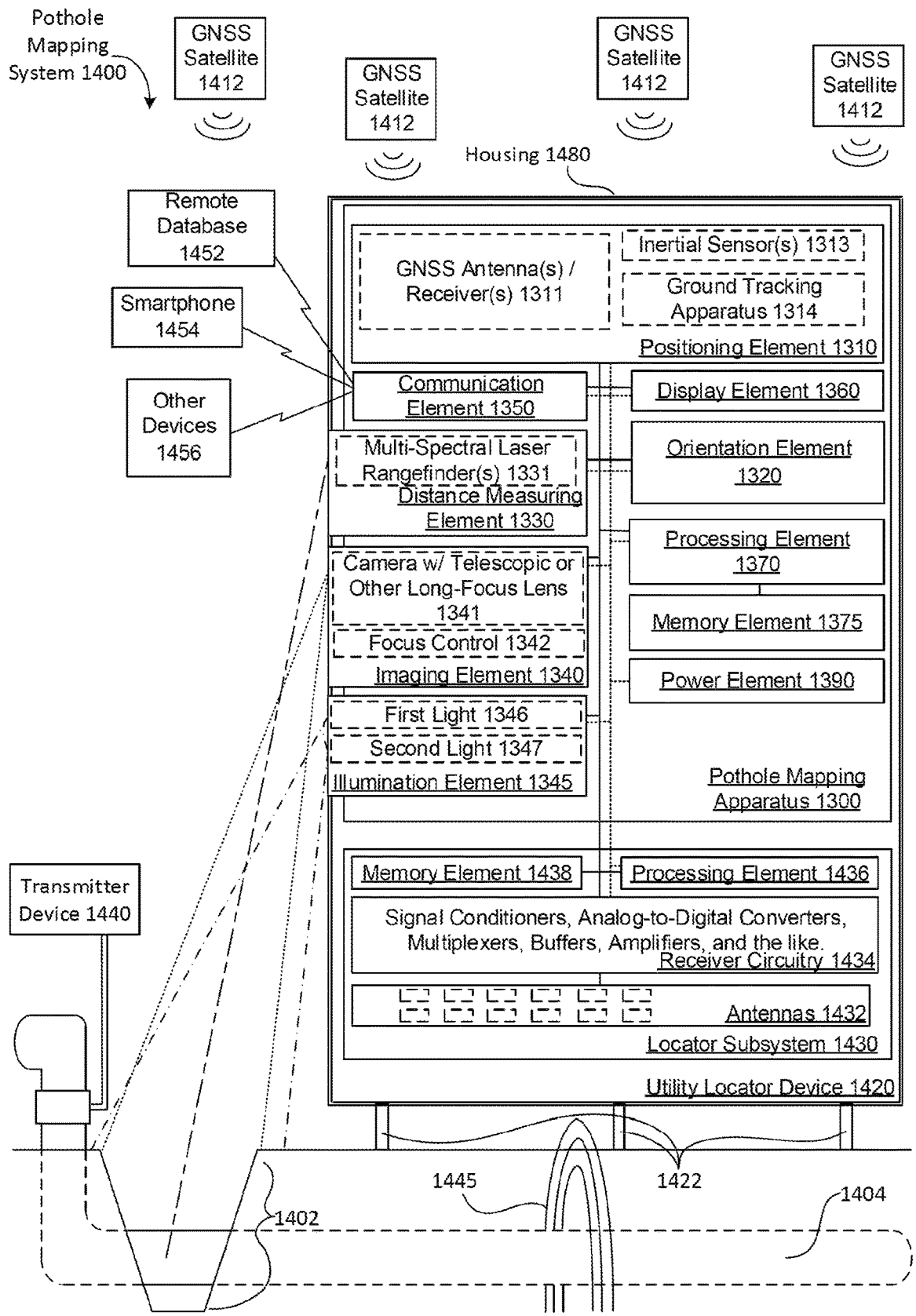
FIG. 14B is a diagram of the pothole mapping system of FIG. 14A.

Turning to FIGS. 14A and 14B, a pothole mapping system 1400 is illustrated which may include a utility locator device 1420 that further includes a pipe mapping apparatus in keeping with the present disclosure such as the pipe mapping apparatus 1300 from FIG. 13. The utility locator device 1420 may be configured to determine positions, orientations, and depths of one or more utility lines via magnetic signals, such as the utility line 1404 via magnetic signal 1445. The utility locator device 1420 may be or share aspects with the utility locator devices disclosed in U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,927,545, issued Mar. 27, 2018, entitled MULTI-FREQUENCY LOCATING SYSTEMS AND METHODS; U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 10,078,149, issued Sep. 18, 2018, entitled BURIED OBJECT LOCATOR APPARATUS AND SYSTEMS; and U.S. Pat. No. 10,162,074, issued Dec. 25, 2018, entitled UTILITY LOCATORS WITH RETRACTABLE SUPPORT STRUCTURES AND APPLICATIONS THEREOF; U.S. Pat. No. 10,670,766, issued Jun. 2, 2020, entitled UTILITY LOCATING SYSTEMS, DEVICES, AND METHODS USING RADIO BROADCAST SIGNALS; and U.S. Pat. No. 10,564,309, filed Feb. 18, 2020, entitled SYSTEMS AND METHODS FOR UNIQUELY IDENTIFYING BURIED UTILITIES IN A MULTI-UTILITY ENVIRONMENT as well as the other utility locator devices of the incorporated applications.

Still referring to FIGS. 14A and 14B, the magnetic signal 1445 may be caused by electrical current flowing through the utility line 1404 (e.g., an electrical line) or otherwise coupled to the conductive utility line 1404 (e.g., a copper water pipe, cast iron drain line, or the like) from current being coupled thereto via a transmitter device 1440. In some system embodiments, an electronic marker device placed in a known position relative to the utility line 1404 may instead or additionally be used to determine the position of the associated utility line 1404. Such an electronic marker device may be or share aspects with the those disclosed in U.S. patent application Ser. No. 15/681,250, filed Aug. 18, 2017, entitled ELECTRONIC MARKER DEVICES AND SYSTEMS; U.S. Pat. No. 9,746,572, issued Aug. 29, 2017, entitled ELECTRONIC MARKER DEVICES AND SYSTEMS; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,859,727, issued Dec. 8, 2020, entitled ELECTRONIC MARKER DEVICES AND SYSTEMS; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS as well as the other marker devices of the incorporated applications.

Turning to FIG. 14B, the utility locator device 1420 may include one or more antennas 1432 and associated receiver circuitry 1434 (e.g., signal conditioners, analog-to-digital converters, multiplexers, amplifiers, and the like) to receive magnetic signals 1445 and/or signals emitted by electronic marker devices. It should be noted that though the utility locator device 1420 is illustrated as having twelve antennas 1432, in other embodiments other numbers of antennas may be used. Processing of magnetic signals 1445 and/or processing of other data which may include that from the pothole mapping apparatus 1300 may occur in a processing element 1436 having one or more processors in the locator subsystem 1430. Alternatively or additionally, processing of data may occur in the processing element 1336 disposed in the pothole mapping apparatus 1300 and/or in one or more remotely connected devices (e.g., remote database 1452, smartphone 1454, and/or other devices 1456). Utility line data of potholed utility lines may, for instance, be combined with other mapped utility lines in a remote database (e.g., remote database 1452). This may be particular advantageous where the potholed utility lines are non-conductive, allowing the mapped utility lines in the remote database (e.g., remote database 1452) to further include data regarding non-conductive utility lines that may otherwise be unavailable from maps generated by data collected from utility locator devices. Further, data relating to determining utility line positions, orientations, depth which may include the geolocations of potholes (e.g., pothole 1402) determined via GNSS receivers/antennas 1311 thorough receiving navigation signals from a plurality of GNSS satellites 1412 as well as instructions related to methods described herein may be store in a memory element 1438 having one or more non-transitory memories disposed in the locator subsystem 1430, the memory element 1375 disposed in the pothole mapping apparatus 1300, and/or a memory element in one or more remotely connected devices (e.g., remote database 1452, smartphone 1454, and/or other devices 1456). The utility locator device 1420 including the pothole mapping apparatus 1300 may further include a housing element 1480 to encase electronics and other components.

Figure 15:
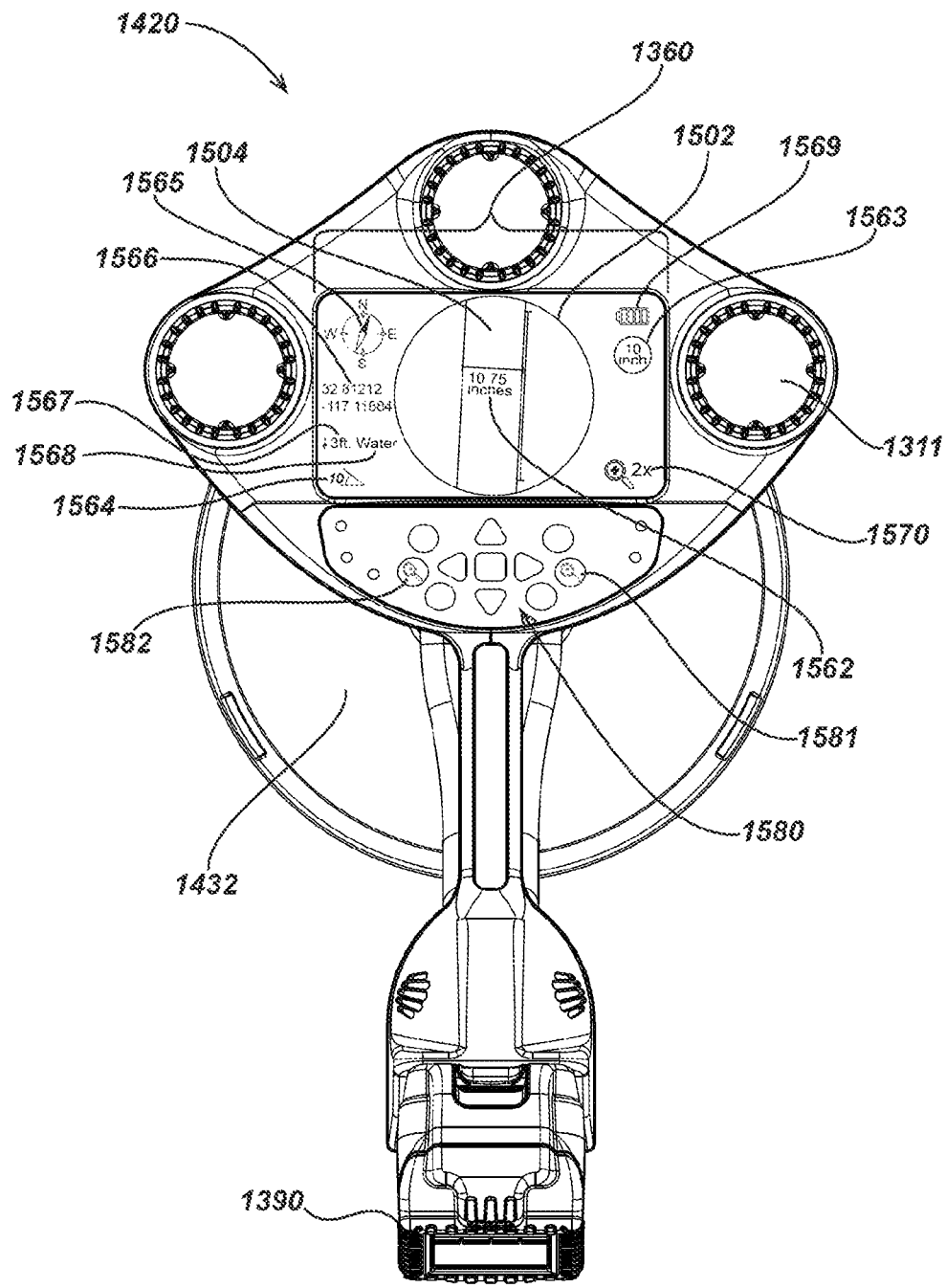
FIG. 15 is an illustration showing the display element embodiment of the utility locator device of FIGS. 14A and 14B.

Turning to FIG. 15, the utility locator device 1420 that includes the pipe mapping apparatus 1300 (FIGS. 14 and 14B) is illustrated showing details of the display element 1360. As illustrated, the display element 1360 may display images of one or more utility lines, such as a utility line 1504, and surrounding environment which may be from a pothole 1502. One or more measurements 1562 describing the utility line 1504 may be superimposed on the utility line 1504 on the display element 1360. A pipe size indicator 1563 may indicate the size of the utility line 1504 based on the measurements 1562. An inclination angle indicator 1564 may be shown on the display element 1360 indicating the degree of tilt of the utility locator device 1420. For instance, the inclination angle indicator 1564 may be utilized in determining different tilt angles when scanning a potholed utility line as demonstrated in FIG. 3 or FIG. 12. The display element 1360 may further include a heading indicator 1565 describing a heading relative to north, a geolocation indicator 1566 showing GNSS coordinates, and a depth indicator 1567 which may indicate the depth of the utility line 1504 below the grounds surface. Further, the display element 1360 may include a utility type indicator 1568. The potholing of the utility line 1504 provides an opportunity to visually verify the utility line type. A user may thereby select the utility type indicated by the utility type indicator 1568. Likewise, in some embodiments, the utility type indicated on the utility type indicator 1568 may be determined by image recognition algorithms or other artificial intelligence based on the images of the utility line 1504. For instance, the artificial intelligence or other utility recognition may include the systems and methods disclosed in U.S. patent application Ser. No. 17/935,564, filed Sep. 26, 2022, entitled SYSTEMS AND METHODS FOR DETERMINING AND DISTINGUISHING BURIED OBJECTS USING ARTIFICIAL INTELLIGENCE if the incorporated applications. The display element 1360 may further include a battery level indicator 1569 indicating the level of charge remaining in the battery/power element of the pothole mapping apparatus or utility locator device that includes a pothole mapping apparatus. A zoom indicator 1570 may display the degree of zoom of the camera with telescopic or other long-focus lens 1341 (FIG. 13) or other cameras in other embodiments. A series of buttons 1580 may be used to control aspects of the utility locator device 1420 and/or pipe mapping apparatus 1300 (FIGS. 14 and 14B). For instance, focus control of the camera with telescopic or other long-focus lens 1341 (FIG. 13) or other camera lens in other embodiments may be achieved via pressing a zoom in button 1581 or a zoom out button 1582 to control a motorized focusing mechanism in the camera. A user may observe the focus of the camera with telescopic or other long-focus lens 1341 (FIG. 13) or other camera on the display element 1360 and adjust until the utility line is well focused. In some embodiments, focusing may instead or additionally be achieved through autofocus mechanisms. For instance, image recognition or other artificial intelligence may be used to recognize the utility line 1504. For instance, the artificial intelligence or other utility recognition may include the systems and methods disclosed in U.S. patent application Ser. No. 17/935,564, filed Sep. 26, 2022, entitled SYSTEMS AND METHODS FOR DETERMINING AND DISTINGUISHING BURIED OBJECTS USING ARTIFICIAL INTELLIGENCE if the incorporated applications. In other embodiments, zoom controls and/or other input may be provided via touchscreen, voice commands, and/or other user input mechanisms or technologies.

Figure 16A:
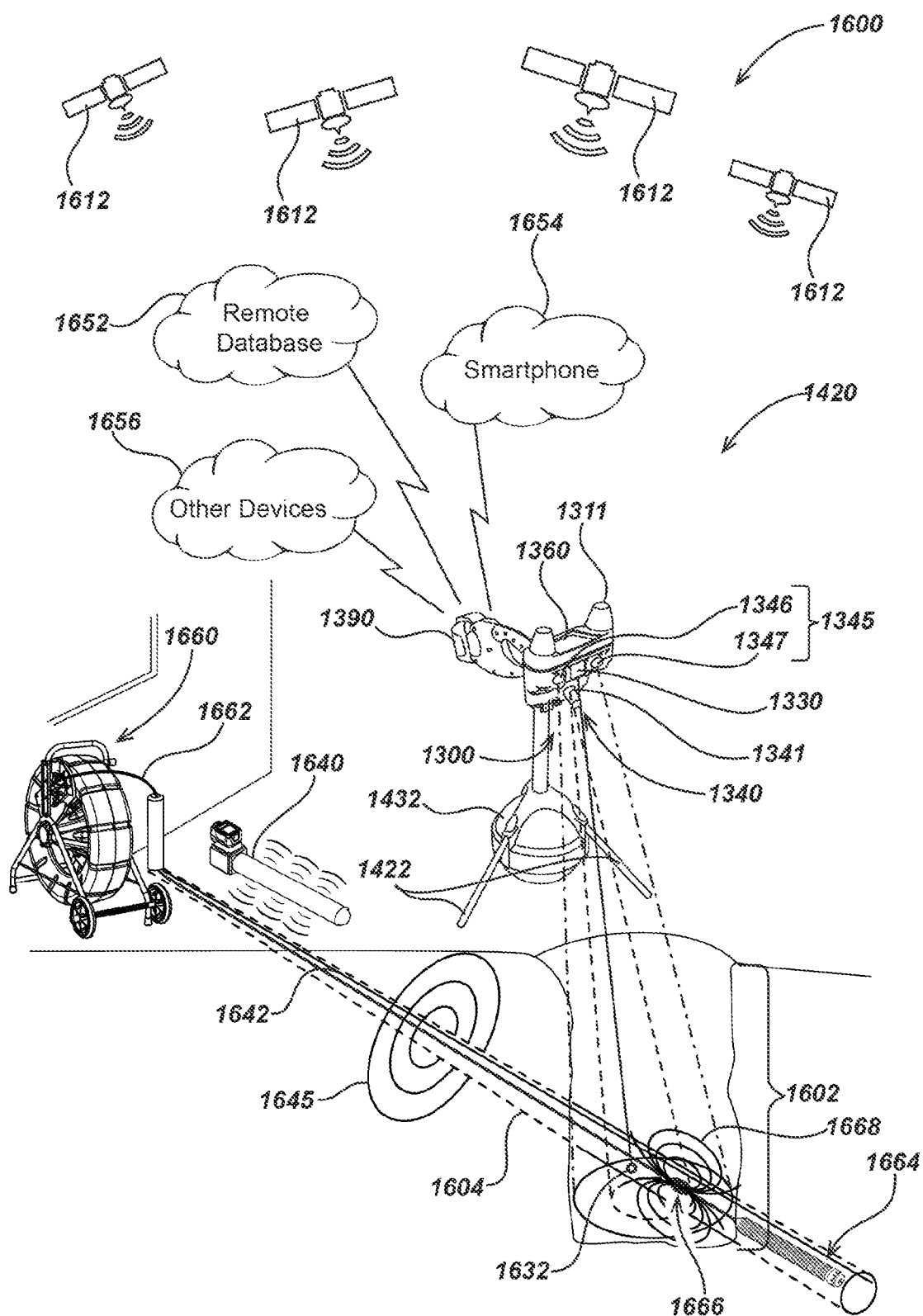
FIG. 16A is an illustration of another pothole mapping system employing the pothole mapping apparatus embodiment of FIG. 13 disposed in the utility locator device of FIG. 14A.
Figure 16B:
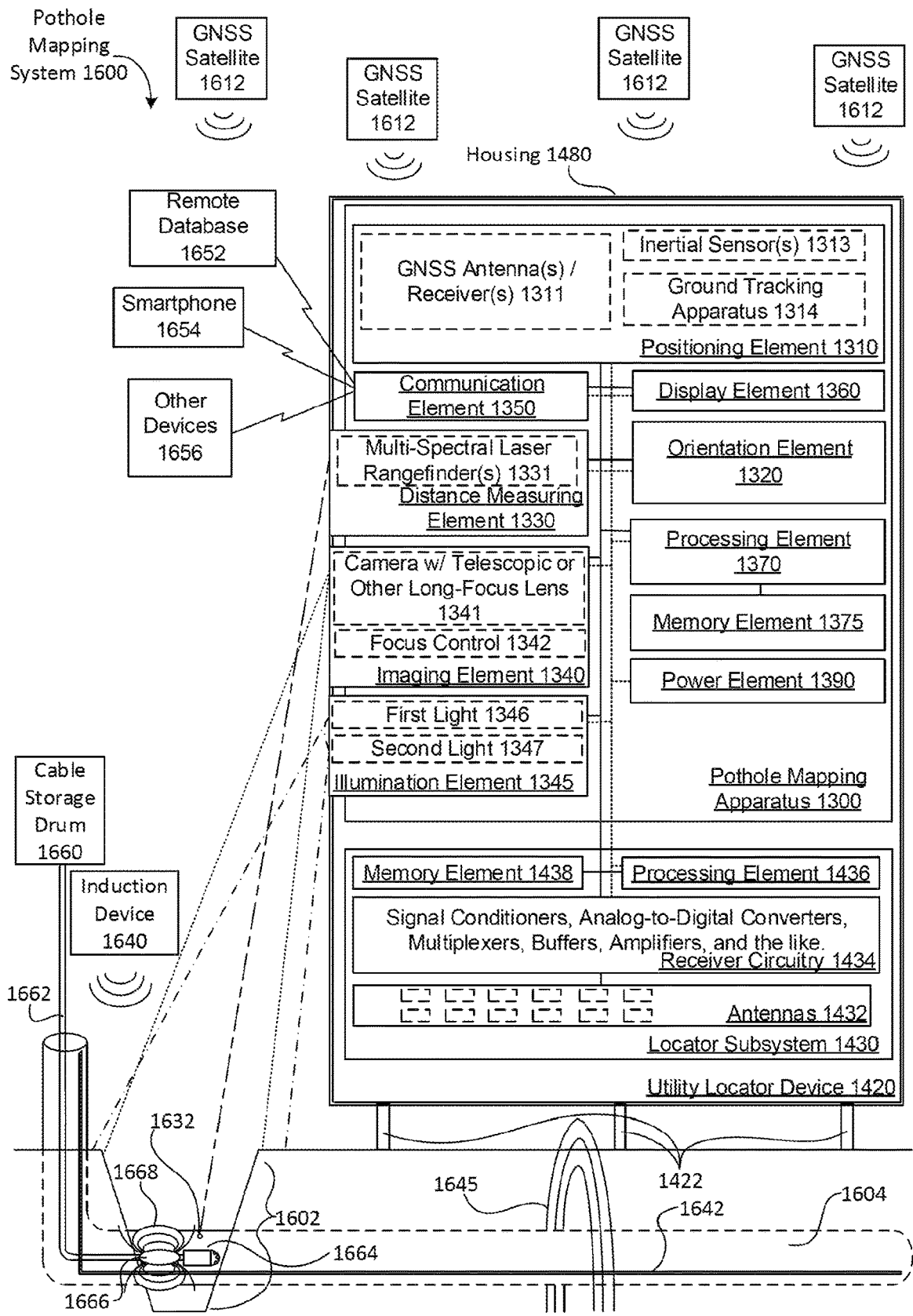
FIG. 16B is a diagram of the pothole mapping system of FIG. 16A.

Turning to FIGS. 16A and 16B, a pothole mapping system 1600 is illustrated which may include the utility locator device 1420 of FIGS. 14A and 14B that further includes a pipe mapping apparatus in keeping with the present disclosure such as the pipe mapping apparatus 1300 from FIG. 13. The utility locator device 1420 may be configured to determine positions, orientations, and depths of one or more utility lines via magnetic signals, such as the utility line 1604 via a magnetic signal 1645 from a tracer wire 1642 or a signal 1668 emitted via a pipe Sonde 1666. The utility locator device 1420 may be or share aspects with the utility locator devices disclosed in U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,927,545, issued Mar. 27, 2018, entitled MULTI-FREQUENCY LOCATING SYSTEMS AND METHODS; U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 10,078,149, issued Sep. 18, 2018, entitled BURIED OBJECT LOCATOR APPARATUS AND SYSTEMS; and U.S. Pat. No. 10,162,074, issued Dec. 25, 2018, entitled UTILITY LOCATORS WITH RETRACTABLE SUPPORT STRUCTURES AND APPLICATIONS THEREOF; U.S. Pat. No. 10,670,766, issued Jun. 2, 2020, entitled UTILITY LOCATING SYSTEMS, DEVICES, AND METHODS USING RADIO BROADCAST SIGNALS; and U.S. Pat. No. 10,564,309, filed Feb. 18, 2020, entitled SYSTEMS AND METHODS FOR UNIQUELY IDENTIFYING BURIED UTILITIES IN A MULTI-UTILITY ENVIRONMENT as well as the other utility locator devices of the incorporated applications.

Still referring to FIGS. 16A and 16B, the pothole mapping system 1600 may further include a cable storage drum 1660 to store and dispense a push-cable 1662 that may facilitate a camera head 1664 being moved through the utility line 1604 and generating imagery allowing a user to inspect the interior of the utility line 1604. The pipe Sonde 1666 may likewise be on the push-cable 1662 generally at a known distance relative to the camera head 1664. The pipe Sonde 1666 may optionally be positioned in the pothole 1602 such that the signal 1666 therefrom may allow the utility locator device 1420 to find and map the pothole 1602 and utility line 1604 location and depth as well as the utility line 1604 orientation/pose. The cable storage drum 1660 may be or share aspects with the those disclosed in U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 8,547,428, issued Oct. 1, 2013, entitled PIPE MAPPING SYSTEM; U.S. Pat. No. 9,521,303, issued Dec. 13, 2016, entitled CABLE STORAGE DRUM WITH MOVEABLE CCU DOCKING APPARATUS; U.S. patent application Ser. No. 17/110,273, filed Dec. 2, 2020, entitled INTEGRAL DUAL CLEANER CAMERA DRUM SYSTEMS AND METHODS; U.S. patent application Ser. No. 17/815,387, filed Jul. 27, 2022, entitled INWARD SLOPED DRUM FACE FOR PIPE INSPECTION CAMERA SYSTEMS; U.S. Pat. No. 11,558,537, issued Jan. 17, 2023, entitled VIDEO INSPECTION SYSTEM WITH WIRELESS ENABLED CABLE STORAGE DRUM; U.S. Pat. No. 11,614,613, issued Mar. 28, 2023, entitled DOCKABLE CAMERA REEL AND CCU SYSTEM; U.S. Provisional Patent Application 63/510, 014, filed Jun. 23, 2023, entitled INNER DRUM MODULE WITH PUSH-CABLE INTERFACE FOR PIPE INSPECTION; U.S. Provisional Patent Application 63/599,890, filed Nov. 16, 2023, entitled VIDEO INSPECTION AND CAMERA HEAD TRACKING SYSTEMS AND METHODS as well as the other utility locator devices of the incorporated applications. The push-cable 1662 may be or share aspects with the those disclosed in U.S. Pat. No. 5,939,679, issued Aug. 17, 1999, entitled VIDEO PUSH CABLE; U.S. Pat. No. 8,289,385, issued Oct. 16, 2012, entitled PUSH-CABLE FOR PIPE INSPECTION SYSTEM; U.S. Pat. No. 8,984, 698, issued Mar. 24, 2015, entitled LIGHT WEIGHT SEWER CABLE; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,468,954, issued Oct. 18, 2016, entitled PIPE INSPECTION SYSTEM WITH JETTER PUSH-CABLE; U.S. patent application Ser. No. 16/443,789, filed Jun. 17, 2019, entitled MULTI-DIELECTRIC COAXIAL PUSH-CABLES AND ASSOCIATED PUSH-CABLES; U.S. Pat. No. 10,764,541, issued Sep. 1, 2020, entitled COAXIAL VIDEO PUSH-CABLES FOR USE IN INSPECTION SYSTEMS; and U.S. Pat. No. 11,649,917, issued May 16, 2023, entitled INTEGRATED FLEX-SHAFT CAMERA SYSTEM WITH HAND CONTROL as well as the other utility locator devices of the incorporated applications. The camera head 1664 may be or share aspects with the those disclosed in U.S. Pat. No. 8,395,661, issued Mar. 12, 2013, entitled PIPE INSPECTION SYSTEM WITH SELECTIVE IMAGE CAPTURE; U.S. Pat. No. 8,587,648, issued Nov. 19, 2013, entitled SELF-LEVELING CAMERA HEAD; U.S. Pat. No. 10,288,997, issued May 14, 2019, entitled ROTATING CONTACT ASSEMBLIES FOR SELF-LEVELING CAMERA HEADS; U.S. Pat. No. 10,440,332, issued Oct. 8, 2019, entitled INSPECTION CAMERA DEVICES AND METHODS WITH SELECTIVELY ILLUMINATED MULTISENSOR IMAGING; U.S. Pat. No. 10,848,655, issued Nov. 24, 2020, entitled HEAT EXTRACTION ARCHITECTURE FOR COMPACT VIDEO CAMERA HEADS; U.S. patent application Ser. No. 17/110,273, filed Dec. 2, 2020, entitled INTEGRAL DUAL CLEANER CAMERA DRUM SYSTEMS AND METHODS; U.S. Pat. No. 11,209,115, issued Dec. 28, 2021, entitled PIPE INSPECTION AND/OR MAPPING CAMERA HEADS, SYSTEMS, AND METHODS; U.S. Pat. No. 11,402,337, issued Aug. 2, 2022, entitled VIDEO PIPE INSPECTIONS WITH VIDEO INTEGRATED WITH ADDITIONAL SENSOR DATA; U.S. Pat. No. 11,649,917, issued May 16, 2023, entitled INTEGRATED FLEX-SHAFT CAMERA SYSTEM WITH HAND CONTROL as well as the other utility locator devices of the incorporated applications. The pipe Sonde 1666 may be or share aspects with the those disclosed in U.S. Pat. No. 7,221,136, issued May 22, 2007, entitled SONDES FOR LOCATING UNDERGROUND PIPES AND CONDUITS and U.S. Pat. No. 9,798,033, issued Oct. 24, 2017, entitled SONDE DEVICES INCLUDING A SECTIONAL FERRITE CORE as well as the other utility locator devices of the incorporated applications.

Still referring to FIGS. 16A and 16B, the magnetic signal 1645 may be caused by current induced via an induction device 1640 on a tracer wire 1642 extending along or near the length of the utility line 1604. The induction device 1640 may be or share aspects with the those disclosed in U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. Pat. No. 10,073,186, issued Sep. 11, 2018, entitled KEYED CURRENT SIGNAL UTILITY LOCATING SYSTEMS AND METHODS; and U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT as well as the other utility locator devices of the incorporated applications. Likewise, in some system embodiments, an electronic marker device placed in a known position relative to the utility line 1604 may instead or additionally be used to determine the position of the associated utility line 1604. Such an electronic marker device may be or share aspects with the those disclosed in U.S. patent application Ser. No. 15/681,250, filed Aug. 18, 2017, entitled ELECTRONIC MARKER DEVICES AND SYSTEMS; U.S. Pat. No. 9,746,572, issued Aug. 29, 2017, entitled ELECTRONIC MARKER DEVICES AND SYSTEMS; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,859,727, issued Dec. 8, 2020, entitled ELECTRONIC MARKER DEVICES AND SYSTEMS; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS as well as the other marker devices of the incorporated applications.

Turning to FIG. 16B, the utility locator device 1420 may include one or more antennas 1632 and associated receiver circuitry 1634 (e.g., signal conditioners, analog-to-digital converters, multiplexers, amplifiers, and the like) to receive magnetic signals 1645 from the tracer wire 1642, signals 1668 from the pipe Sonde 1666 and/or signals emitted by electronic marker devices. It should be noted that though the utility locator device 1420 is illustrated as having twelve antennas 1432, in other embodiments other numbers of antennas may be used. Processing of magnetic signals 1645, signals 1668, and/or processing of other data which may include that from the pothole mapping apparatus 1300 may occur in a processing element 1436 having one or more processors in the locator subsystem 1430. Alternatively or additionally, processing of data may occur in the processing element 1336 disposed in the pothole mapping apparatus 1300 and/or in one or more remotely connected devices (e.g., remote database 1452, smartphone 1454, and/or other devices 1456). Utility line data of potholed utility lines may, for instance, be combined with other mapped utility lines in a remote database (e.g., remote database 1452). This may be particular advantageous where the potholed utility lines are non-conductive, allowing the mapped utility lines in the remote database (e.g., remote database 1452) to further include data regarding non-conductive utility lines that may otherwise be unavailable from maps generated by data collected from utility locator devices. Further, data relating to determining utility line positions, orientations, depth which may include the geolocations of potholes (e.g., pothole 1402) determined via GNSS receivers/antennas 1311 thorough receiving navigation signals from a plurality of GNSS satellites 1412 as well as instructions related to methods described herein may be store in a memory element 1438 having one or more non-transitory memories disposed in the locator subsystem 1430, the memory element 1375 disposed in the pothole mapping apparatus 1300, and/or a memory element in one or more remotely connected devices (e.g., remote database 1452, smartphone 1454, and/or other devices 1456). The utility locator device 1420 including the pothole mapping apparatus 1300 may further include a housing element 1480 to encase electronics and other components.

It should be noted that the pipe Sonde 1666 may be positioned inside the utility lone 1604 in or near the pothole 1602. Depth measurements determined via the pipe Sonde 1666 may be compared against distance measurements determined via the distance measuring element 1330 and further be used to calibrate utility locating data via the method 900 of FIG. 9.

Figure 17:
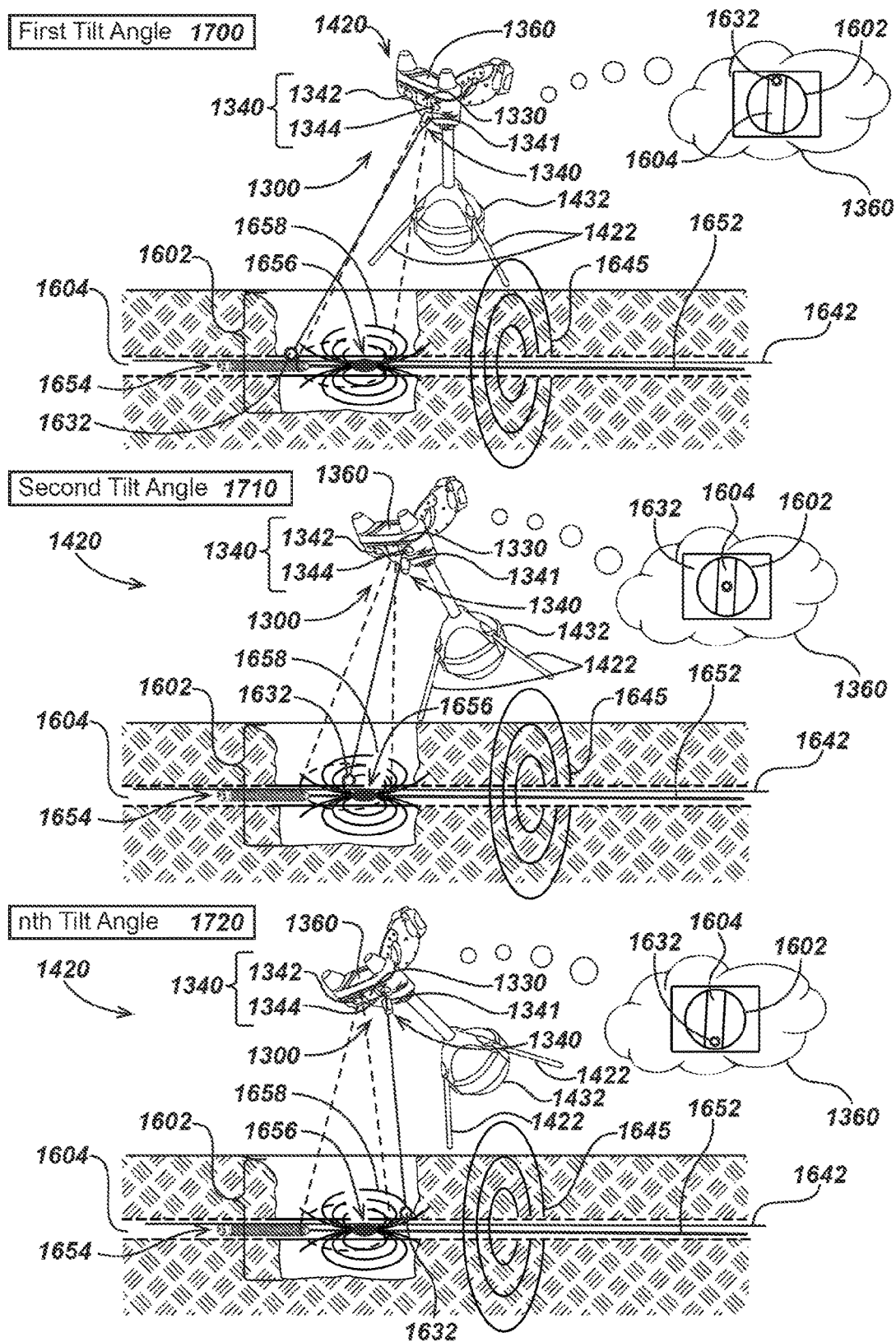
FIG. 17 is an illustration demonstrating an embodiment of scanning of a potholed utility line using different tilt angles by the utility locator device of FIGS. 16A and 16B.

Turning to FIG. 17, the utility locator device 1420 including the pothole mapping apparatus 1300 from FIGS. 16A and 16B is further illustrated tilted at various angles in scanning and generating images of the utility line 1604 disposed in the pothole 1602. For instance, the utility locator device 1420 including the pothole mapping apparatus 1300 may be tilted at a first tilt angle 1700, a second tilt angle 1710, and through to an nth tilt angle 1720. The utility locator device 1420 including the pothole mapping apparatus 1300 may be held at each of the tilt angles (e.g., the first tilt angle 1700, the second tilt angle 1710, and the nth tilt angle 1720), in various different ways. For instance, the legs of a tripod 1422 may be configured to extend, collapse, or otherwise be adjusted by a user to achieve different tilt angles. Likewise, in some embodiments the head of the utility locator device 1420 including the pothole mapping apparatus 1000 may be configured to tilt at various tilt angles (not illustrated). In yet further embodiments, a user may hold the utility locator device 1420 including the pothole mapping apparatus 1300 at various angles, for instance, supported on the front leg or legs of a tripod such as the tripod 1422. As further illustrated, the display element 1360 of the utility locator device 1420 may show a laser dot 1632 where the multi-spectral laser rangefinder(s) 1331 of the distance measuring element 1330. As the utility locator device 1420 may tilt at different angles to scan along the utility line 1604, the laser dot 1632 may move along the utility line 1604 on the display element 1360.

The exposure of utility lines during a potholing procedure may allow for various ground truths to be determined that may otherwise be difficult or impossible to determine. For instance, the exposure of one or more utility lines may allow for identifying utility line types, determining dimensions of utility lines, identifying materials of the utility line (e.g., copper, cast iron, lead, PVC, ABS, or the like), scanning of utility lines, verifying or refining depth measurements of utility lines, identifying defects/problems in the utility lines, images of the utility line/pothole, and/or like identifiable characteristics revealed when a utility line is exposed in a pothole. Such data may be referred to herein as "Potholing Data." It should be noted that the Potholing Data may include data input by a user. The Potholing Data, in combination with data associated with locating and mapping utility line positions that may be determined via a utility locating device (e.g., the utility locating device 620 of FIGS. 6A and 6B, the utility locating device 1120 of FIGS. 11A and 11B, the utility locating device 1420 of FIGS. 14A, 14B, 16A, and 16B) and/or connected devices or apparatus in a utility locating system, further referred to herein as "Locating Data," may be provided as Training Data to a Neural Network to use Deep Learning/artificial intelligence to recognize patterns and make predictions related to utility lines. It should be noted that the Locating Data may also include data input by a user.

Figure 18:
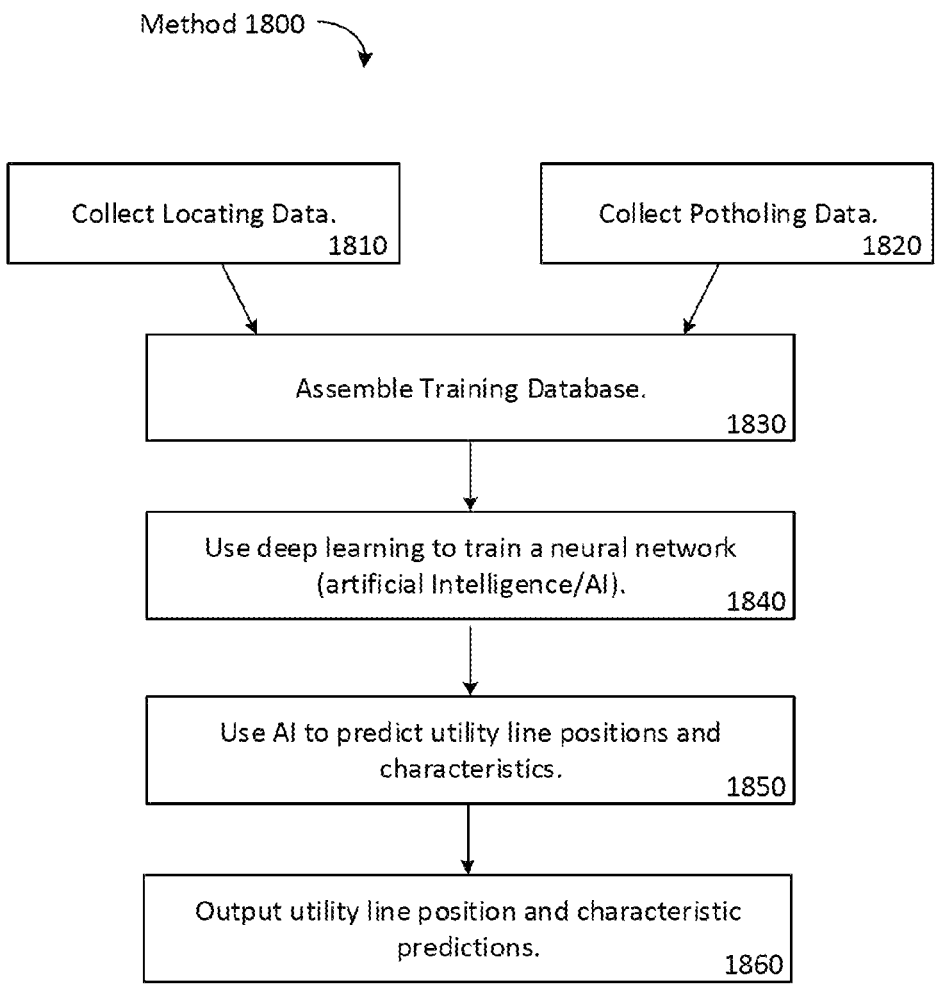
FIG. 18 is a method of providing Training Data that includes Locating Data and Potholing Data to a Neural Network to use Deep Learning/artificial intelligence to recognize patterns and make predictions related to underground utilities.

Turning to FIG. 18, a method 1800 is illustrated for providing Training Data to a Neural Network to use Deep Learning/artificial intelligence to recognize patterns and make predictions related to utility lines. In a step 1810, the method 1800 may include collecting Locating Data. The Locating Data 1810 may be or include, but is not limited to, various sources illustrated with the Locating Data 1910 of FIG. 19A. In a step 1810 the method 1800 may include collecting Potholing Data. The Potholing Data 1820 may be or include, but is not limited to, various sources illustrated with the Potholing Data 1920 of FIG. 19B. In a step 1830, the Locating Data 1910 and the Potholing Data 1920 may be used in the assembly of the Training Data in a Training Database. In a step 1840, deep learning may utilize the Training Data of Training Database from the step 1830 to train a Neural Network (Artificial Intelligence/AI). In a step 1850, AI may be used to predict utility line positions and characteristics. For instance, AI may be used to predict utility line positions and map utility lines as well as predict materials, types of utility lines, utility line depths in the ground, defects or problems in utility lines, and other characteristics. In a step 1860, the method 1800 may output utility line position and characteristic predictions. For instance, the predictions may be saved on one or more non-transitory memories, used to further locate utility lines, or the like.

Figure 19A:
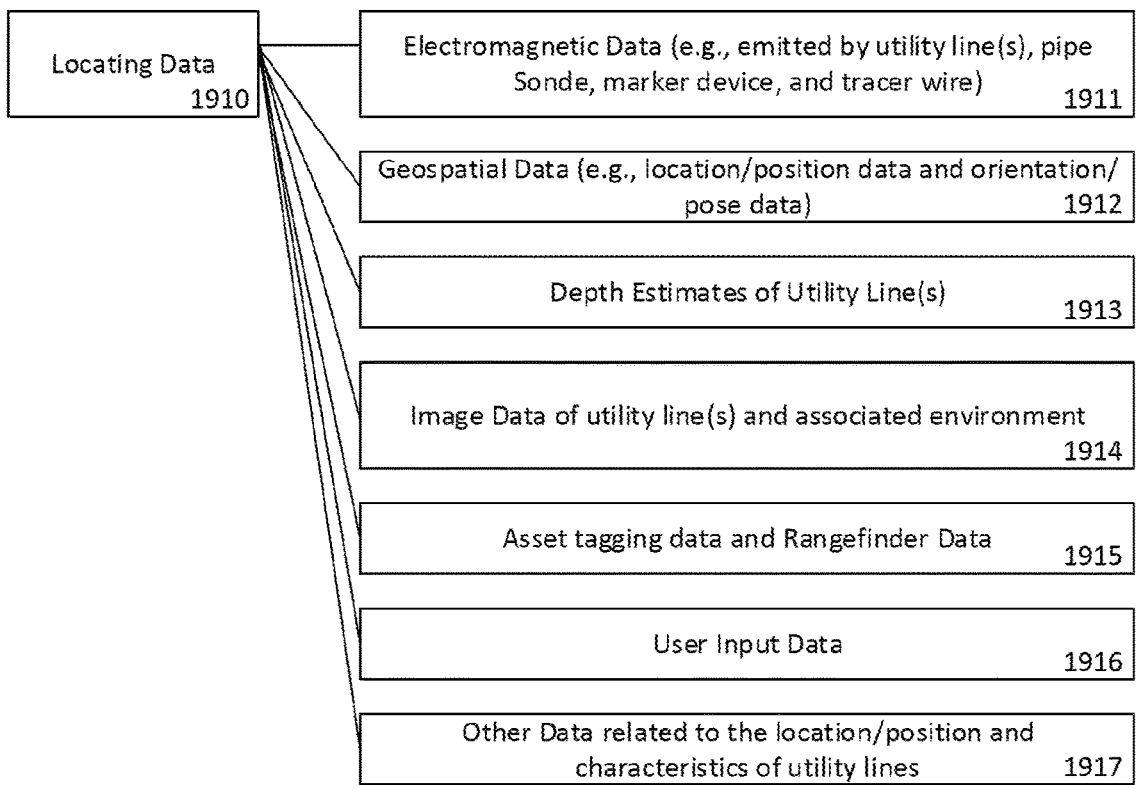
FIG. 19A is a diagram of example sources of Locating Data that may be used to train Neural Networks. and 19B is a diagram of example sources of Potholing Data that may be used to train Neural Networks.

Turning to FIG. 19A, Locating Data 1910 is illustrated showing a plurality of example sources of data that may be used to train Neural Networks. As illustrated, the Locating Data 1910 may include, but should not be limited to, electromagnetic data (e.g., emitted by utility line(s), pipe Sonde, marker device, and tracer wire) 1911, geospatial data (e.g., location/position data and orientation/pose data) 1912, depth estimates of utility line(s) 1913 (e.g., depth of utility lines determined via the measured electromagnetic signals), images of utility line(s) and associated environment 1914, asset tagging data and rangefinder data 1915, user input data 1916, and/or other data related to the location/position and characteristics of utility lines 1917. The asset tagging of the asset tagging and rangefinder data 1915 may include identification and measurement of electromagnetic signals of objects or other assets present in the locating environment and may employee rangefinders as those disclosed in U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Pat. No. 11,397,274, issued Jul. 26, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; and U.S. Provisional Patent Application 63/514,090, filed Jul. 17, 2023, entitled SMARTPHONE MOUNTING APPARATUS FOR ASSET TAGGING AS USED WITH UTILITY LOCATOR DEVICES as well as the other marker devices of the incorporated applications. It should be noted that the Locating Data 1910 may be or share aspect with the Locating Data 1810 of FIG. 18.

Figure 19B:
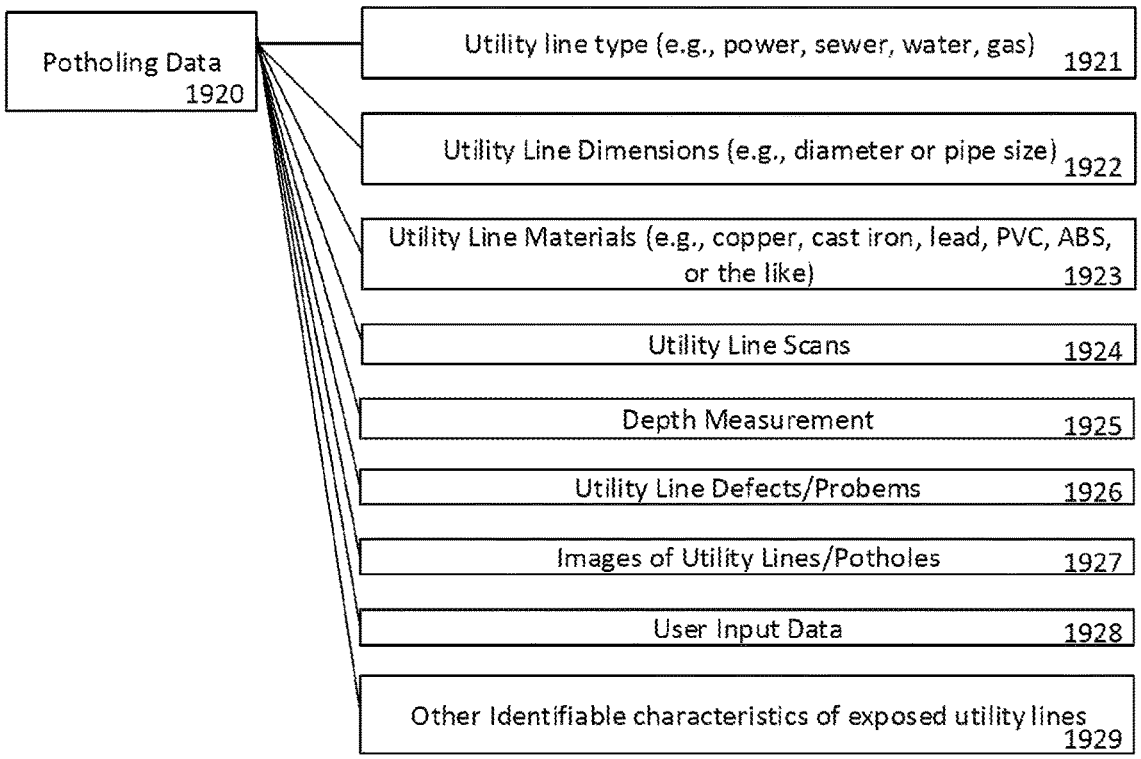

Turning to FIG. 19B, Potholing Data 1920 is illustrated showing a plurality of example sources of data that may be used to train Neural Networks. As illustrated, the Potholing Data 1920 may include, but should not be limited to, utility line type (e.g., power, sewer, water, gas) 1921, utility dimension data (e.g., diameter or pipe size) 1922, utility line materials (e.g., copper, cast iron, lead, PVC, ABS, or the like) 1923, utility line scans 1924 (e.g., the scanning with various tilt angles illustrated in FIG. 12 and FIG. 17), depth measurements 1925 (e.g., physical measurements and/or depth measurements determined via a distance measuring element), utility line defects/problems 1926 (e.g., breaks, leaks, or cracks in the utility line), images of the utility line(s) and potholes 1927, user input data 1928, and/or other identifiable characteristics of exposed utility lines 1929. It should be noted that the Locating Data 1910 may be or share aspect with the Potholing Data 1820 of FIG. 18.

In one or more exemplary embodiments, the electronic features and functions described herein and associated with the positioning devices, systems, and methods may be implemented in hardware, software, firmware, or any combination thereof. If implemented in software, the functions may be stored on or encoded as one or more instructions or code on a computer-readable medium. Computer-readable medium includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, solid state drives (SSD), USB flash drives or other similar portable devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable medium. As used herein, computer program products comprising computer-readable media include all forms of computer-readable media except to the extent that such media is deemed to be non-statutory, transitory propagating signals.

Those of skill in the art would understand that information and signals, such input/output signals or data, and/or other signals/other data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one aspect, the aforementioned means may be a module comprising a processing element including a processor or processors, associated memory and/or other electronics in which embodiments of the invention reside, such as to implement signal reception, signal processing, switching, signal transmission, or other functions to process and/or condition transmitter outputs, locator inputs, filter received signals, and/or provide other electronic functions described herein. These may be, for example, modules or apparatus residing in buried object integrated locators, marker devices, marker device marker excitation devices or receiver devices, and/or other related equipment, devices, or systems. Processing elements, as used herein, may also include networked computers or computing systems, cloud based computing, machine learning, and Artificial Intelligence (AI) systems. It is foreseeable that other processing systems, methods, and devices not listed here could be used by one of ordinary skill in the art to accomplish processing, computing, and memory tasks and functions.

The features described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known or developed in the art. An exemplary storage medium is coupled to the processor such that the processor can read information from, and write information to, the storage medium. In the alternative, the storage medium may be integral to the processor.

The scope of the present disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present disclosure. Various modifications to these aspects will be readily apparent to those skilled in the art, and the generic principles defined herein may be applied to other aspects without departing from the spirit or scope of the disclosures herein. Thus, the scope of the present disclosure is not intended to be limited to the aspects shown herein but is to be accorded the widest scope consistent with the appended claims and their equivalents.

I claim:

1. A pothole mapping apparatus, comprising:
   a positioning element to determine position data describing the geolocation in the world frame of the pothole mapping apparatus at the ground surface about a pothole;
   an orientation element to determine orientation data describing the direction, tilt, and pose of the pothole mapping apparatus in three dimensions that correlates with the position data;
   a distance measuring element to determine distance data describing the distance between the pothole mapping apparatus and one or more utility lines in a pothole correlating with the position data and orientation data;
   a processing element having one or more processors to carry out methods associated with documenting mapped position and depths of potholed utility line(s);
   a memory element having one or more non-transitory memories to store instructions relating to methods associated with documenting mapped position and depths of the potholed utility line(s) and the resulting mapped utility line positions and depths;
   an imaging element to generate images of the one or more utility lines in the pothole and surrounding area correlated with position data, orientation data, and distance data;
   a housing element to encase electronics and other components associated with the pothole mapping apparatus; and
   a power element for portioning of electrical power to the various powered elements.

2. The apparatus of claim 1, wherein the positioning element is or includes one or more global navigation satellite system (GNSS) receivers.

3. The apparatus of claim 1, wherein the orientation element includes one or more gyroscopic sensors, inclinometers, magnetometers, or other sensors and apparatus for determining orientation in three dimensions.

4. The apparatus of claim 1, wherein the distance measuring device includes a laser rangefinder.

5. The apparatus of claim 4, wherein the laser rangefinder is a multi-spectral laser rangefinder.

6. The apparatus of claim 1 is disposed in a utility locator device.

7. The apparatus of claim 1, further including a communication element to communicate data relating to the geolocation and depth of the potholed utility line(s) with one or more systems and devices for mapping utility lines.

8. The apparatus of claim 7, wherein the communication element communicates data relating to the geolocation and depth of the potholed utility line(s) with one or more databases that includes mapped data of utility lines.

9. The apparatus of claim 1, wherein the imaging element includes telephoto or long-focus lens(es).

10. The apparatus of claim 1, wherein the imaging element is focused via manual controls.

11. The apparatus of claim 1, wherein the imaging element is focused via autofocus.

12. The apparatus of claim 1, wherein the imaging element employs high dynamic range (HDR) and/or other image stacking techniques.

13. The apparatus of claim 1, wherein the imaging element employs a global shutter in scanning a pothole.

14. The apparatus of claim 1, further including a display element to display images and associated data of the utility line or lines in the pothole.

15. The apparatus of claim 14, wherein the display element displays utility line images with a super imposed scale describing the dimensions of the utility line(s).

16. The apparatus of claim 14, wherein the display element comprises a graphical user interface (GUI).

17. The apparatus of claim 1, further including an illumination element having one or more lights in illuminating the utility disposed in the pothole and surrounding area.

18. A utility locator device including a pothole mapping apparatus, comprising;
   a locator subsystem having one or more antennas and associated receiver circuitry to receive magnetic signals emitted by one or more utility lines;
   a pothole mapping apparatus, comprising;
   a positioning element to determine position data describing the geolocation in the world frame of the pothole mapping apparatus at the ground surface about a pothole;
   an orientation element to determine orientation data describing the direction, tilt, and pose of the pothole mapping apparatus in three dimensions that correlates with the position data;
   a distance measuring element to determine distance data describing the distance between the pothole mapping apparatus and one or more utility lines in a pothole correlating with the position data and orientation data;
   a processing element having one or more processors to carry out methods associated with documenting mapped position and depths of potholed utility line(s) and determining, via magnetic signals, the positions and orientation of the same utility line(s);
   a memory element having one or more non-transitory memories to store instructions relating to methods associated with documenting mapped position and depths of potholed utility line(s) and the resulting mapped utility line position(s) and depth(s);
   an imaging element to generate images of the one or more utility lines in the pothole and surrounding area correlated with position data, orientation data, and distance data;
   a housing element to encase electronics and other components associated with the utility locator device including a pothole mapping apparatus;
   a power element for portioning of electrical power to the various powered elements; and
   a communication element to communicate data relating to the geolocation and depth of the potholed utility line(s) with one or more databases, systems, and devices for utility line mapping.

19. The device of claim 18, wherein the positioning element is or includes one or more global navigation satellite systems (GNSS).

20. The device of claim 18, wherein the orientation element includes one or more gyroscopic sensors, inclinometers, magnetometers, or other sensors and apparatus for determining orientation in three dimensions.

21. The device of claim 18, wherein the distance measuring device includes a laser rangefinder.

22. The device of claim 21, wherein the laser rangefinder is a multi-spectral laser rangefinder.

23. The device of claim 18, wherein the imaging element includes telephoto or long-focus lens(es).

24. The device of claim 18, wherein the imaging element is focused via manual controls.

25. The device of claim 18, wherein the imaging element is focused via autofocus.

26. The device of claim 18, wherein the imaging element employs high dynamic range (HDR) and/or other image stacking techniques.

27. The device of claim 18, wherein the imaging element employs a global shutter in scanning a pothole.

28. The device of claim 18, further including a display element to display images and associated data of the utility line or lines in the pothole.

29. The device of claim 28, wherein the display element displays utility line images with a super imposed scale of the dimensions of the utility lines(s).

30. The device of claim 18, wherein the device is adjustable to be held at different tilt angles to facilitate scanning of a pothole.

31. The device of claim 18, further including an illumination element having one or more lights in illuminating the utility disposed in the pothole and surrounding area.

* * * * *